(12) United States Patent
Agrawal et al.

(10) Patent No.: US 12,064,390 B2
(45) Date of Patent: Aug. 20, 2024

(54) POWERED WALKING ASSISTANT AND ASSOCIATED SYSTEMS AND METHODS

(71) Applicant: The Trustees of Columbia University in the City of New York, New York, NY (US)

(72) Inventors: Sunil K. Agrawal, Newark, DE (US); Danielle Stramel, New York, NY (US); Robert M. Carrera, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 976 days.

(21) Appl. No.: 16/863,005

(22) Filed: Apr. 30, 2020

(65) Prior Publication Data
US 2020/0323727 A1    Oct. 15, 2020

Related U.S. Application Data

(63) Continuation-in-part of application No. 15/950,946, filed on Apr. 11, 2018, now abandoned.

(60) Provisional application No. 62/876,224, filed on Jul. 19, 2019, provisional application No. 62/484,170, filed on Apr. 11, 2017.

(51) Int. Cl.
*B25J 11/00* (2006.01)
*A61H 3/00* (2006.01)
*A61H 3/02* (2006.01)
*A61H 3/04* (2006.01)
(Continued)

(52) U.S. Cl.
CPC ............. *A61H 3/04* (2013.01); *A61H 3/00* (2013.01); *A61H 3/02* (2013.01); *B25J 11/008* (2013.01); *G05D 1/0236* (2013.01); *G05D 1/0244* (2013.01); *G05D 1/12* (2013.01); *G06F 3/014* (2013.01); *A61H 2003/043* (2013.01); *A61H 2201/0157* (2013.01); *A61H 2201/1635* (2013.01); *A61H 2201/1659* (2013.01); *A61H 2201/5007* (2013.01); *A61H 2201/5046* (2013.01); *A61H 2201/5061* (2013.01); *A61H 2201/5071* (2013.01)

(58) Field of Classification Search
CPC ... B25J 11/008; G05D 1/0236; G05D 1/0244; G05D 1/12; G06F 3/014; A61H 2201/1659; A61H 2201/5007; A61H 2201/5061
See application file for complete search history.

(56) References Cited

U.S. PATENT DOCUMENTS 6,540,039 B1    4/2003   Yu et al.
6,666,831 B1   12/2003   Edgerton et al.
(Continued)

FOREIGN PATENT DOCUMENTS

WO    2015164456 A2   10/2015

OTHER PUBLICATIONS

Safi R. Faruqui, Do et al., "Ambulatory assistive devices in orthopaedics: uses and modifications", Journal of the American Academy of Orthopaedic Surgeons, Jan. 2010; 18(1): pp. 41-50.
(Continued)

*Primary Examiner* — Kira Nguyen
(74) *Attorney, Agent, or Firm* — Potomac Law Group, PLLC

(57) ABSTRACT

A robotic assistant provides active support for disabled users and may take the approximate form of a cane or a walker.

20 Claims, 31 Drawing Sheets

(51) Int. Cl.
 G05D 1/00 (2006.01)
 G06F 3/01 (2006.01)

(56) References Cited

U.S. PATENT DOCUMENTS

| | | | |
|---|---|---|---|
| 6,741,911 B2 | 5/2004 | Simmons | |
| 7,957,837 B2 | 6/2011 | Ziegler et al. | |
| 2008/0234113 A1 | 9/2008 | Einav | |
| 2009/0260426 A1 | 10/2009 | Lieberman et al. | |
| 2011/0205067 A1* | 8/2011 | Konishi | A61H 1/024 340/573.1 |
| 2012/0029696 A1 | 2/2012 | Ota et al. | |
| 2013/0346021 A1* | 12/2013 | Stevens | A61B 5/11 702/160 |
| 2014/0009561 A1 | 1/2014 | Sutherland et al. | |
| 2015/0294597 A1* | 10/2015 | Rizzo | A61H 3/061 340/4.12 |
| 2015/0359691 A1* | 12/2015 | Isozumi | A61H 3/04 180/19.1 |
| 2017/0027803 A1 | 2/2017 | Agrawal et al. | |
| 2017/0055880 A1 | 3/2017 | Agrawal et al. | |
| 2017/0087023 A1* | 3/2017 | Peli | A61F 9/08 |
| 2017/0333278 A1* | 11/2017 | Hyun | A61H 1/024 |
| 2017/0340504 A1* | 11/2017 | Sanz Merodio | A61H 3/00 |

OTHER PUBLICATIONS

Santos et al., "Combined effects of the light touch and cognitive task affect the components of postural sway," Neurosci. Lett., vol. 703, pp. 99-103, Jun. 2019.
Shen, "NRI: Collaborative Research: Quadrupedal human-assistive robotic platform (Q-HARP)", NSF Grant #:5R01NR016151-02, Awardee Organization: University of Alabama in Tuscaloosa, Project No. 5R01NR016151-02, Award Notice Date: Jul. 7.
Shraddha Srivastava et al., "Assist-as-needed robot-aided gait training improves walking function in individuals following stroke", IEEE Trans Neural Syst Rehabil Eng. Nov. 2015; 23(6): pp. 956-963.
Signe Brewster, "This $40,000 Robotic Exoskeleton Lets the Paralyzed Walk", MIT Technology Review, Feb. 1, 2016.
Sigrist et al., "Augmented visual, auditory, haptic, and multimodal feedback in motor learning: A review," Psychon. Bull. Rev., vol. 20, No. 1, pp. 21-53, 2013.
Spenko et al., "Robotic personal aids for mobility and monitoring for the elderly", IEEE Trans Neural Syst Rehabil Eng. Sep. 2006;14(3):344-51.
Stevens, "Unintentional fall injuries associated with walkers and canes in older adults treated in U.S. emergency departments", J Am Geriatr Soc. Aug. 2009; 57(8): pp. 1464-1469.
Tang et al., "Motion control of walking assistant robot based on comfort", vol. 39 / Issue 6, pp. 564-579, Oct. 2012.
Teixidó M, "Measuring oscillating walking paths with a LIDAR", Sensors (Basel). 2011; 11(5): pp. 5071-5086.
Unknown, "Comparison of Lokomat and Aquatic Exercise for Individuals With Chronic Incomplete Spinal Cord Injury", ClinicalTrials.gov, Jul. 12, 2011.
Unknown, "Pearl the NurseBot: The Softer Side of Technology", Carnegie Melon Today, vol. 1 / Issue 4, Epub Dec. 2004.
Unknown, "ReWalk Robotics Reports Third Quarter 2016 Financial Results", Nasdaq Report, Nov. 3, 2016, ReWalk Robotics Ltd.
Vashista et al., "Force adaptation in human walking with symmetrically applied downward forces on the pelvis", 34th International Conference of the IEEE, Aug. 28, 2012, pp. 3312-3315.
Veneman et al., "Fixating the pelvis in the horizontal plane affects gait characteristics," Gait Posture, vol. 28, No. 1, pp. 157-163, Jul. 2008.
Wade et al., "Design and implementation of an instrumented cane for gait recognition," in Proceedings—IEEE International Conference on Robotics and Automation, 2015, pp. 5904-5909.

Wakita et al., "Human-walking-intention-based motion control of an omnidirectional-type cane robot," IEEE/ASME Trans. Mechatronics, vol. 18, No. 1, pp. 285-296, 2013.
Wellmon et al., "Changes in Dual-task Voice Reaction Time Among Elders Who Use Assistive Devices," J. Geriatr. Phys. Ther., vol. 29, No. 2, pp. 74-80, 2011.
Wright, "The dual-task methodology and assessing the attentional demands of ambulation with walking devices," Phys. Ther., vol. 72, No. 4, pp. 306-312; discussion 313-5, Apr. 1992.
Yang et al., "Effects of Real-time Auditory Stimulation Feedback on Balance and Gait after Stroke: a Randomized Controlled Trial," J. Exp. Stroke Transl. Med., vol. 9, No. 1, pp. 1-5, 2016.
Ye et al., "6-DOF Pose Estimation of a Robotic Navigation Aid by Tracking Visual and Geometric Features", IEEE Trans Autom Sci Eng. Oct. 2015 ; 12(4): 1169-1180.
Ye et al., "A co-robotic cane for blind navigation," in Conference Proceedings—IEEE International Conference on Systems, Man and Cybernetics, Jan. 2014, pp. 1082-1087.
Yeh et al., "Postural Stabilization Effects of Light Touch Do Not Come from Axis-Specific Cues of Postural Sway: A Pilot Study," Percept. Mot. Skills, vol. 120, No. 1, pp. 247-256, Feb. 2015.
Zanotto et al., "Knee joint misalignment in exoskeletons for the lower", vol. 31 / Issue 4, pp. 978-987, Aug. 2015.
Agrawal, "A Novel Light-weight Cable-driven Active Leg Exoskeleton (C-ALEX) for Training of Human Gait", Award No. 1339666, Sep. 30, 2018.
Agrawal, "Robotic exoskeletons, fees, and biomechanics: treating movement disorders" NIH Grant #: 5R01HD038582-09, Award Notice Date: Jul. 21, 2011.
Aman et al., "The effectiveness of proprioceptive training for improving motor function: a systematic review," Front. Hum. Neurosci., vol. 8, Jan. 2015.
Author Unknown, "FastStats—Disabilities or Limitations," National Center for Health Statistics: Disability and Functioning, 2017, Centers for Disease Control and Prevention, [Online] Available Online: https://www.cdc.gov/nchs/fastats/disability.htm, accessed Aug. 7, 2019.
Baldan et al., "Effect of light touch on postural sway in individuals with balance problems: A systematic review," Gait Posture, vol. 40, No. 1, pp. 1-10, 2014.
Bauby et al., "Active control of lateral balance in human walking," J. Biomech., vol. 33, No. 11, pp. 1433-1440, 2000.
Ben Coxworth, "New robotic walker helps patients walk with a natural gait", New Atlas, Nov. 26, 2014.
Bonan et al., "Reliance on Visual Information after Stroke. Part II: Effectiveness of a Balance Rehabilitation Program with Visual Cue Deprivation after Stroke: A Randomized Controlled Trial," Arch. Phys. Med. Rehabil., vol. 85, No. 2, pp. 274-278, 2004.
Boonsinsukh et al., "Light Touch Cue Through a Cane Improves Pelvic Stability During Walking in Stroke," Arch. Phys. Med. Rehabil., vol. 90, No. 6, pp. 919-926, Jun. 2009.
Borowicz et al., "Assessing gait and balance impairment in elderly residents of nursing homes," J. Phys. Ther. Sci., vol. 28, No. 9, pp. 2486-2490, 2016.
Chamorro-Moriana et al., "Technology-Based Feedback and Its Efficacy in Improving Gait Parameters in Patients with Abnormal Gait: A Systematic Review," Sensors, vol. 18, No. 1, pp. 1-23, 2018.
Chen "Assisting versus repelling force-feedback for learning of a line following task in a wheelchair", IEEE Trans Neural Syst Rehabil Eng. Nov. 2013;21(6):959-68.
Chen et al., "Design of a robotic mobility system with a modular haptic feedback approach to promote socialization in children", IEEE Trans Haptics. Apr.-Jun. 2014;7(2).
Clapp et al., "Light touch contribution to balance in normal bipedal stance," Exp. Brain Res., vol. 125, No. 4, pp. 521-524, Apr. 1999.
Clotet et al., "Assistant Personal Robot (APR): Conception and Application of a Tele-Operated Assisted Living Robot", vol. 16 / Issue 5, pp. 610, Apr. 2016.
Dickstein et al., "Fingertip touch improves postural stability in patients with peripheral neuropathy," Gait Posture, vol. 14, No. 3, pp. 238-247, Dec. 2001.

(56) References Cited

OTHER PUBLICATIONS

Dickstein et al., "Light touch and center of mass stability during treadmill locomotion," Gait Posture, vol. 20, No. 1, pp. 41-47, Aug. 2004.
Forero et al., "The contribution of light touch sensory cues to corrective reactions during treadmill locomotion," Exp. Brain Res., vol. 226, No. 4, pp. 575-584, 2013.
Francis et al., "Gait variability in healthy old adults is more affected by a visual perturbation than by a cognitive or narrow step placement demand," Gait Posture, vol. 42, No. 3, pp. 380-385, 2015.
Frost et al., "Sensorimotor control of gait: a novel approach for the study of the interplay of visual and proprioceptive feedback," Front. Hum. Neurosci., vol. 9, No. 14, pp. 1-8, 2015.
Geunho Lee, "Design and control of JAIST active robotic walker", Journal of Intelligent Service Robotics, Jul. 2010, vol. 3, Issue 3, pp. 125-135.
Hamid Bateni PhD et al., "Assistive devices for balance and mobility: benefits, demands, and adverse consequences" Arch Phys Med Rehabil. Jan. 2005; 86(1): pp. 134-145.
Hamid Bateni. "Assistive devices for balance and mobility: benefits, demands, and adverse consequences", Arch Phys Med Rehabil. Jan. 2005; 86(1): pp. 134-145.
Harris-Kojetin et al., "Long-term care services in the United States: 2013 overview", Vital Health Stat 3. 2013; (37): pp. 1-107.
Hu et al., "Design of Sensing System and Anticipative Behavior for Human Following of Mobile Robots," IEEE Trans. Ind. Electron., vol. 61, No. 4, pp. 1916-1927, Apr. 2014.
Ijmker et al., "Effects of handrail hold and light touch on energetics, step parameters, and neuromuscular activity during walking after stroke," J. Neuroeng. Rehabil., vol. 12, No. 1, p. 70, Dec. 2015.
Itadera et al., "Coordinated movement algorithm for accompanying cane robot," in 2016 International Symposium on Micro-NanoMechatronics and Human Science, MHS 2016, 2017.
Jacqueline Montes PT, EdD, "Gait assessment with solesound instrumented footwear in spinal muscular atrophy", Muscle Nerve. Aug. 2017;56(2):230-236.
Kanoko Matsuyama, "Robots to Aid Walking Offer New Tool to Aging, Disabled", Bloomberg Technology, Mar. 18, 2014.
Kouzaki et al., "Reduced postural sway during quiet standing by light touch is due to finger tactile feedback but not mechanical support," Exp. Brain Res., vol. 188, No. 1, pp. 153-158, Jun. 2008.
Krasovsky et al., "Reduced gait stability in high-functioning poststroke individuals," J. Neurophysiol., vol. 109, No. 1, pp. 77-88, 2013.
Kyoungchul K., "A gait monitoring system based on air pressure sensors embedded in a shoe", IEEE/ASME Trans Mechatronics. Jun. 2009; 14(3): pp. 358-370.
L. Harris-Kojetin et al., "Long-term care services in the United States: 2013 overview", Vital Health Stat 3. 2013; (37): pp. 1-107.
Li et al., "Stability and variability may respond differently to changes in walking speed," Hum. Mov. Sci., vol. 24, No. 2, pp. 257-267, Apr. 2005.
Martelli et al., "Gait adaptations during overground walking and multidirectional oscillations of the visual field in a virtual reality headset," Gait Posture, vol. 67, pp. 251-256, Jan. 2019.
McAndrew et al., "Walking variability during continuous pseudo-random oscillations of the support surface and visual field," J. Biomech., vol. 43, No. 8, pp. 1470-1475, May 2010.
Meyns et al., "The how and why of arm swing during human walking," Gait and Posture, vol. 38, No. 4, pp. 555-562, Sep. 2013.
Nancy M. Gell et al., "Mobility device use among older adults and incidence of falls and worry about falling: findings from the 2011-2012 National Health and Aging Trends study", J Am Geriatr Soc. May 2016; 63(5): pp. 853-859.
Oats et al., "The effect of light touch on balance control during overground walking in healthy young adults," Heliyon, vol. 3, No. 12, pp. 1-14, 2017.
O'Connor et al., "Direction-Dependent Control of Balance During Walking and Standing," J. Neurophysiol., vol. 102, No. 3, pp. 1411-1419, Sep. 2009.
Pyo et al., "Development of an Active Haptic Cane for Gait Rehabilitation," in International Conference on Robotics and Automation, 2015, pp. 4464-4469.
Rabin, et al., "Influences of Arm Proprioception and Degrees of Freedom of Postural Control With Light Touch Feedback," J. Neurophysiol., vol. 99, No. 2, pp. 595-604, 2008.
Reginella et al., "Postural sway with earth-fixed and body-referenced finger contact in young and older adults," J. Vestib. Res., vol. 9, No. 2, pp. 103-109, 1999.
Reinkensmeyer et al., "Robotic gait training: toward more natural movements and optimal training algorithms", Conf Proc IEEE Eng Med Biol Soc. 2004; 7: pp. 4818-4821.
Reinkensmeyer et al., "Tools for understanding and optimizing robotic gait training", J Rehabil Res Dev. Aug.-Sep. 2006; 43(5): pp. 657-670.
Resnik et al., "Racial and Ethnic Differences in Use of Assistive Devices for Mobility: Effect Modification by Age," J. Aging Health, vol. 18, No. 1, pp. 106-124, 2006.
Richards et al., "The interplay between strategic and adaptive control mechanisms in plastic recalibration of locomotor function," Exp. Brain Res., vol. 178, pp. 326-338, Apr. 2007.
Riley et al., "A kinematic and kinetic comparison of overground and treadmill walking in healthy subjects," Gait Posture, vol. 26, No. 1, pp. 17-24, Jun. 2007.
Riley et al., "Postural stabilization for the control of touching," Hum. Mov. Sci., vol. 18, No. 6, pp. 795-817, 1999.
Ruiz, "Lokomat Treadmill Training Effects on MS Gait", ClinicalTrials.gov, Feb. 3, 2009, Mount Sinai Rehabilitation Hospital.

\* cited by examiner

Condition:
Conventional cane
in front of
dominant foot

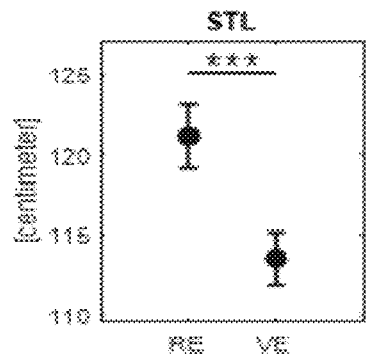
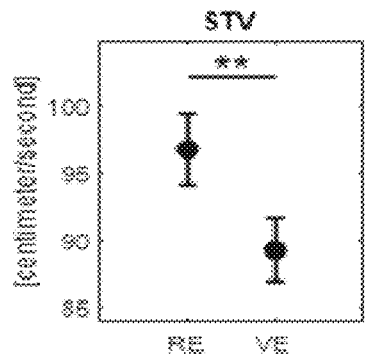
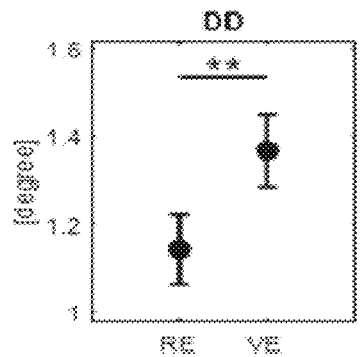
Fig. 19A          Fig. 19B          Fig. 19C
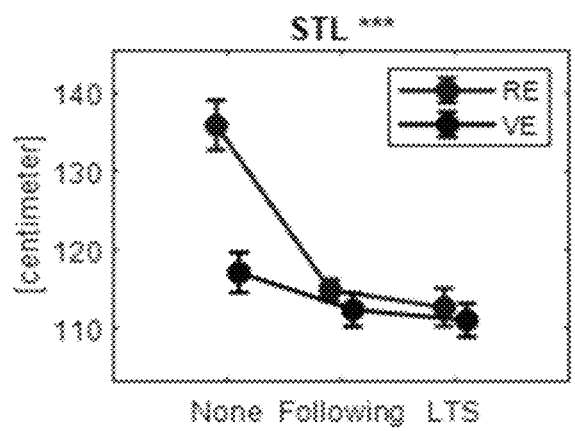
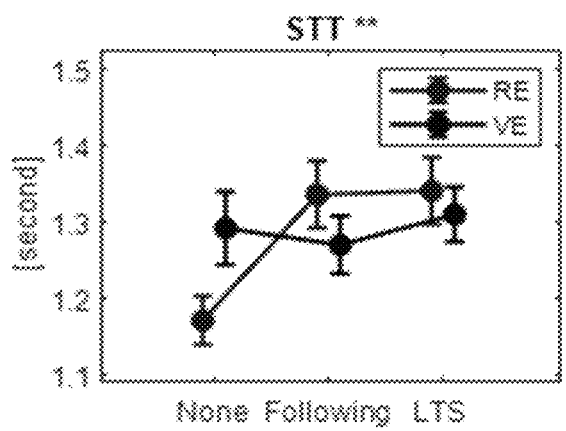
Fig. 19D          Fig. 19F
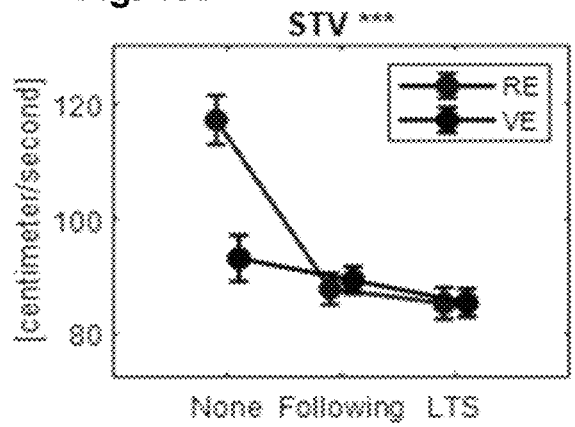
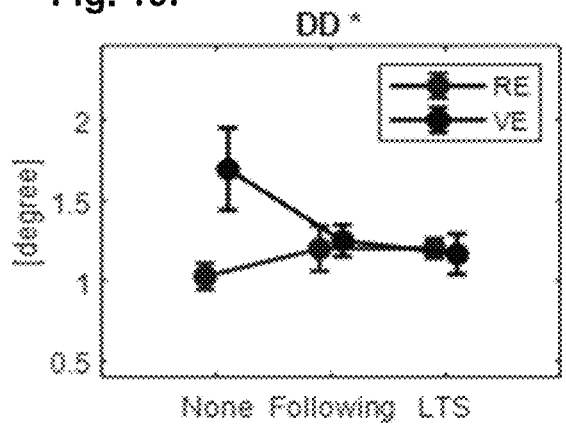
Fig. 19E          Fig. 19G

POWERED WALKING ASSISTANT AND ASSOCIATED SYSTEMS AND METHODS

CROSS-REFERENCE TO RELATED APPLICATIONS

This application claims the benefit of U.S. Provisional Application No. 62/876,224 filed Jul. 19, 2019, and is a continuation-in-part of U.S. application Ser. No. 15/950,946 filed Apr. 11, 2018, now pending, which claims the benefit of U.S. Provisional Application No. 62/484,170 filed Apr. 11, 2017. Each of the above applications are incorporated by reference in their entireties herein.

BACKGROUND

As many as 12 million Americans have mobility limitations and 6.4 million of these use assistive devices for mobility. A variety of factors and pathologies contribute to mobility impairments, including healthy or diseased ageing, arthritis, cardiovascular incidents, spinal cord injury, vestibular disorder, pain, and trauma, among others. Mobility impairments represent a major obstacle for the elderly as gait and balance dysfunction affect 14% of people aged 65 to 74. Many elderly people also suffer from physical and cognitive decline, requiring active supervision and assistance during typical daily activities, including walking. Additionally, existing walking aids are unsafe, as 47,000 Americans annually report a fall while using these walking aids. Robotic assistants and caregivers can reduce the economic cost of and burden on human caregivers and make patients feel more self-sufficient. There is a need to study how 'traditional walking aids' can be redesigned to become intelligent 'walking assistants' that act as companions, active support devices, and rehabilitation aids, as required by their users.

SUMMARY

A modular scalable customizable walking assistant augments the capability of people in their activities of daily life. The walking assistants can provide ubiquitous access to rehabilitative training outside of the clinic. Walking assistants are effective in a variety of situations and can be customized as: (i) a wheeled mobile unit that serves as a companion and as a monitor during daily activities, (ii) a programmable arm on a mobile base to provide the functions of an intelligent cane, and (iii) a mobile walker with active pelvic support to assist those with gait deficits. The control of these walking assistants may be customized to suit the needs of a user by monitoring their kinematics, ground interactions and environment data collected from sensors embedded within the walking assistants. The disclosed walking assistance devices may serve as companions, safety monitors, and rehabilitation devices for those with gait and balance deficits. The walking assistants may be networked with other walking assistants and personnel in a facility. The disclosed embodiments address various issues such as (i) control of the wheeled companion using sensed data from the user (ii) control of the wheeled mobile cane to facilitate and improve human balance (iii) and augmentation of human balance using a walker with cable-driven pelvic assist device and (iv) extract data from user inputs.

Falls and fall-related injuries are the most common and serious problems among those with balance deficits, especially in late life. Given the demographic shift towards increasing life expectancy worldwide, there may be a shortage of caregivers to assist the elderly. The proposed walking assistants can bridge this personnel gap to impact millions of Americans who have deficits in walking and require constant supervision.

BRIEF DESCRIPTION OF THE DRAWINGS

Embodiments may hereinafter be described in detail below with reference to the accompanying drawings, wherein like reference numerals represent like elements. The accompanying drawings have not necessarily been drawn to scale. Where applicable, some features may not be illustrated to assist in the description of underlying features.

FIGS. 19A to 19C show differences in gait between walking without CANINE following and walking with CANINE following but without light touch.

FIGS. 19D to 19G: Interaction effects between the visual environment (RE or VE) and the CANINE condition.

DETAILED DESCRIPTION

Figure 1A:
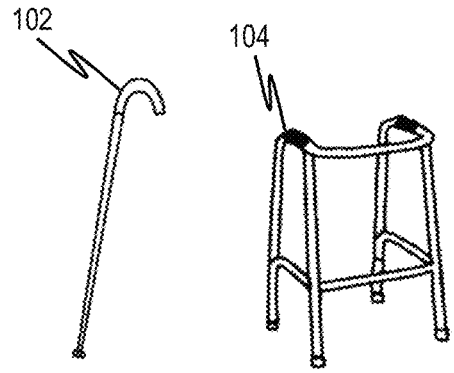
FIG. 1A shows a conventional cane and a walker according to the prior art.
Figure 1B:
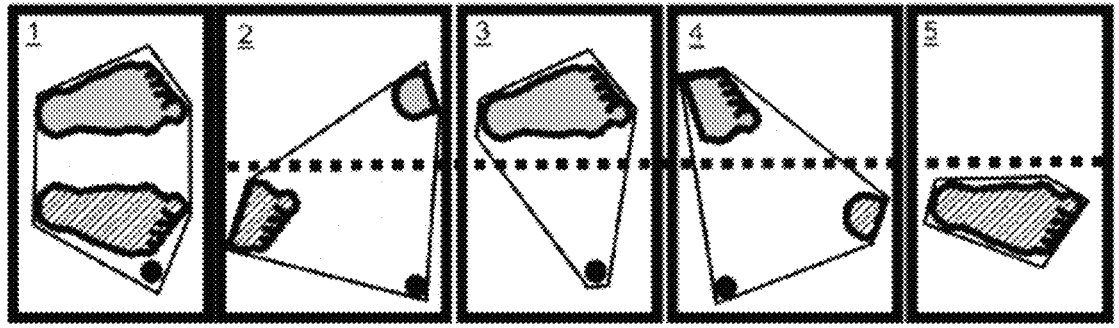
FIG. 1B is a schematic that shows how a cane can increase the base of support during standing and walking.

FIG. 1A shows conventional assistive devices including a cane 102 and a walker 104. FIG. 1B shows how the base of support can be increased and the position of the center of mass can be modulated as a person walks with a cane placed on the opposite side of a weak leg or affected foot. In addition, the cane can be used to generate propulsive and/or braking forces during walking to regulate the fore-aft component of the ground reaction force. The subjects can modulate their body posture using the cane so that the center of mass can be kept within the base of support. These allow the user to have better control during a gait cycle.

FIG. 1B with panels 1-5 showing the cane held contralateral to affected limb: (1) stationary standing; (2) triple support with cane applying braking force during the heel strike of the affected leg; (3) affected limb in stance while the sound leg in swing; (4) triple support with cane generating propulsive force during early heel strike of the unaffected leg; (5) standing on sound limb. Canes are typically light weight and those using canes often report improved confidence, and increased levels of activity, feelings of safety, and independence.

Walkers function like canes by increasing the base of support. However, most walkers are heavy and are difficult to maneuver. Some walkers have wheels in the front to facilitate maneuverability while walking. Walkers also result in poor back posture and reduced arm swing. Crutches are used under the armpits or over the forearms to bear weight of the body during walking. These are typically used by those who have bilateral deficits but have a stronger upper arm. Crutches require upper body strength and are energetically expensive. Those who require crutches get tired easily, hence crutches are typically avoided by the frail or the elderly.

Challenges while using Conventional Canes and Walkers: Despite their relative simplicity in design and decades of use, there are many issues which make the use of canes and walkers challenging for those with balance deficits. The use of these devices during ambulation requires: (a) periodic lifting/rolling and advancing of the device, (b) choosing appropriate contact locations on the ground, (c) synchronizing the motion of the device with the body movement, (d) modulating the force and moment applied by the hands on the device during movement, and (e) avoiding collision of the walking aid with lower limbs and/or objects in the environment. While these tasks may seem trivial for the able bodied, they are not so easy for those with balance deficits. These tasks place significant attentional demands on the central nervous system and the neuro-motor control. As a result, falls with walking aids are frequent. In the U.S., an estimated 47,300 users fall every year while using walking aids and are treated for injuries.

The disclosed subject matter includes technology related to balance augmentation during walking. Devices employ smart canes or walkers that overcome limitations of conventional and prior intelligent walking aids and overcome them by changing them into safe and intelligent walking assistants using the framework of robotics with integrated sensing, computation, communication, and control. The resulting walking assistants may serve as intelligent companions, active support devices, and rehabilitation therapists, as needed. These assistants may be networked with other walking assistants and long-term care personnel. In addition to the typical issues of systems and control design in robotics, the algorithms for intelligent walking assistants include (i) biomechanical limitations of the user, (ii) physical support and guidance requirements during walking tasks, and (iii) neuro-motor control ability of the user. For the system to be suitable for the long-term care centers and their residents, a user-centric design may employ where the design evolves with continuous feedback from the end users. The embodiments may employ features and technology from existing and other systems. Navigation and control of walk-assist robots may use the framework of differential flatness.

Figure 2A:
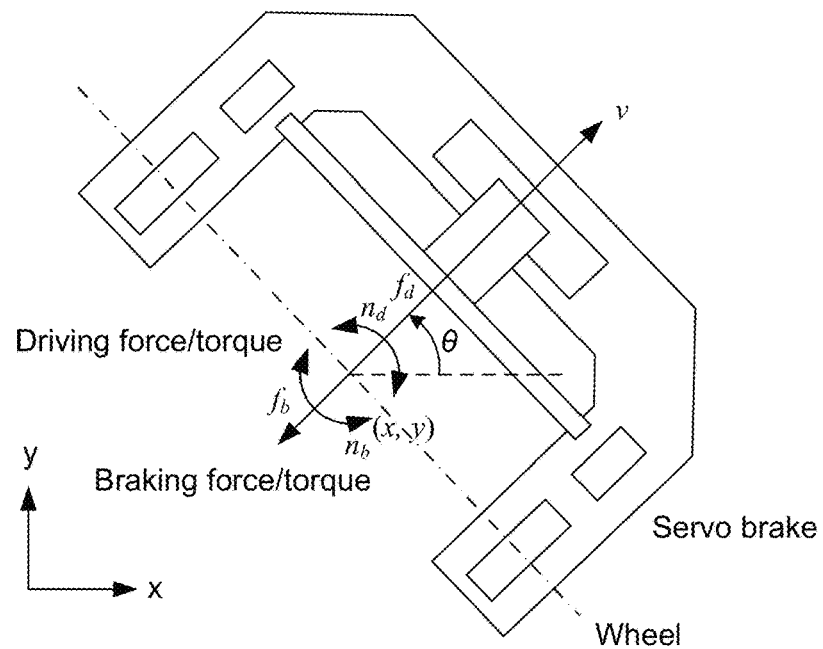
FIGS. 2A and 2B show a walk-assist robot that provides navigation and control based on the framework of differential flatness.
Figure 2B:
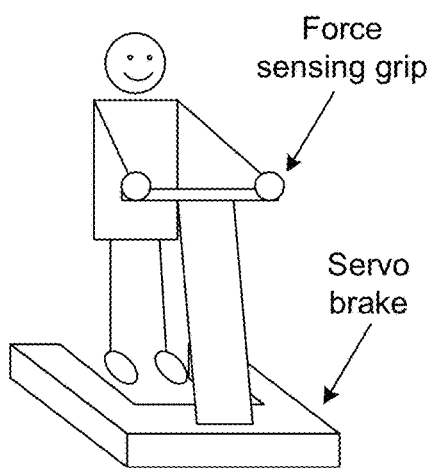

FIG. 2B shows a picture of a walk-assist robot and FIG. 2A shows a schematic of the system that was used to make the differentially driven kinematic and dynamic model of the vehicle.

Figure 3A:
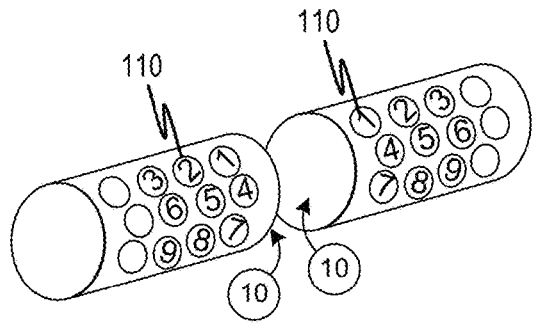
FIGS. 3A and 3B show a distributed force sensor on a grip handle for a grip of the walk assist robot of FIGS. 2A and 2B.
Figure 3B:
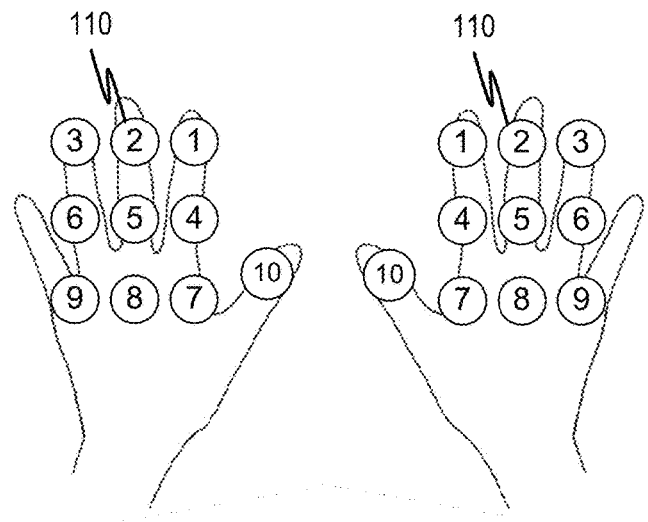
Figure 3C:
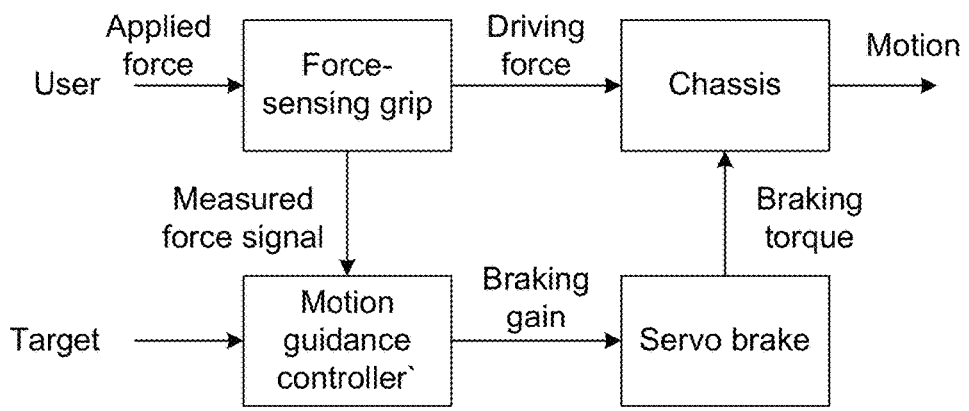
FIG. 3C shows the parts of the mapping of the force sensors of the grip handles of FIG. 3A to parts of a user's hands.

FIG. 3A shows a distributed force sensor on a grip handle of the walk assist robot of FIGS. 2A and 2B. Referring to FIGS. 3A and 3B, multiple individual force sensors 110 (numbered 1-9) are arrayed on each grip with hand placement relative to the force sensors being indicated in FIG. 3B. FIG. 3B shows the parts of the mapping of the force sensors FIG. 3A to the parts of a user's hands. FIG. 3C shows the parts of the mapping of the force sensors of the grip handles of FIG. 3A to parts of a user's hands.

Figure 4A:
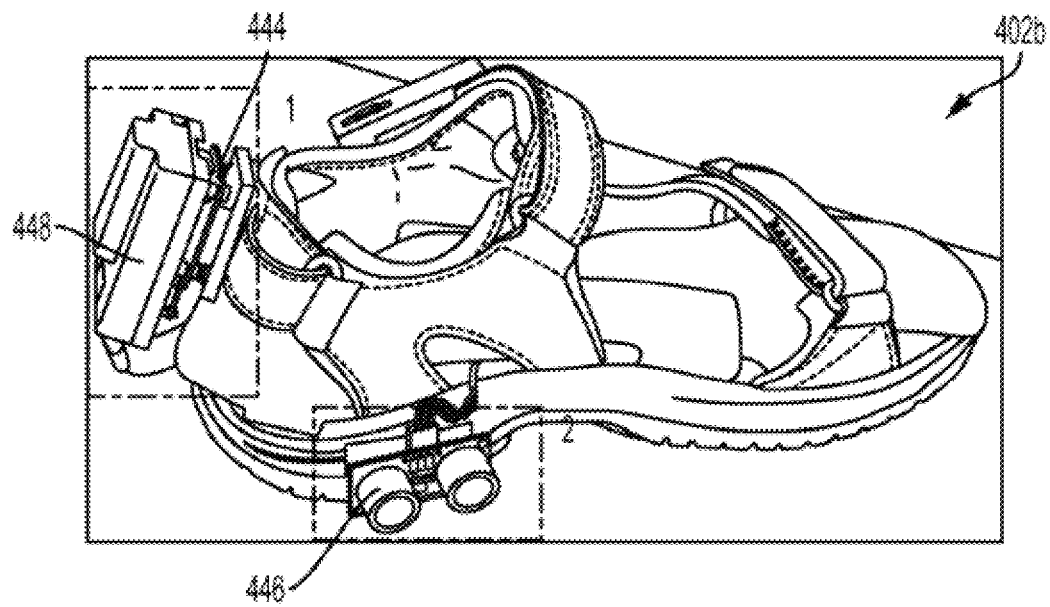
FIGS. 4A through 4D show various images and details of Sole sound instrumented footwear.
Figure 4B:
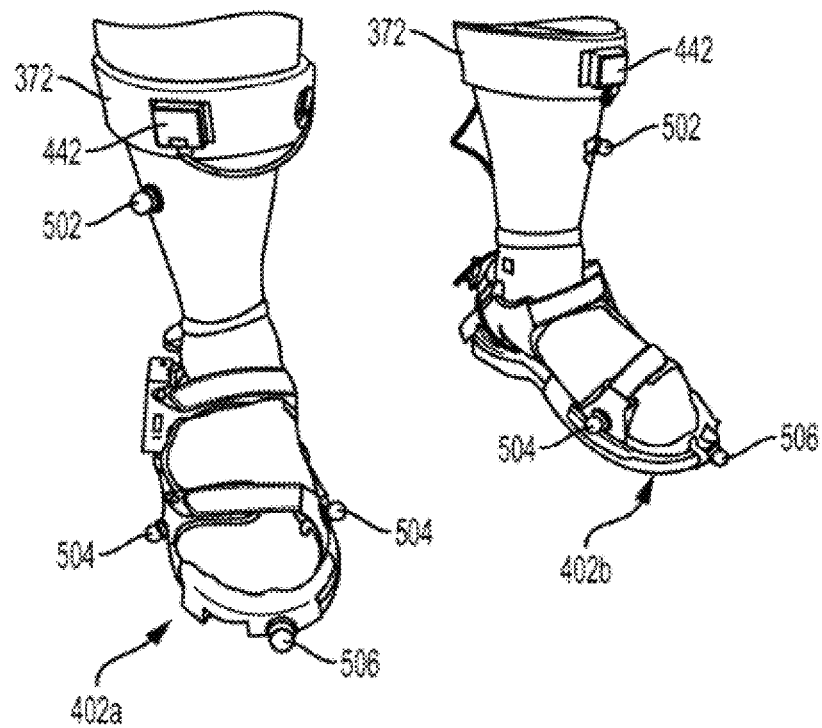

A system (called "Sole sound") may combine a walker as described above, for example, with additional inputs and feedback provided by shoes that characterize spatiotemporal gait parameters. FIG. 4A shows a prototype of Sole sound instrumented footwear. FIG. 4B shows layout of the components of the components embedded in Sole sound. Sole sound is described in US Patent Publication US 2017-0055880, which is hereby incorporated fully by reference in its entirety herein.

Figure 4C:
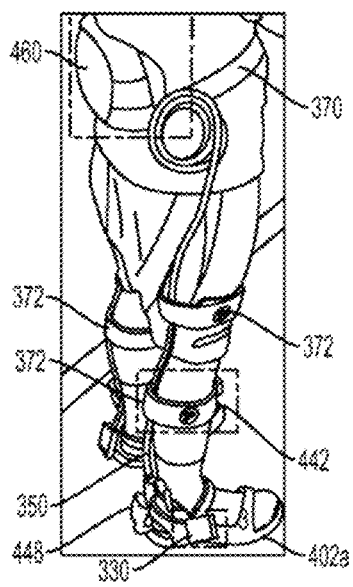
Figure 4D:
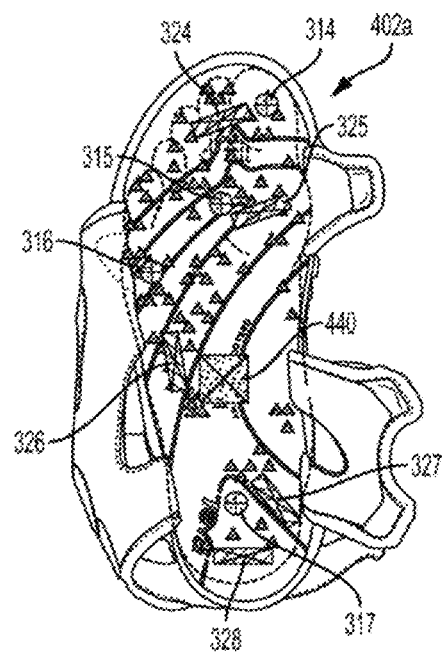

FIGS. 4B-4D show various views of a Sole sound footwear. Tracking was performed using reflective markers as shown in FIG. 4B. FIG. 4C shows the system as worn by a subject. FIG. 4D is a bottom view of the system.

Figure 4E:
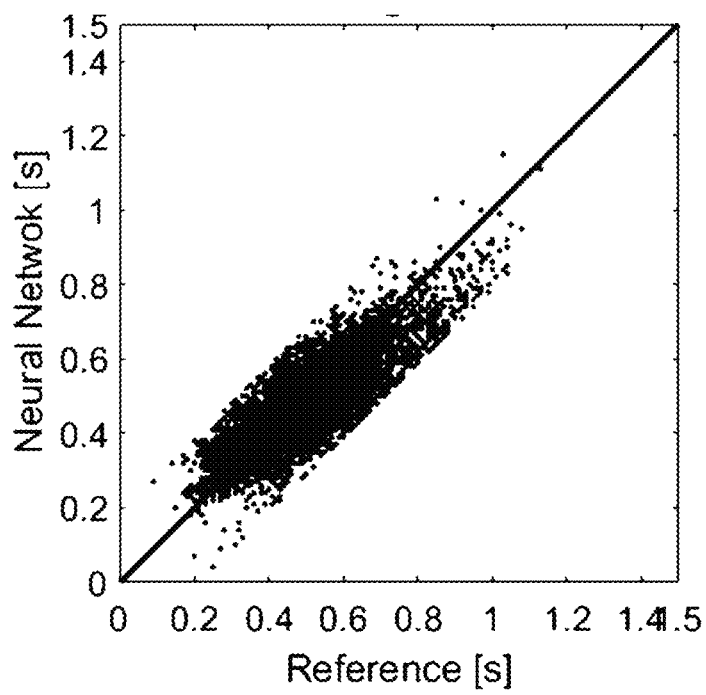
FIG. 4E shows a result of an application of a convolutional neural network on data collected with Sole sound. Sole Sound is described in patent application publication. US20200000373A1 which is hereby incorporated by reference in its entirety herein in its entirety herein.

FIG. 4E shows a result using convolutional neural network where data from 150 elderly subjects collected with Sole sound was used to train a network that identifies gait parameters in near real-time.

Figure 6K:
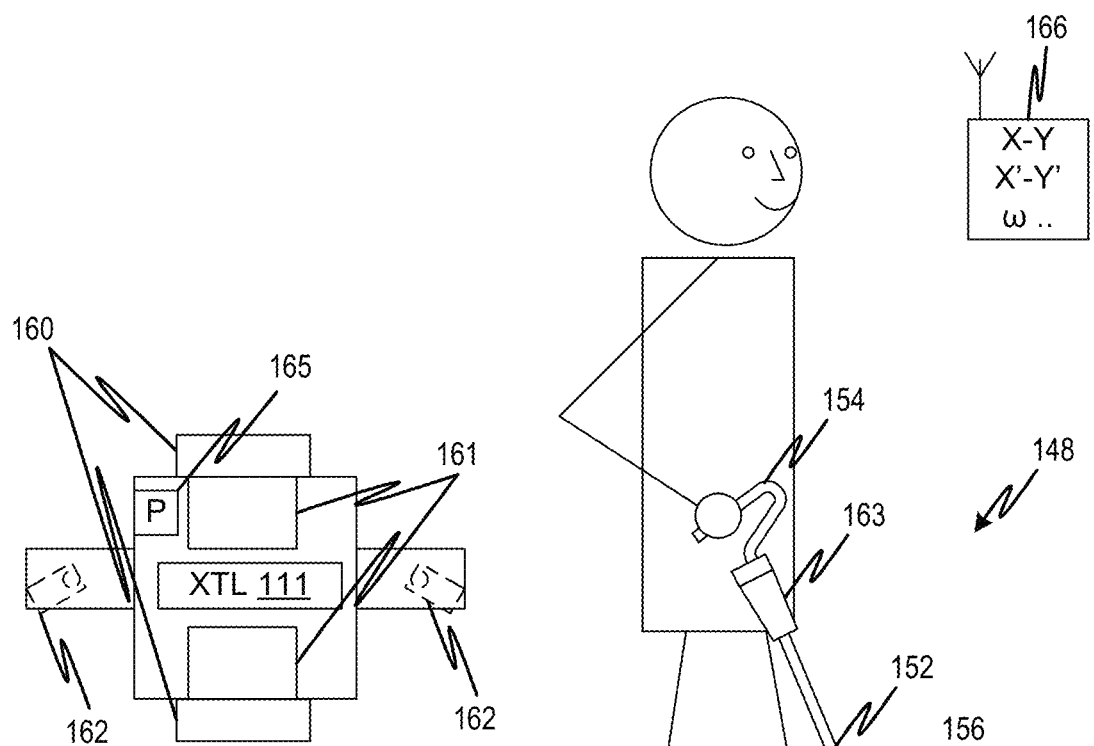
FIGS. 6A and 6K show a support assist robot, according to embodiments of the disclosed subject matter.
Figure 6A:
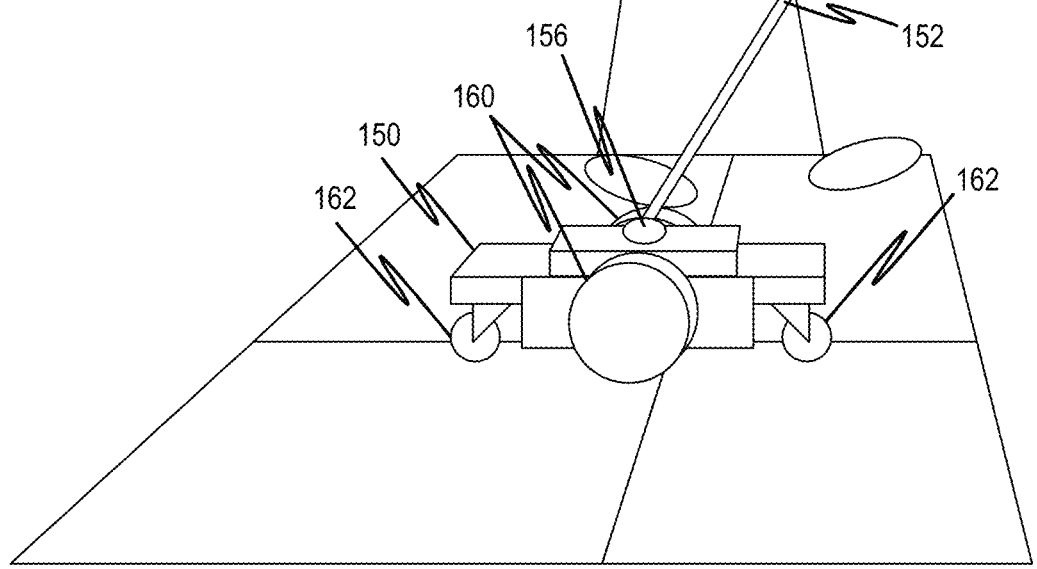
Figure 6B:
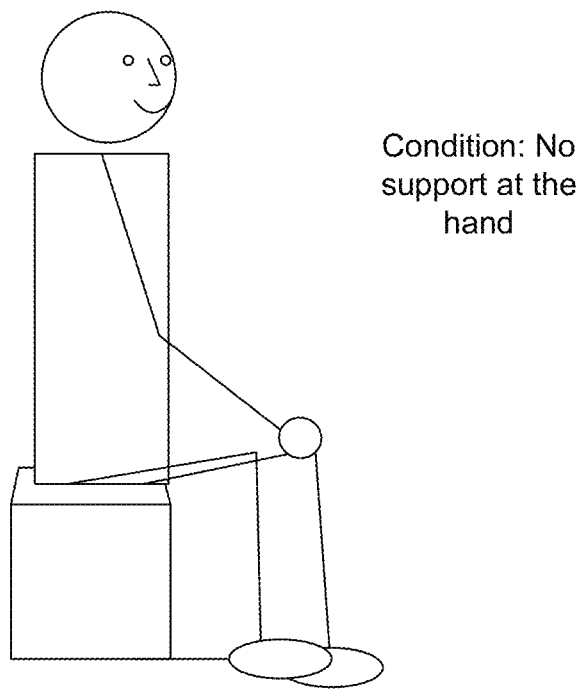
FIGS. 6B through 6H and 6J show images relating to a study of support experiments using various assist devices.
Figure 6C:
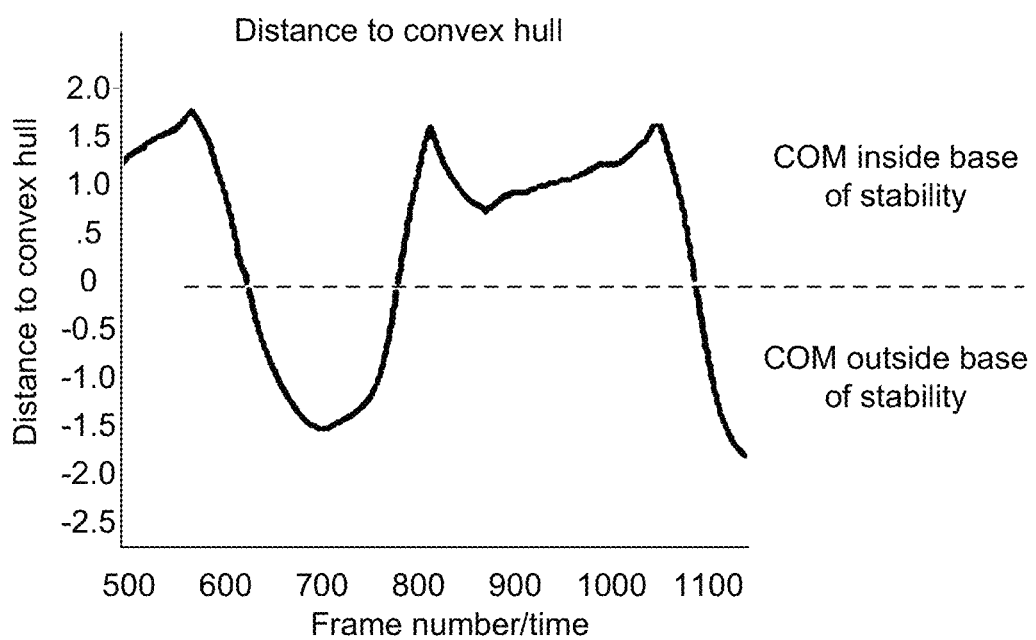
Figure 6D:
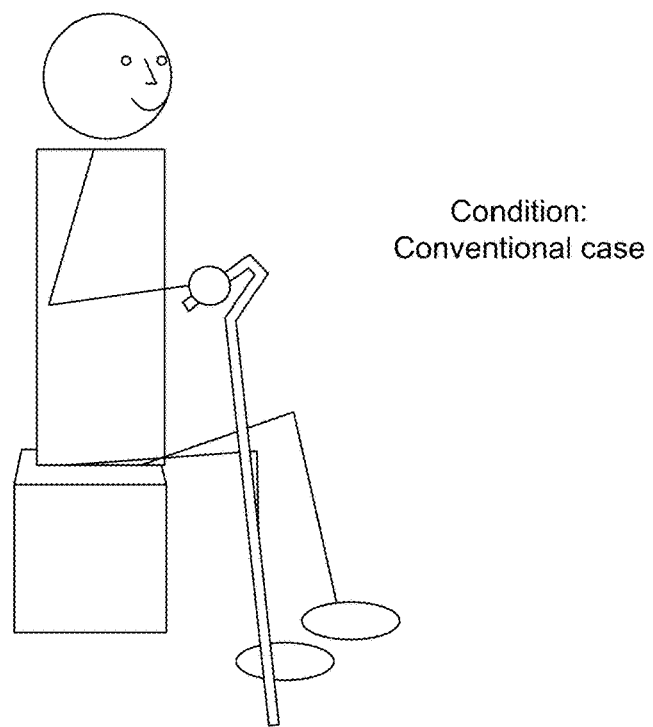
Figure 6E:
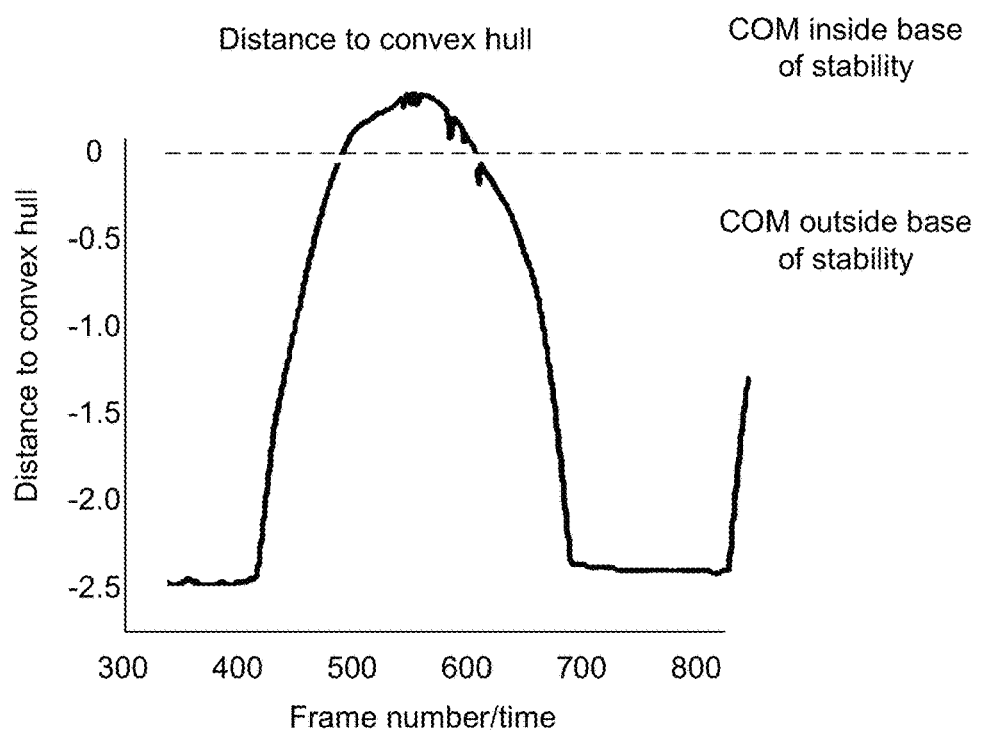
Figure 6F:
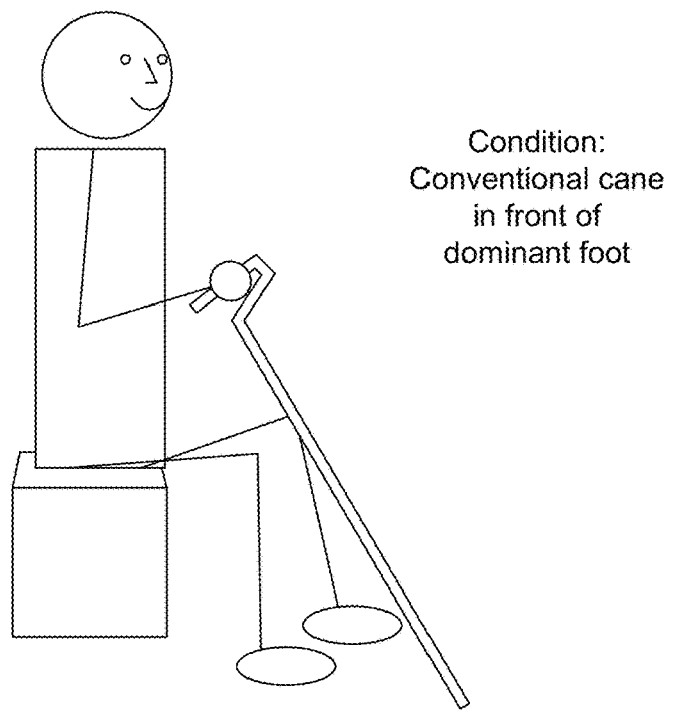
Figure 6G:
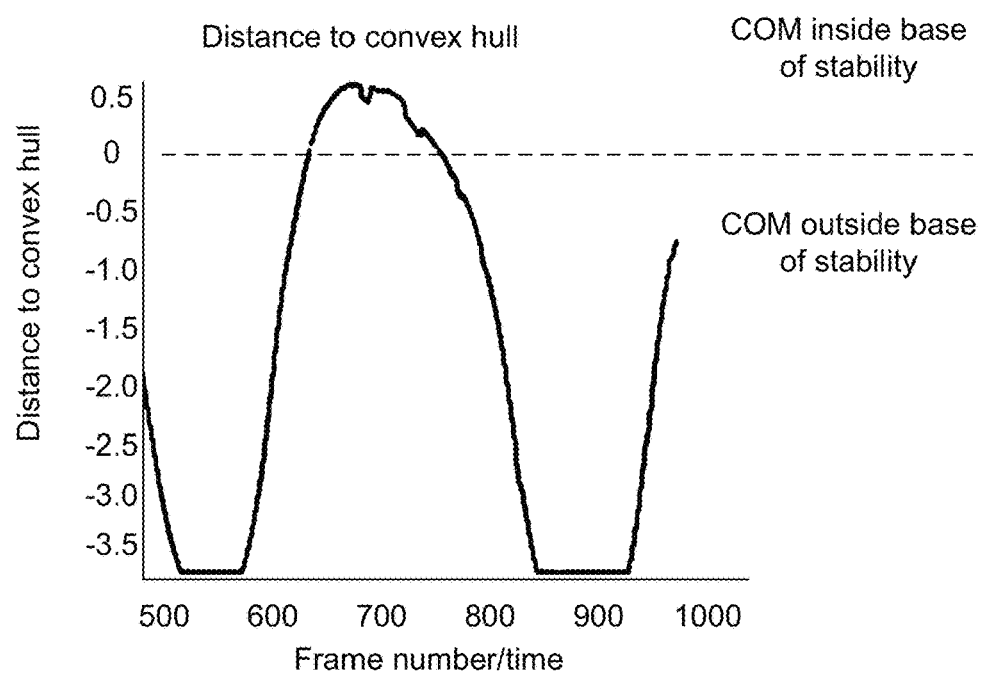

Referring to FIGS. 6K and 6A momentarily, for example, if the user is repeatedly showing indications of imbalance, for example, as indicated by protected (greater than a stored threshold in the controller 111) periods where weight is placed asymmetrically or if the gait is erratic (falls outside a pattern range for normal gait in terms of wait sharing between feet) then the system is respond by providing greater pushing or pulling resistance through the motorized joint 156 in the robotic arm 152.

Figure 5A:
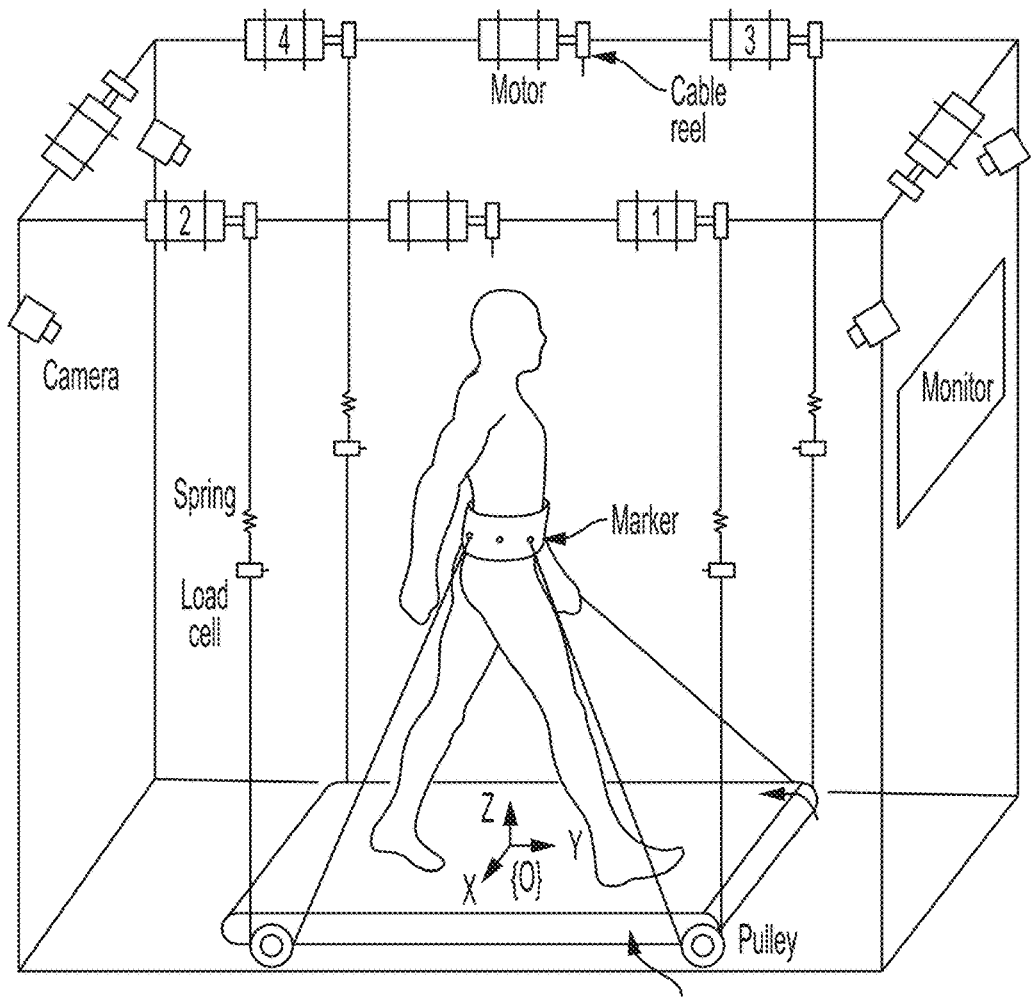
FIGS. 5A and 5B show two types of pelvic assist active therapy matter.
Figure 5B:
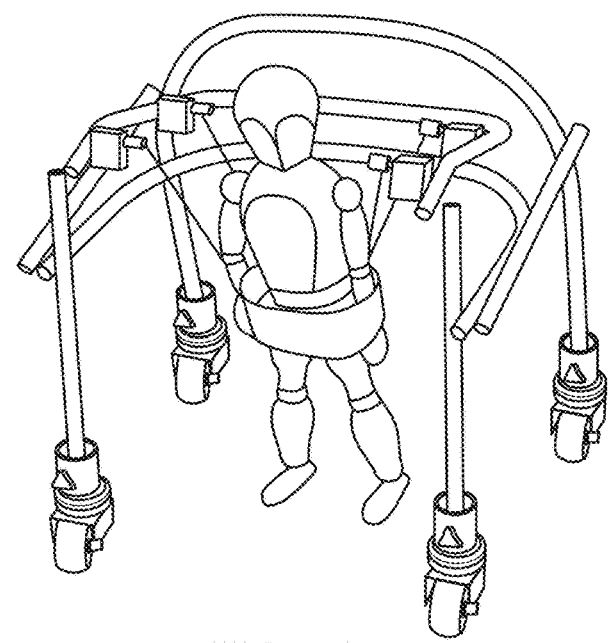

FIGS. 5A and 5B show respective a cable-driven system, called Tethered Pelvic Assist Device (TPAD) described in the foregoing reference. FIG. 5B shows another cable-driven system, called Tethered Pelvic Assist Device (TPAD). This system is disclosed in US20170027803 incorporated by reference above.

FIGS. 6A and 6K show a support assist robot, according to embodiments of the disclosed subject matter. FIGS. 6B through 6H and 6J show images relating to a study of support experiments using various assist devices.

Figure 7:
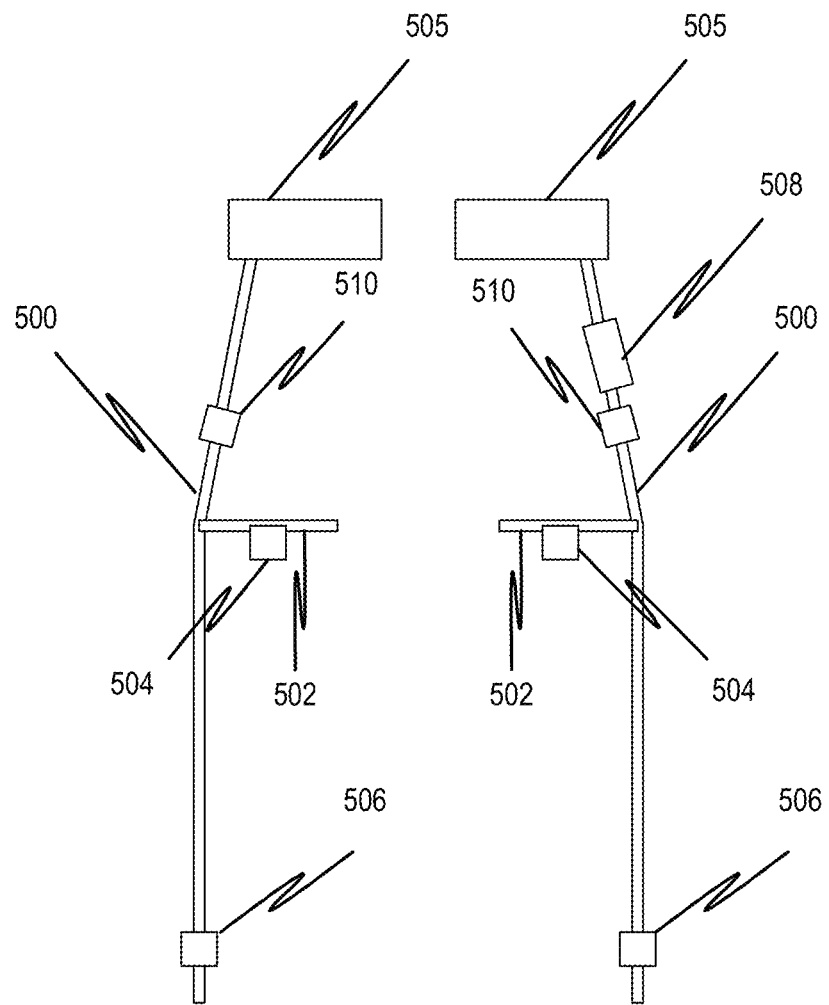
FIG. 7 shows instrumented forearm crutches.

FIG. 7 shows instrumented forearm crutches.

Figure 8D:
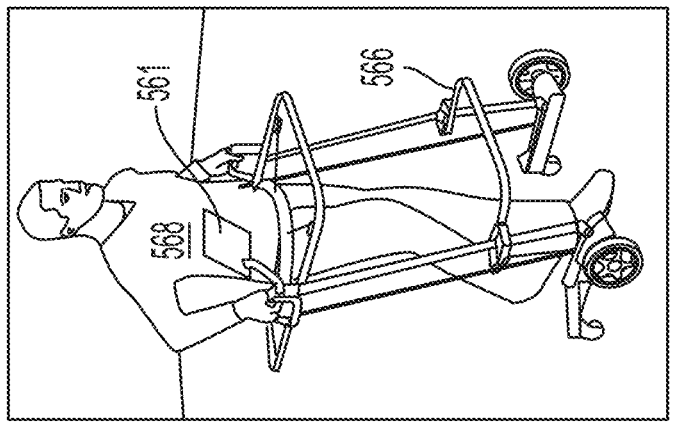
FIGS. 8A through 8E show configurations of different assistive devices that may be created from a shared set of modules.
Figure 8C:
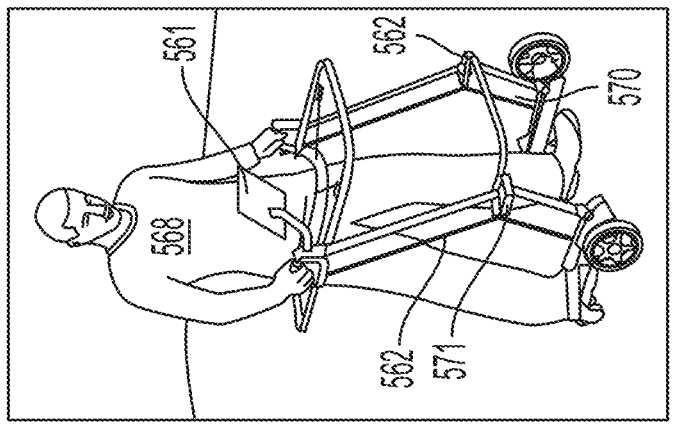

In FIG. 8D, a pelvic assist element is added to the disclosed walker.

US Patent Application No. 20170027803 to Agrawal, et al, hereby incorporated by reference in its entirety herein.

FIGS. 6A and 6K show that among embodiments of the disclosed subject matter is a robotic walking assistant 148.

A Wi-Fi-capable microprocessor (e.g., Particle Photon which was used in the described experiments) 165 wirelessly receives position and velocity data of a person moving in the environment. Position and velocity data may be acquired and transmitted by a variety of know devices, collectively indicated at 166, for example accelerometer, radio-triangulation, encoder-suits, and Vicon infrared tracking system, the latter having been used in the present experiments. It will be understood that options for position and velocity acquisition do not necessarily need to be performed by a separate device as suggested by 166 and may be transmitted to the walking assistant 148 by alternative means. For example, an accelerometer-based device that tracks multiple degrees of freedom can convey this information by wire. The microprocessor implements a procedure for person-following to control the motion of wheels. A two degree-of-freedom planar robotic arm 152 is strong and light weight, for example, bamboo, tubular aluminum or butted steel, or carbon fiber tubing. Servo motors on the joints 156 control joint angles. Other types of drives may be used, for example stepper motors. Each motor may have the capability of control either in position or torque mode. A force-torque sensor 163 is positioned at the handle 154 to indicate a force along the axis of the arm 152 top part and the torque thereabout. Other types of force sensing arrangements are also possible such as cartesian with a high number of degrees of freedom, pressure sensors on the handle 154 to detect the pressure of the user's hand. These types of force sensing arrangements can be resolved into equivalent signals for control using techniques known in the art.

Figure 12:
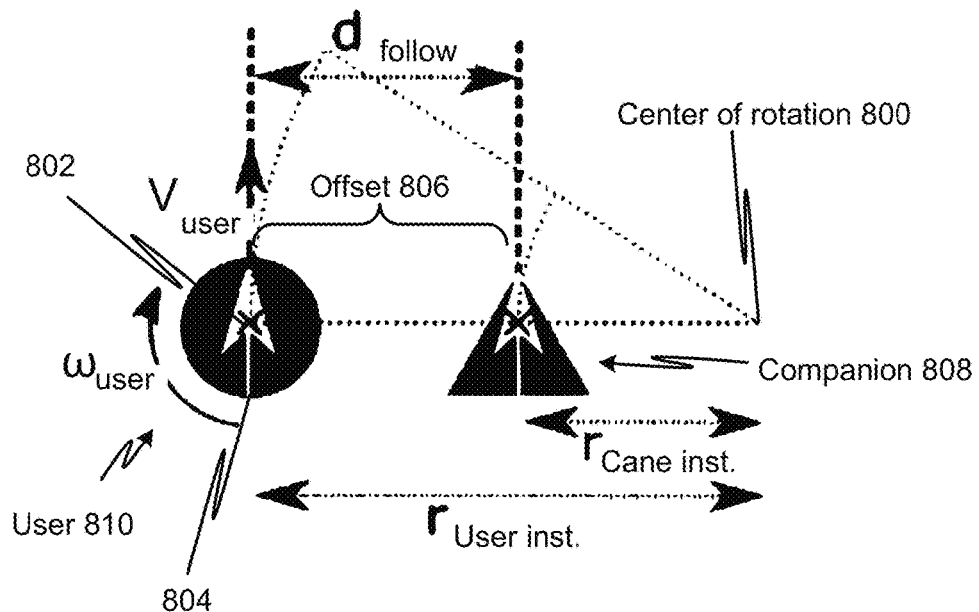
FIG. 12 shows a schematic of a following algorithm example for an assistive device embodiment.

Referring to FIG. 12, a side-by-side autonomous following algorithm is illustrated as a schematic of a simple autonomous person and companion as they move as if they form a rigid body with an instantaneous center of rotation. In this algorithm, the human moves and the robot follows him. Thus, the human 568 and the robot companion 560 (See FIG. 8A) move together as if they form a rigid body with an instantaneous center of rotation 800. Given the planar translational speed of the pelvic center 802 of the user and rotational speed of the pelvis normal 804 to this plane, one can identify the instantaneous center of rotation 800. Once a desired offset 806 of the companion is chosen by the user, the controller computes an instantaneous translational velocity of the vehicle center. Its angular velocity stays the same as the user. Additionally, an error-based controller, for example implementing a path planning algorithm, may prevent the accumulation of error. An algorithm was simulated for a sinusoidal user trajectory and the results showed no error accumulation and close following behavior.

In embodiments, the companion may receive the parameters needed to implement this control algorithm from a Vicon camera system. As discussed elsewhere, other position and orientation systems may be used such as accelerometers attached to the user. Algorithm modifications must be made to account for sensor noise and delayed actuation, two significant challenges for real time person following.

Figure 6H:
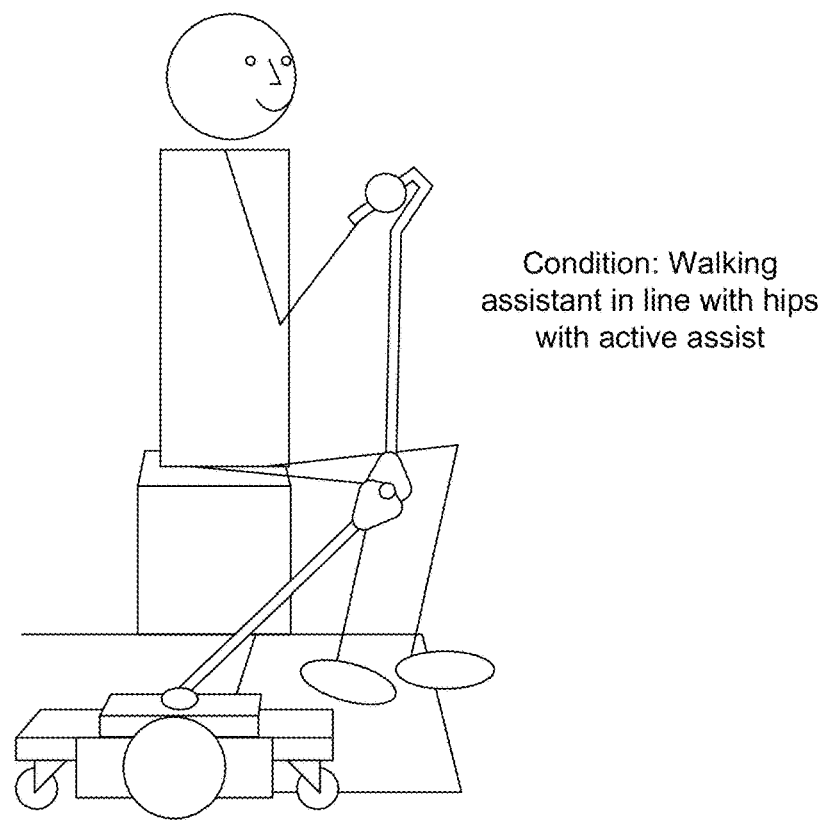
Figure 6J:
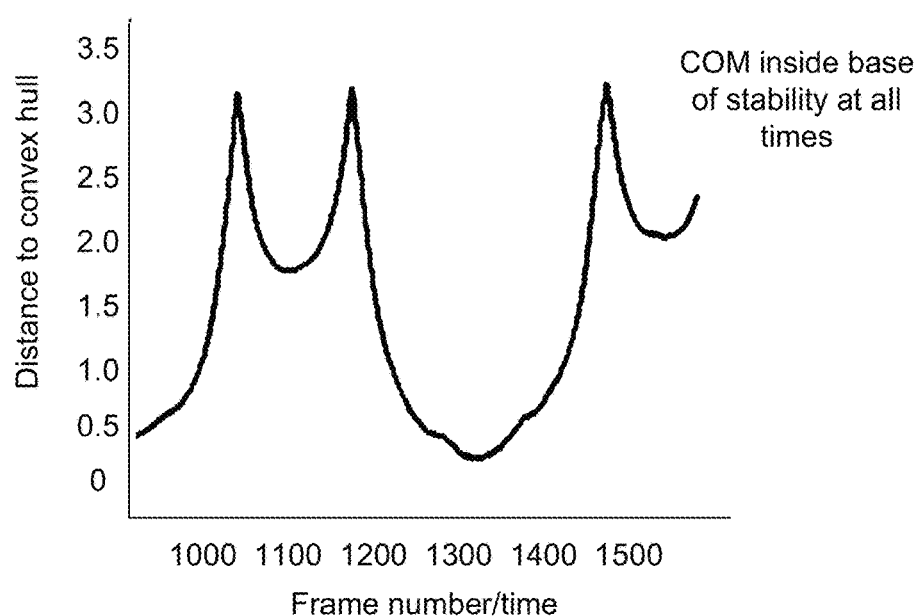

Experiments relating to measure of stability during sit-to-stand are now described. A study was performed with healthy subjects to understand how the margin of stability changes under different conditions as a user stands up from a chair with and without support of a cane. The margin of stability may be defined as the smallest distance between the projection of the center of mass on the ground and the boundaries of support polygon, formed by the convex hull of the two feet and the cane on the ground. The margin of stability was measured by placing reflective markers on the human body (arms, legs, pelvis, and the trunk) and the cane which are tracked using a Vicon motion capture system. The experiment was performed under four different conditions, as shown schematically in FIGS. 6B through 6H and 6J. These conditions were: (i) The subject gets up from a chair without any support at the hand (FIGS. 6B and 6C), (ii) The subject uses a conventional cane with its handle adjusted to the pelvic height when standing. The foot of the cane is placed in line with the outer arch of the dominant foot (FIGS. 6D and 6E), (iii) The subject uses the same conventional cane in (ii), but placed in front of the dominant foot (FIGS. 6F and 6G), and (iv) The subject uses the walking assistant placed to the right in line with the hips and the grip handle height adjusts continuously to the height of the pelvic center during standing up (FIGS. 6H and 6J). FIGS. 6C, 6E, 6G, and 6J show the respective minimum distance of the center of mass (COM) to the base of support polygon for each of the conditions illustrated in FIGS. 6B, 6D, 6F, and 6H. This means that a value of 0 at time t indicates that the center of mass (COM) is lying on an edge of the support polygon.

The upper portions (labeled) of each graph show when the COM is outside the base of stability, while the lower portion of each graph represents when the COM is inside the base of stability except for the last case where the COM is always in the base of stability. For case (i), while sitting, the COM is outside the support polygon and the subject must accelerate the COM between the feet to enter the support polygon. For cases (ii) and (iii), the subject's COM enters the support polygon later in the transition from a seated to standing position. This could be due to having an extra point of support. The center of pressure under the feet needs to be studied to understand how the crutch changes the shift of weight while standing and the forces exerted on the cane. In case (iv), the COM is always contained within the support polygon. The center of pressure would also need to be studied as the interaction forces between the user and the intelligent cane changes.

Referring to FIG. 7, instrumented forearm crutches 500 with upper arm supports 505 are shown FIG. 7. Instrumented forearm crutches 500 with upper arm supports are shown. The crutches 500 have vibrotactile feedback transducers handles 502. The transducers 504 indicate to patients if they are distributing their weight improperly between their limbs and the crutches. Force transducers 506 in each crutch 500 generated signals provided to a controller processor 508. The force transducers may provide indication of linear (axial) force or may indicate further degrees of freedom such as detection of forces in one or more axes. The controller 508 may communicate with both feedback transducers 504 which may generate an audio or tactile output, for example, a vibration. The crutches 500 provide a safe mechanism for monitoring and alerting the user if he is not distributing his weight bearing properly. The system is fully-portable and estimates 3D ground reaction forces at the tip of each crutch without relying on laboratory equipment such as force plates or a motion capture system. This allows the device to be used outside clinical laboratories. The instrument can help users appropriately modulate the amount of load applied to the legs during swing-through gait, three-point gait, and sit-to-stand using banded vibrotactile feedback.

The force transducers may include upper and lower portions in which one includes a load cell that measures the bending moment about two orthogonal axes while the other one measures axial forces. With point-contact between the crutch and the ground, these measurements are sufficient to estimate 3D ground reaction forces. The feedback transducers 504 may include small vibrating, next to or on the arm rest. An inertial measurement unit 510 enables estimation of the crutch orientation as well as the direction of the ground reaction forces. The latter may be used to compute the percentage of user's body weight ($BW\frac{3}{4}$) loaded on each crutch in real time by vector arithmetic. This percentage may be compared to a threshold stored in the controller 508 and determined thereby to fall within or outside an adjustable safe range. When falling outside the safe range, the vibrotactile cues (or other cues 17 such as audio) are triggered. Different vibrating modes may be defined to inform the user if more weight or less weight should be applied on the crutch. For example, dash-dot, dot-dot, fast-slow, etc.

Figure 8B:
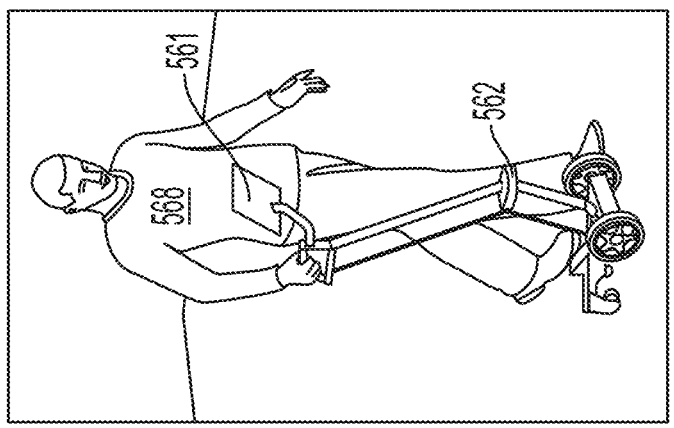
Figure 8A:
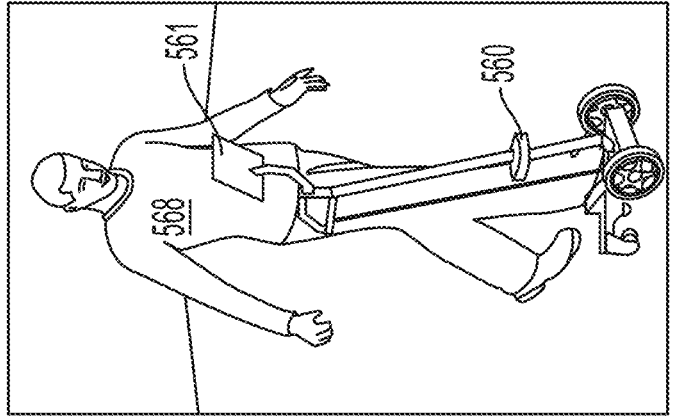
Figure 8E:
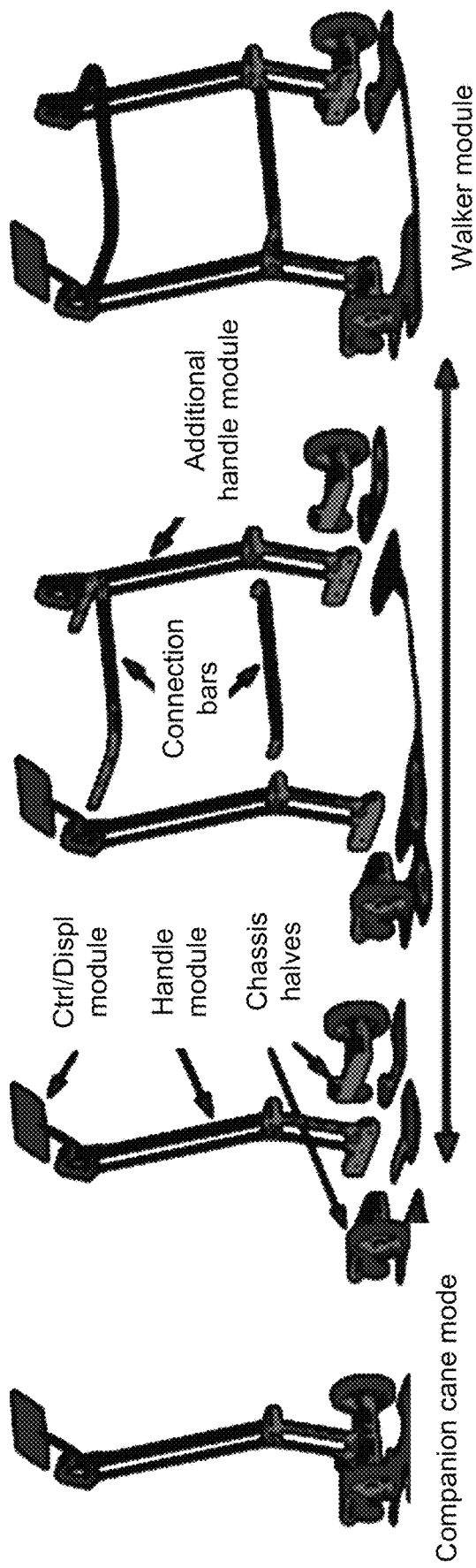
Figure 9:
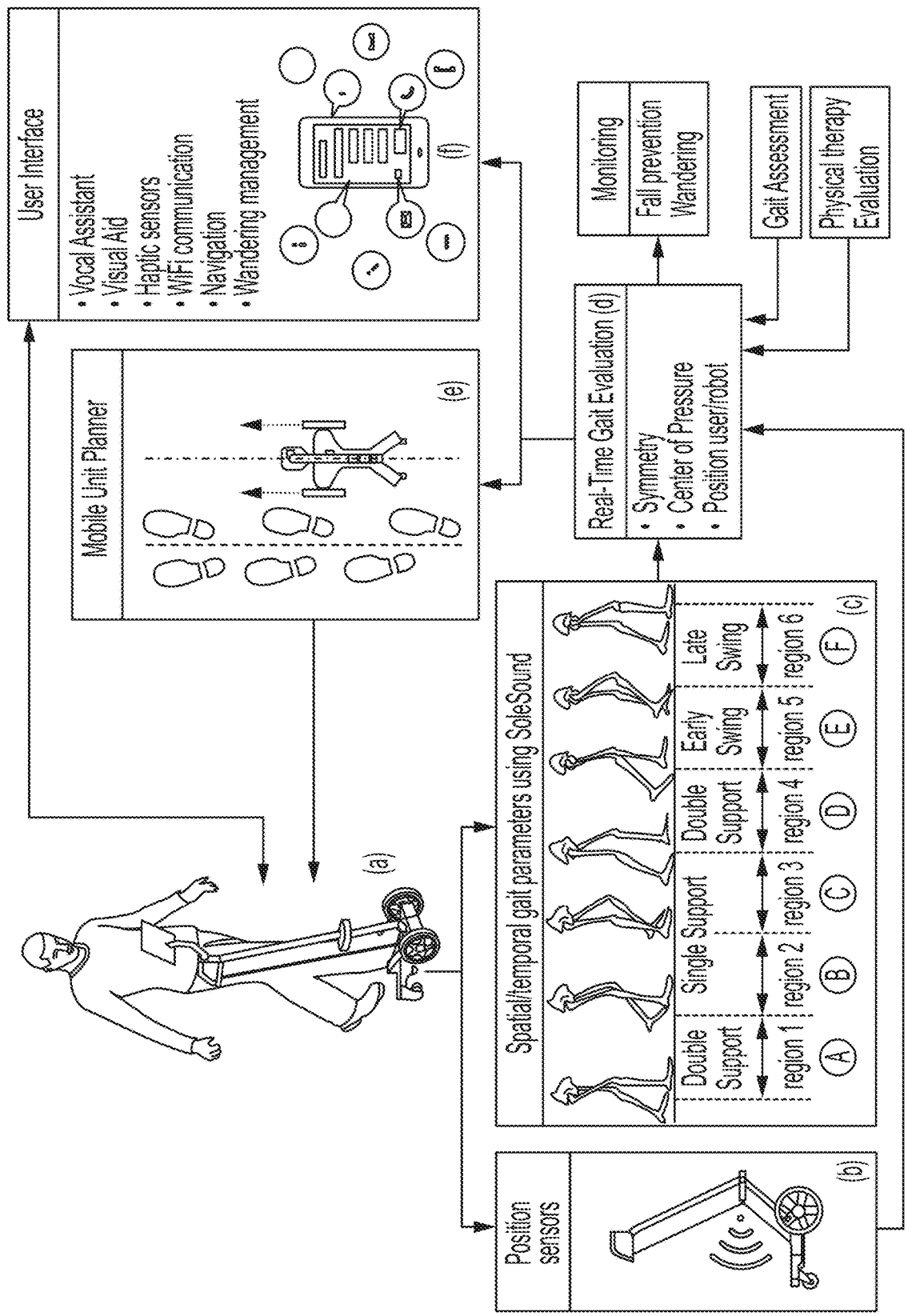
FIGS. 9 through 11 are diagrams for purpose of discussing control schemes of various assistive device embodiments, respectively.

FIGS. 8A through 8E show configurations of different assistive devices that may be created from a shared set of modules. Another mobile robot configuration is shown in FIGS. 8A-8D. The design is customizable to assist elderly people in their activities of daily life. FIGS. 8A to 8D show a configurable device. The system may be programmed to provide soft touch or active balance support, for example as described with reference to the embodiment of FIG. 6A. As indicated, the balancing cane 562. FIG. 8B, can be reconfigured into a 'walker' 570 by interconnecting two balancing canes 562 with two connection bars. FIGS. 9(a) to 9(f), show a companion 9(a) may synchronize its movement with the user based on data from instrumented shoes, body worn sensors, and/or device mounted sensors (b, e). FIGS. 10(a)-10(a) shows actuators on the arm of the cane may be used to apply appropriate forces on the user's hand. Elderly persons often compensate for reduced ankle power with higher hip flexion power. This affects the elderly both biomechanically and energetically.

For the pelvic assist variation, the control of the walker may be similar to the cane to regulate the center of pressure with respect to the base of support to augment stability (e, f, g). In addition, for users with gait impairments, a cable-driven pelvic support system may be added (a), which may be used for in addition, gait/balance assistance, retraining, as well as for fall prevention.

Safe and effective use of a cane or a walker during ambulation requires synchronizing device movement with the ongoing body movement.

The walking assistants may be networked with other walking assistants and personnel in the LTC facility. The disclosed embodiments may address issues that include (i) How to control the wheeled companion using sensed data from the user; (ii) How to control the wheeled mobile cane to facilitate and improve human balance; (iii) How to augment human balance using a walker with cable-driven pelvic assist device; (iv) How to continuously evaluate and improve the design with user inputs; (v) How to make these ubiquitous assistants for millions of elderly people.

The embodiments may be used for: (i) individuals who are able to ambulate independently but require supervision during walking due to cognitive decline, (ii) individuals who require intermittent manual assistance in balance and coordination, (iii) individuals who can walk but have substantial mobility impairments due to neurological conditions, e.g., stroke.

According to embodiments, a system is customizable to take different forms to accommodate the specific needs of a user as (a) a companion robot, (b) an intelligent cane, or (c) a walker with active pelvic interface. The simplest mode is the companion mode where the walking assistant follows the user. The device is used for guidance, monitoring, and communication. In the cane mode, the system can provide touch or active support to enhance balance. If the user needs active pelvic support during walking, this is provided in the third mode.

The 'companion' and 'intelligent cane' consist of a wheelbase, an articulated handle, and a control/display. Each wheel module includes motors to actuate the drive wheels. A tested embodiment used two drive wheels and passive caster wheels for stability. Future designs will also explore holonomic wheelbases. An articulated handle has a serial chain with two motors. Future designs will explore a chain with additional degrees-of-freedom to position and orient the handle in a desired way relative to the user. Two intelligent canes can be reconfigured into a walker by adding connection bars. The battery, data acquisition units, and computational electronics may be housed at the wheelbase to keep the center of mass of the system low to the ground. The display will include a screen for communication and user feedback. The system will receive information from the sensors on the walking assistant and the human user. The walking assistants will coordinate their movements with respect to the user based on data from instrumented shoes, body worn sensors, and device sensors. Sole sound may be used to monitor temporal and spatial parameters of the user's gait. These data may be used to program and test different behaviors for human assistance and rehabilitation. The specifics of the three modes, research questions, and human evaluations are discussed in the following sections.

Figure 10:
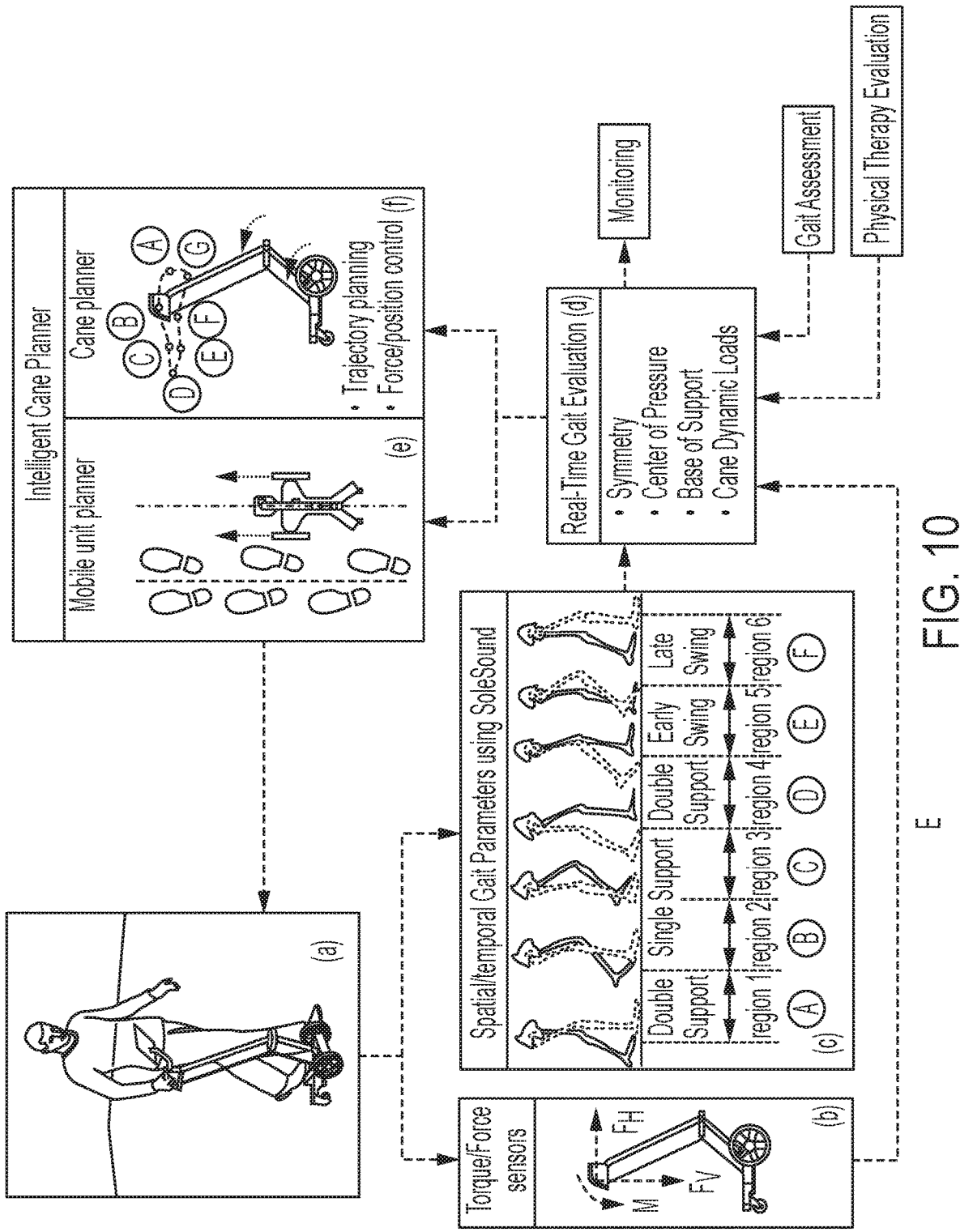
Figure 11:
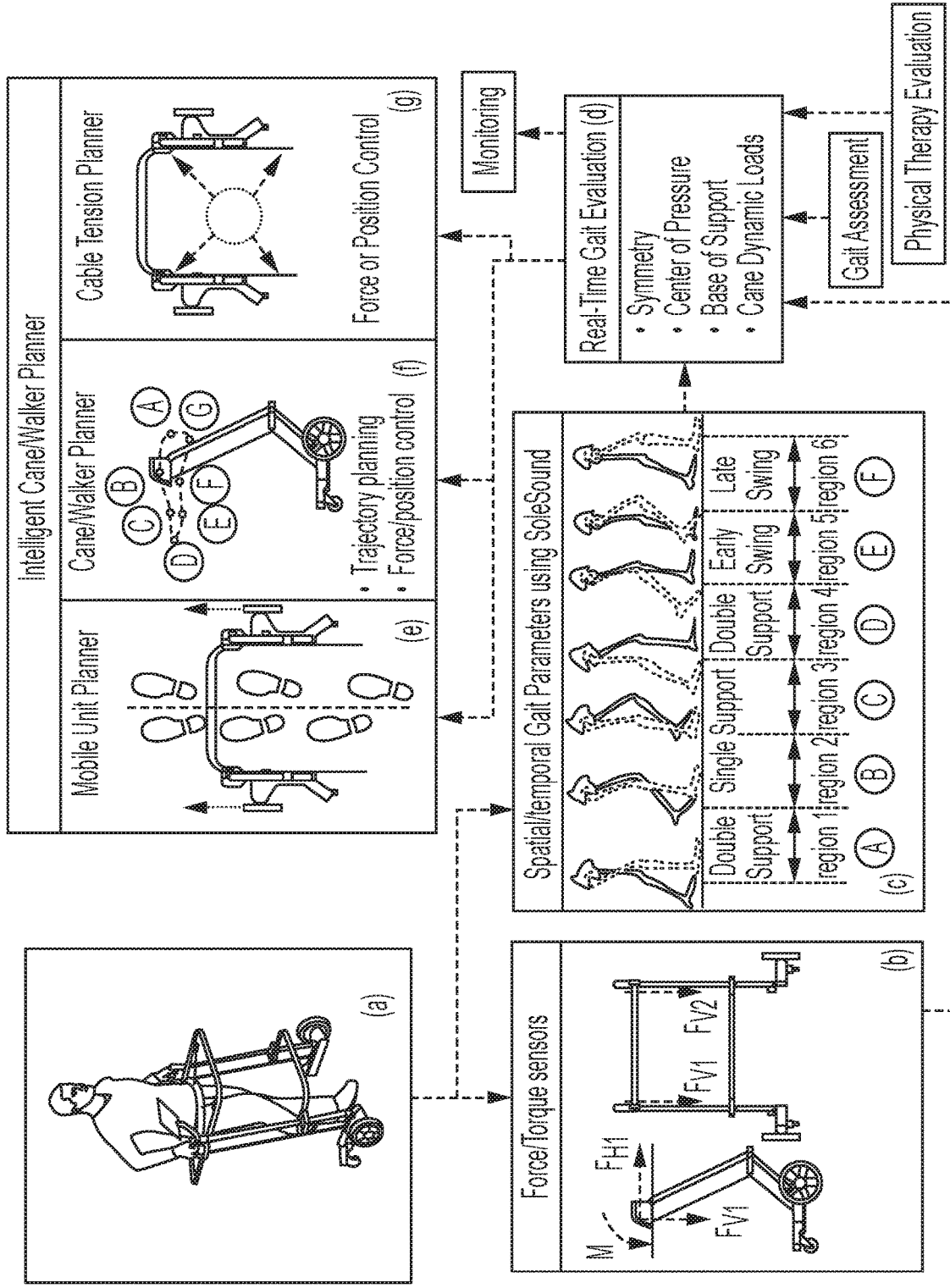

Referring to FIG. 10, the walking assistant may synchronize its movement with the user based on data from Sole sound, body worn sensors, and/or device mounted sensors. (B) This gait data may be evaluated and used for control of (F) a user interface in combination with: (D) a robotic companion, (C) an intelligent cane for balance enhancement, and (E) a pelvic supporting walker for assistance and rehabilitation. Gait data will also (A) be stored in the cloud to inform the user, caregivers and the user's primary care physician about the user's health and mobility.

Figure 13:
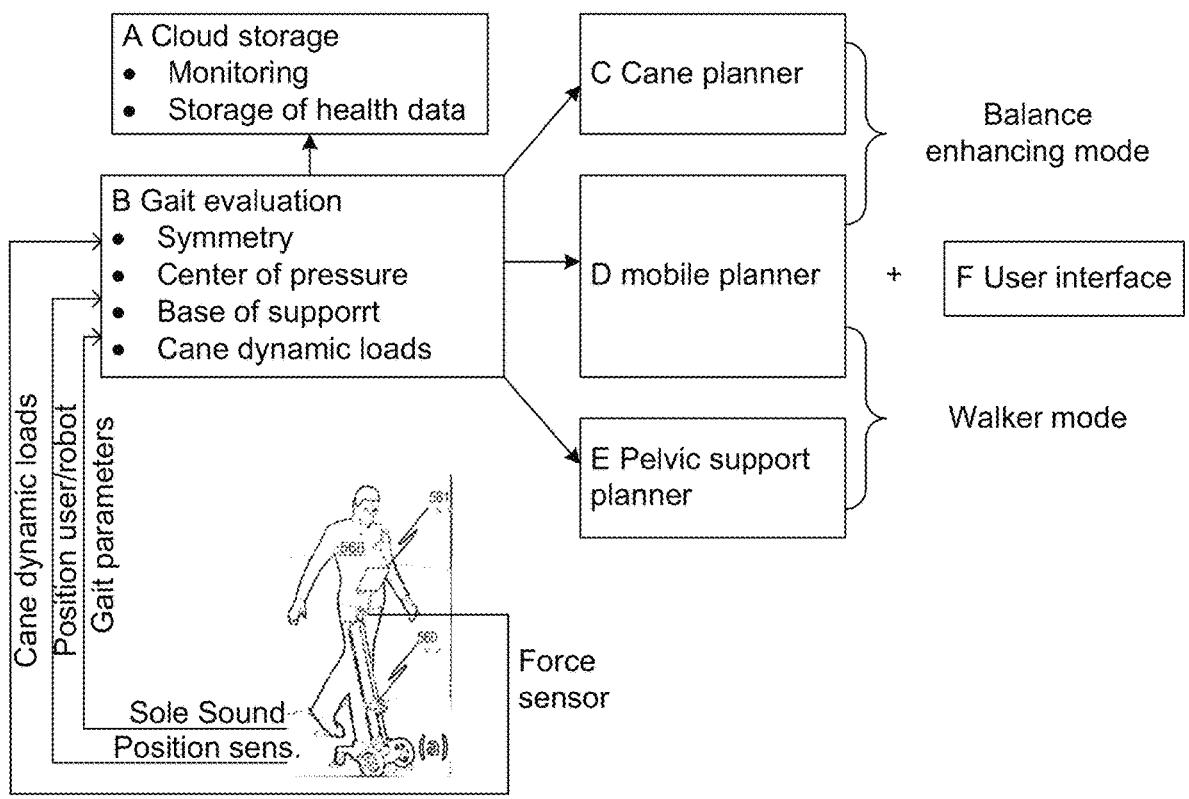
FIG. 13 summarizes a control and analysis schema according to embodiments of the disclosed subject matter.

The various assistive configurations may control using data summarized in FIG. 13 and the data may be used for analysis and characterization of the performance characteristics.

A companion can synchronize its movement with the user based on data from instrumented shoes, body-worn sensors such as IMUs, and device mounted sensors. Rich movement and behavioral data may be collected and analyzed. Summary information may be provided to the user, the user's support personnel, and the user's primary care physician about mobility and function.

In example applications, a user, in mid-stages of Alzheimer's disease, may take a walk within the grounds of a living facility. The user or a caretaker may select a desired walking path and distance on the companion embodiment's screen. The companion will then act as a guide—leading the user along the path while communicating and displaying information, as needed. Proximity and range sensors on the companion could complement body-worn sensors, including Sole sound. These sensors could measure and interpret movement and balance. The movement patterns could be analyzed for indications of wandering and cognitive decline. Appropriate feedback and alerts could be given to the user and monitoring personnel within the living facility. Data collected over a longer course of weeks could be analyzed to assess trends in decline of balance and control to facilitate detection of disease milestones.

The sensing methods may detect user position relative to the companion using combined data from LIDAR, Sole sound, and body-mounted IMUs. These methods may be extended to estimate relative foot position within the base of support. An Extended Kalman Filter and kinematic biomechanical model approach utilizing data from Sole sound and from the companion's position sensors, allows an estimate of base of support. The base of support may provide real-time application of forces for gait modification. LIDAR systems may be used to evaluate silhouette of people performing different tasks. These capabilities may be applied in a mobile companion. A mobile companion according to any of the embodiments may capture and classify body position or activity of a user to provide an additional or primary input for selecting an assistance mode. Machine learning methods, such as recurrent and convolutional neural networks, may be employed to classify movement patterns during walking, for example to discriminate normal and unusual or irregular movements.

Classification results may be used to improve systems and for research. These data may be used to document subject characteristics, evaluate how cognitive resources impact user performance, and assess patient predisposition to falls. The data may be used for preventive clinical choices such as gait training. Recurrent neural networks have been used with Sole sound data to accurately identify gait cycle events such as heel strike, toe-off, double support, and the swing phase. These methods may be expanded during the course of this project. In addition, interviews may be conducted with clinical care personnel to identify what data sets in different contexts are needed for documentation and clinical management of subjects.

Using the simple scenario of getting up from a chair, stability can be addressed during this activity using the intelligent cane in multiple ways. When using a conventional cane, the resting point of the cane on the ground is static resulting in unnatural handle orientation and body kinematics during sit-to-stand. With the intelligent cane, its mobile base could be controlled during the transition from sit to stand to modify the user's base of support favorably. In conjunction, the position and orientation of the handle could be adapted to enable the user to modulate the posture while standing. The actuated joints in the cane could also be controlled to apply a desired force on the user's hand while gripping the handle. Anterior-posterior and medial-lateral forces can modulate the user's posture and center of pressure on the base. While walking, each of these methods can be adapted individually or in combination with others to improve the overall stability of the user.

The experiments that measured the body configuration during sit-to-stand motion for able bodied subjects was described above used Vicon motion capture system and reflective markers on the human body and the cane. This procedure allowed the computation of the base of support and the center of mass of the system. Other embodiments are possible. For example, pressure mats, force plates, and instrumented shoes, accelerometers, video camera with video-recognition systems such as used for security surveillance may also be employed. For example, processing image streams from one or more cameras in the assistant device may be enough to provide sufficient discriminating power to distinguish the relevant conditions. Radio transponders worn by the user may permit the user's body configuration by triangulation. In the above example, such as a floor mat, the examples can be used to measure ground reaction forces and the center of pressure. It should also be clear that procedures for support may include modulating the wheel base or force control on the cane handle.

In embodiments, the center of pressure is actively measured in real-time and modulated to improve the stability. In the sit-stand experiment, only the vertical height of the handle was controlled while sensing the user's pelvic height. Other algorithms that utilize anterior and posterior pelvis motion may employed. Force field guidance, published in earlier patent applications and academic publications, is staple method for providing assist-as-needed assistive strategies in movement training and may be employed to form additional embodiments. For example, as indicated above, the motors may be used to provide variably-compliance support to a user based on the detected movement, body position, or action being taken.

Patients with stroke often have one-sided gait deficits, called hemiparesis. They walk asymmetrically and avoid loading the weak leg. Due to lack of use, over time the muscles in the weak leg further deteriorate. Many stroke patients undergo physical therapy in the clinic. Training programs have been proven successful if they include motor learning principles such as task repetition and task variability. Experiments have demonstrated effective gait retraining strategies in stroke patients using robotic exoskeletons for example, TPAD. TPAD may apply forces on the pelvis during the gait cycle when only the weak leg is in contact with the ground. This shifts the COM closer to the weak leg, strengthening the muscles over time. This fundamental control principle can be implemented by the intelligent walking assistant with the pelvic interface.

Currently, gait training and rehabilitation is performed in specialized clinics and rehabilitation centers. This fact, coupled with travel and time restrictions, limits patients' access to rehabilitation equipment and personnel. This not only limits the quantity of training sessions, but also the translation to daily activities. The intelligent walker, with active pelvic interface, could potentially provide unlimited access to an 'over ground' gait trainer. In embodiments, the disclosed methodology may be applied to stroke patients with hemiparesis and may further be extended with suitable control methods for patients with weakness in both legs.

In TPAD, certain control algorithms change the length of cables tethering the subject's pelvis to a fixed inertial frame while the subject walked on a treadmill. Providing assistive and/or training forces over ground using a mobile base may employ further algorithms to control of the walker base and determine the pelvis location and orientation relative to the moving coordinate frame of the walker.

The characterization of spatial and temporal gait parameters during normal walking and other activities in daily life is provided by Sole sound. Removable soft insert insoles may be provided to allow for data collection from individuals during walking and other daily activities. Data from Sole sound may be combined with data captured from a motion capture system and/or an instrumented gait mat to enhance therapies. Forces may be applied to each subject's pelvis to impact the gait.

An instrumented powered platform identified CANINE which stands for cane-like light-touch navigating device, an autonomous person-following robot that acts as a cane-like mobile assistant. By autonomously following the user, it can provide constant support throughout the gait cycle without the need for coordination or attention. Here, it is shown that proprioceptive feedback gained from light touch contact with CANINE may improve gait characteristics in healthy individuals experiencing visual perturbations.

Over-ground walking is an inherently unstable process that requires continuous feedback from the central nervous system. Sensory inputs, including visual, somatosensory, vestibular, and even auditory feedback, assist in correcting instabilities during gait. The term proprioception refers to the conscious and unconscious processing of feedback from the skin, joints, muscles, and tendons to ascertain a sense of the position and movement of the body. To approximate a patient with a balance impairment, virtual reality (VR) were used to create a destabilizing virtual environment (VE) for healthy subjects. The VE attempts to destabilize the subject by providing motion-discordant visual feedback. This forces the subject to rely on proprioceptive feedback gained from light touch support (LTS) with CANINE, as a mobility-impaired patient might. It was previously shown that visual perturbations in a VE could destabilize healthy subjects during over-ground gait, and the same VE in this study was. The present disclosure describes the effects of an autonomous mobile robotic light touch support on over-ground gait characteristics.

Control over virtual environments allows researchers to study visual reliance on gait adaptations by challenging balance control during walking. Concurrent or terminal visual feedback focuses on augmenting sensory feedback about the task, and has proven effective for motor learning and gait training. Visual perturbations, on the other hand, attempt to challenge the motor control system to adapt to discordant sensory feedback. Visual perturbations challenge visual overreliance that can occur in the elderly or people affected by stroke or vestibular disorder. These perturbations can elicit changes in step and center Somatosensory information obtained from the fingertips by applying a small, non-weight-bearing load to an object is a light touch cue. This cue can augment sensory feedback in both static and dynamic postural control systems and can compensate for somatosensory loss in subjects with diabetic peripheral neuropathy and impairment due to stroke. A light touch cue can reduce COP fluctuations in the coronal plane while in normal quiet stance and in the sagittal plane while in tandem stance. Light touch contact with a handrail can decrease stride width while walking on a treadmill. During treadmill walking, feedback from light touch can compensate for limited visual feedback and can be used to improve adaptation to unexpected disturbances, such as waist pull perturbations. Light touch feedback might then serve as a gait training tool that disrupts or challenges visual feedback.

Research on light touch feedback during over-ground walking is limited. Handrails, which restrict activity to a predefined path, have proven effective in increasing medio-lateral stability in challenging over-ground walking conditions. Stroke patients using a light touch cane achieved improvements in lateral balance as compared to using a weight bearing cane, but reduced their walking speed. Motion of the cane was coupled to the motion of the person, possibly making the light touch feedback less effective, as sway-referenced light touch supports in quiet stance do not decrease postural sway. In natural environments, a person-following robot could decouple the support point from the person and provide continuous feedback, but it would then introduce noise to the light touch cue due to imperfect tracking of the person. However, people may compensate for noise in light touch support contact points and can benefit from light touch cues sway-referenced along all but one axis. An autonomous robot may also reduce the cognitive load of using an assistive device, as ambulation coordination increases attentional demands. This can benefit people with impaired coordination as in stroke, Alzheimer's, and other neurological or neuromusculoskeletal disorders.

Figure 14:
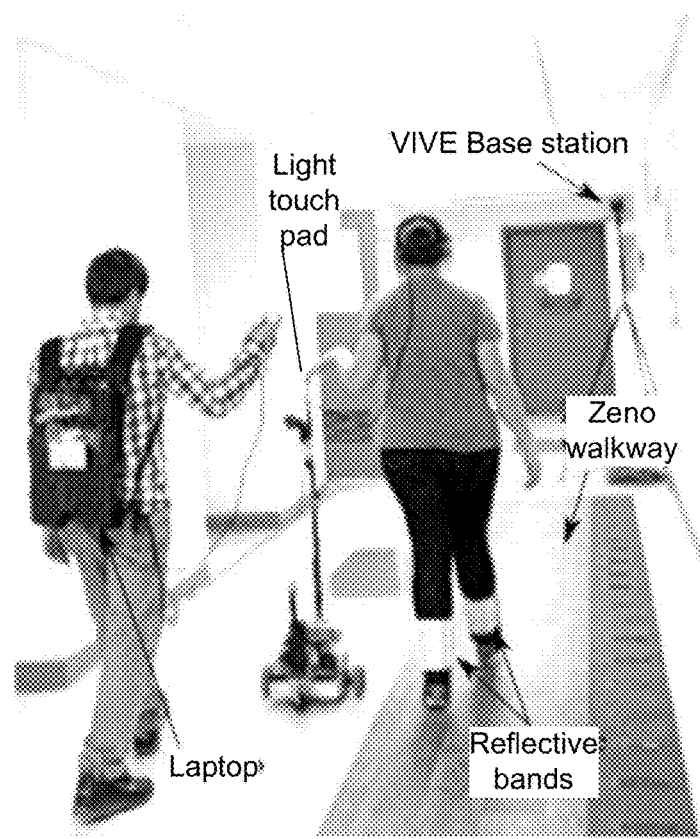
FIG. 14 shows an experimental setup with a subject wearing the VR headset and maintaining light touch contact with CANINE, according to embodiments of the disclosed subject matter.

CANINE includes a cane mounted at the front of a custom-built differential-drive mobile base (FIG. 14). Encoders in series with the drivetrain allow for robot velocity estimates (SRX Mag Encoder, CTR Electronics). A fingertip contact plate was installed at the top of the classic cane, 1.1 m from the ground. This fingertip contact plate was instrumented with a force sensor (Nano25, ATI Industrial Automation) to detect the forces exerted by the fingertips. A WiFi-enabled embedded device (myRio, National Instruments) was used to record the force/torque output at 100 Hz during each gait trial. This rate allows for full capture of motor reactions to visual stimuli, and has been used to study effects of light touch on postural sway.

A light detection and ranging (LIDAR) device (UTM-30LX-EW Laser Rangefinder, Hokuyo) was installed on the back of the base. The cane mounted LIDAR detects reflective bands around the participant's shins. LIDAR data are sent at 40 Hz to an onboard microcontroller (Raspberry Pi 3 Model B+, Raspberry Pi) which runs the person-following program. This sampling rate is sufficient to detect changes in gait, as healthy individuals walk at 1.9 Hz.

CANINE includes a cane mounted at the front of a custom-built differential-drive mobile base (FIG. 1 left). Encoders in series with the drivetrain allow for robot velocity estimates (SRX Mag Encoder, CTR Electronics). A fingertip contact plate was installed at the top of the classic cane, 1.1 m from the ground. This fingertip contact plate was instrumented with a force sensor (Nano25, ATI Industrial Automation) to detect the forces exerted by the fingertips. A WiFi-enabled embedded device (myRio, National Instruments) was used to record the force/torque output at 100 Hz during each gait trial. This rate allows for full capture of motor reactions to visual stimuli, and has been used to study effects of light touch on postural sway.

A light detection and ranging (LIDAR) device (UTM-30LX-EW Laser Rangefinder, Hokuyo) was installed on the back of the base. The cane mounted LIDAR detects reflective bands around the participant's shins. LIDAR data are sent at 40 Hz to an onboard microcontroller (Raspberry Pi 3

Model B+, Raspberry Pi) which runs the person-following program. This sampling rate is sufficient to detect changes in gait, as healthy individuals walk at 1.9 Hz.

CANINE's following distance was set at 0.55 m in the lateral (x) direction and 0.3 m in the posterior direction (y) to maintain a safe distance while ensuring fingertip contact. Prior to the experiment, the LIDAR was used to create a global map of the experimental area, which was then used to estimate person and robot heading. To determine the participant's location, the device first located the two reflective leg bands. These leg positions were averaged and used as an estimate for the person's location. The person's velocity was computed as the change in the person's position divided by the time elapsed since the last LIDAR sweep. Each LIDAR sweep generated x and y following errors, εx (m) and εy (m), in the robot frame based on distance to the desired robot position. By assuming that the person's velocity vector at time t represented their heading, the map of the environment was used to compute a robot heading error, θ equal to the robot's heading, θr (rad), subtracted from the person's heading, θp (rad), shown in Fig. The robot then traveled at the same velocity as the person in the same heading direction, with an added proportion-derivative (PD) controller. The velocity commands to the robot were $$\begin{bmatrix} v_y \\ \omega \end{bmatrix} = \begin{bmatrix} \|\vec{v_p}\|_2 + k_{p1}(\epsilon_y) + k_{d1}(\epsilon_y) \\ k_{p2}(\epsilon_\theta) + k_{d2}(\epsilon_\theta) \end{bmatrix} \quad (1)$$

where vy (m/s) and ω (rad/s) are the linear and angular velocities of the mobile base, vp (m/s) is the person's velocity, and kp1, kp2, kd1, and kd2 are the PD controller constants which were hand-tuned. These velocities were transformed into velocity commands for each wheel. In between LIDAR updates, encoder readings were used to estimate and update robot heading and position.

While validation of person-following positional error was not done with a secondary system, post-hoc analysis of LIDAR data tracking errors and the person position showed an average error of less than 0.1 m along the x- and y-axis.

Figure 15:
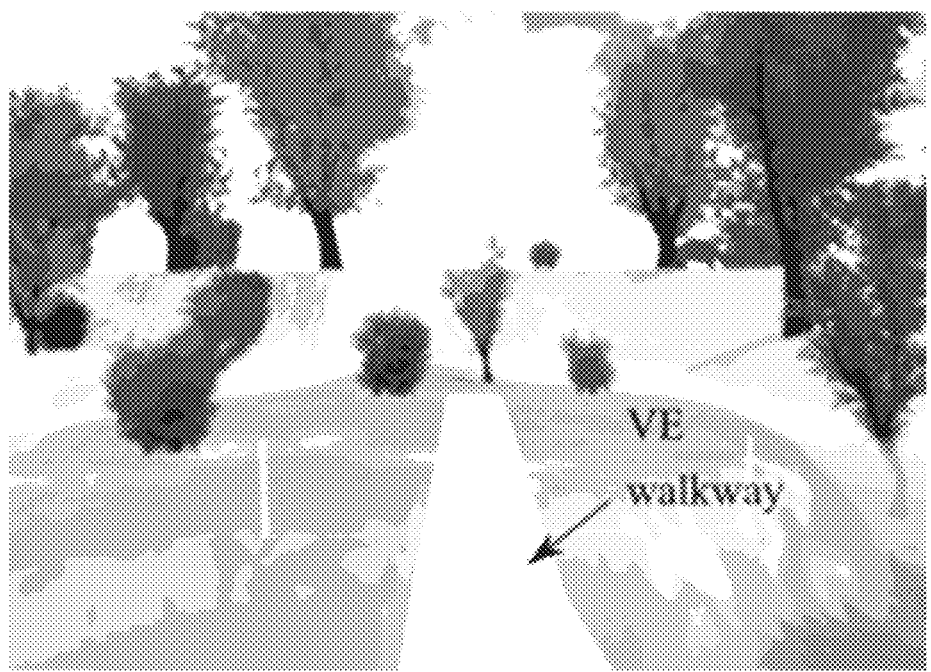
FIG. 15 scene from VR headset according to embodiments of the disclosed subject matter.

The VE displayed a virtual reality scene shown in FIG. 15 that was aligned and mapped one-to-one with respect to the physical gait mat. A 3D outdoor space was rendered in the backdrop; grass, trees, and clouds were placed to add realism and depth references. Perturbations were created by superimposing oscillations of the visual field on top of the normal scene.

Figure 17:
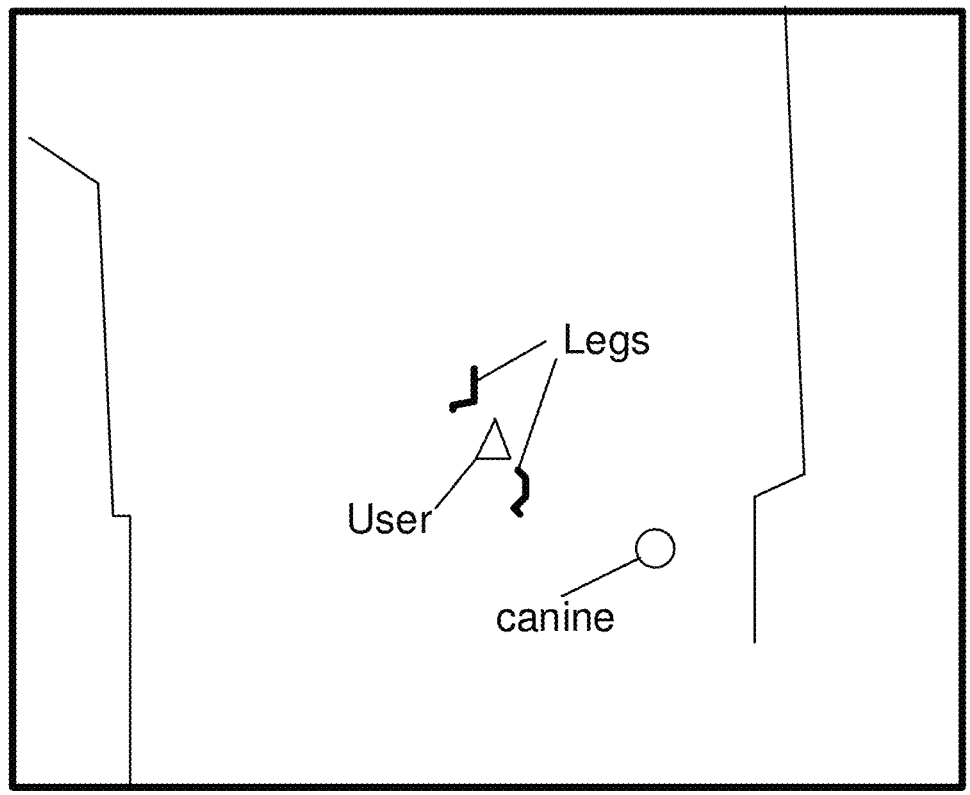
FIG. 17 is a global map built with CANINE LIDAR data with following robot.

FIG. 17 shows a visualization of the global map built with LIDAR data. CANINE (circle), positioned behind and to the right of the person's legs, generates an estimate of the person's location and heading (triangle). The scan was captured in a hallway.

Figure 18:
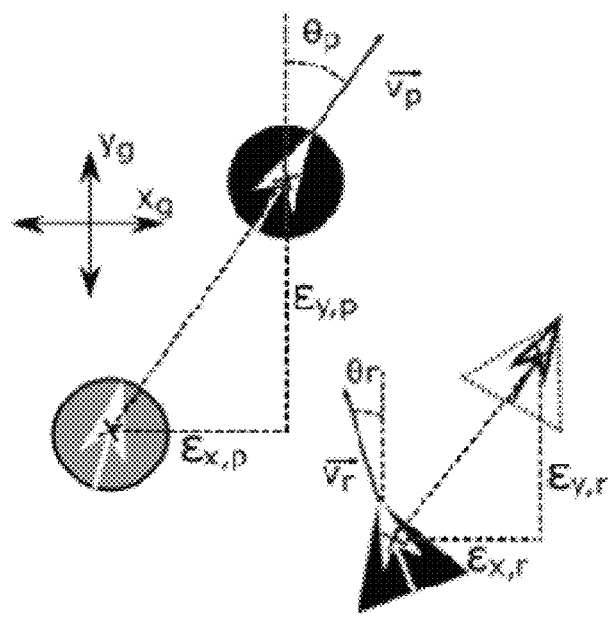
FIG. 18 CANINE (black triangle) periodically detects the position of the person (black circle) with LIDAR.
Figure 20A:
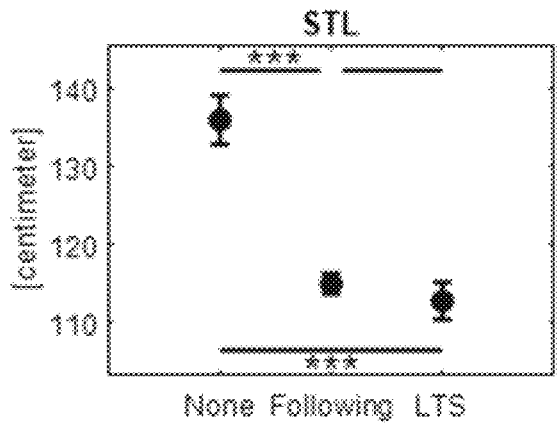
FIG. 20A-20F: differences in VE gait between walking without CANINE, walking with CANINE without LTS, and walking with CANINE with LTS.
Figure 20C:
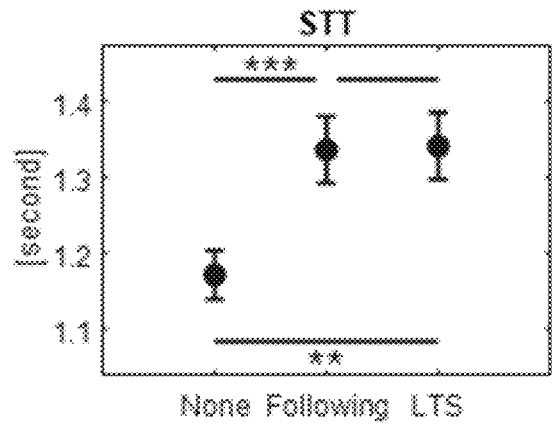
Figure 20B:
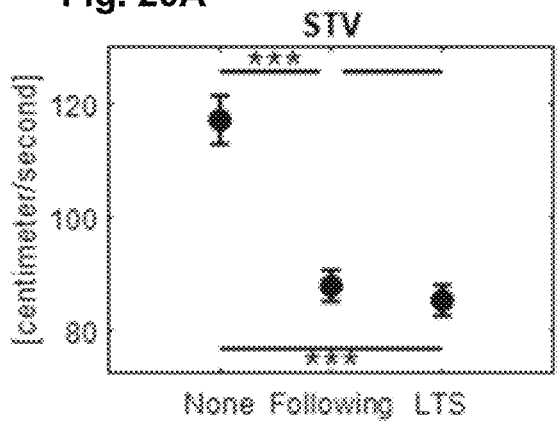
Figure 20D:
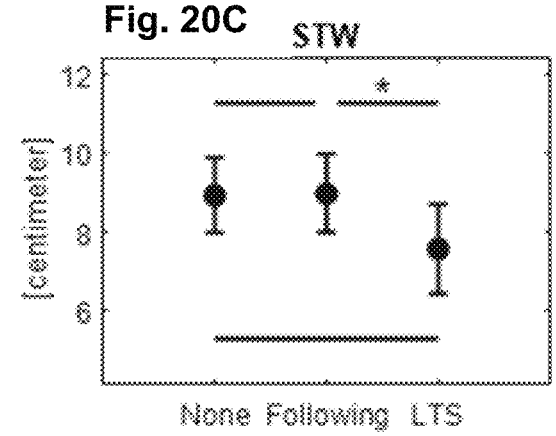
Figure 20E:
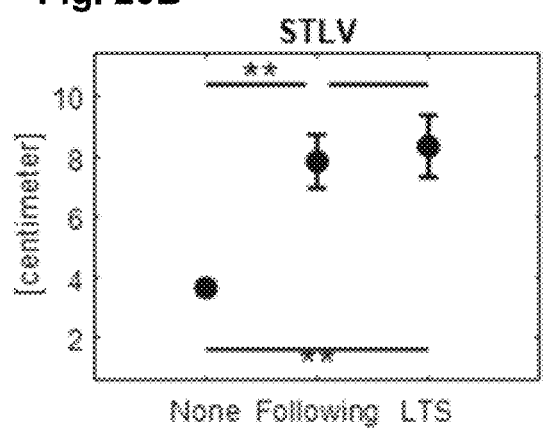
Figure 20F:
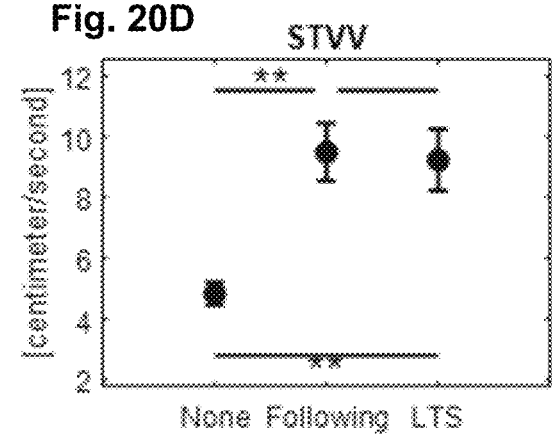

FIG. 18 CANINE (black triangle) periodically detects the position of the person (black circle) with LIDAR. position x-position (εx) and y-position (εy) from the previous position of the person (gray circle) in global frame (g) to get a heading direction for the person (εp). CANINE then travels in the same heading direction, using velocity of the person (εp), heading error, and y-error (εy) to the target position (dotted triangle) to control linear and angular velocity. The oscillation equation is shown below:

$$D(t)=A \cdot [\sin(0.16 \cdot 2\pi t)+0.8 \sin(0.21 \cdot 2\pi t)+1.4 \sin(0.24 \cdot 2\pi t)+0.5 \sin(0.49 \cdot 2\pi t)], \quad (2)$$

where D(t) is the displacement in meters of the virtual environment over time t in seconds for both anterior-posterior (AP) and medio-lateral (ML) perturbations. A is a scaling factor, which was selected to be 0.5.

Figure 21:
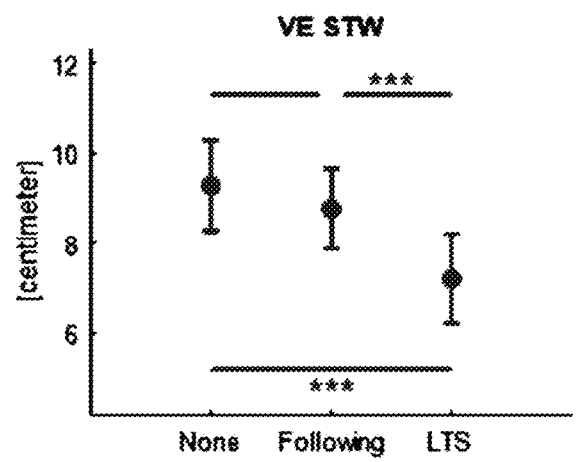
FIG. 21 illustrates differences in VE gait between walking without CANINE, walking with CANINE without LTS, and walking with CANINE with LTS.
Figure 22A:
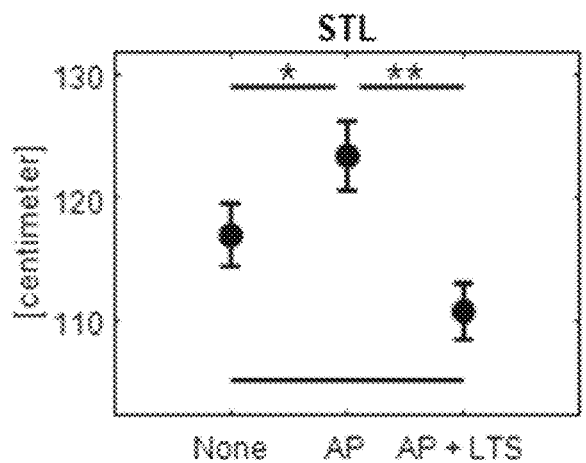
FIGS. 22A to 22D illustrate differences in VE gait between no perturbations, AP visual perturbations, and AP visual perturbations with LTS.
Figure 22C:
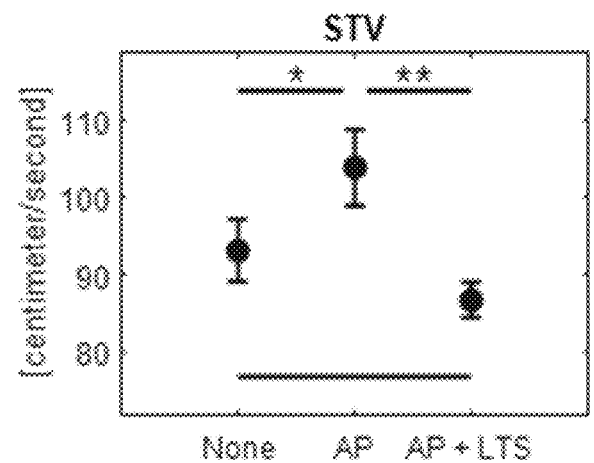
Figure 22B:
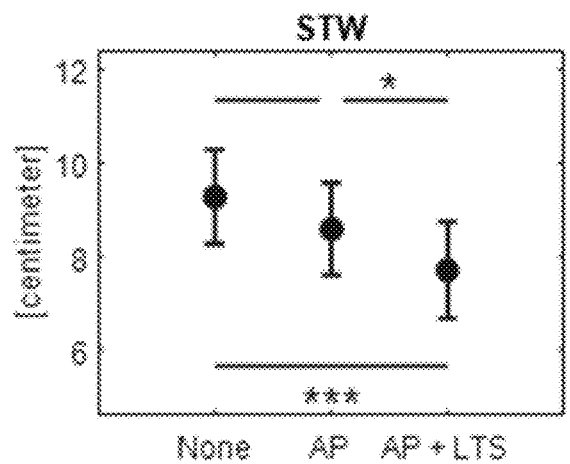
Figure 22D:
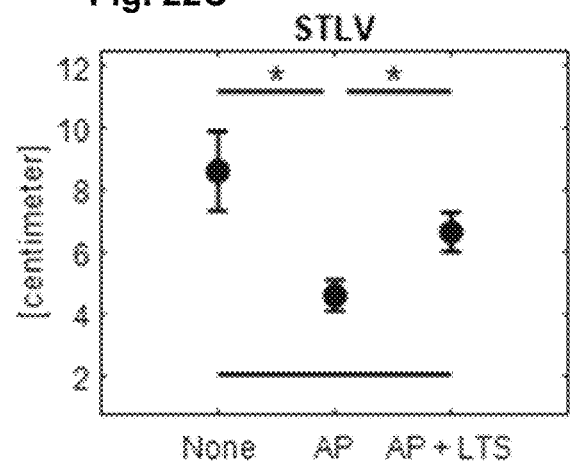
Figure 23A:
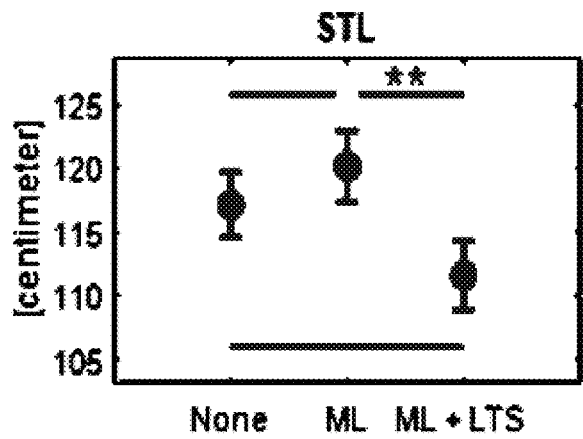
FIGS. 23A to 23E illustrate differences in VE gait between no perturbations.
Figure 23B:
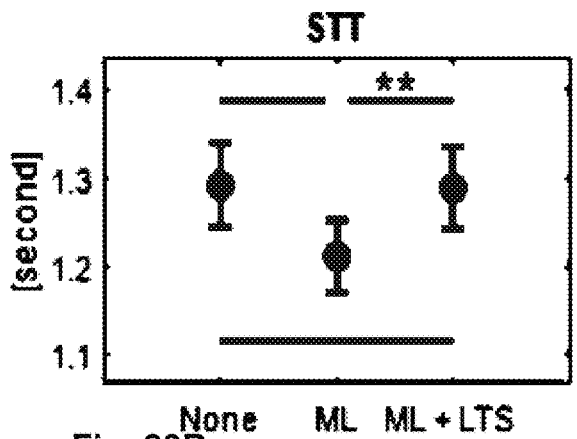
Figure 23C:
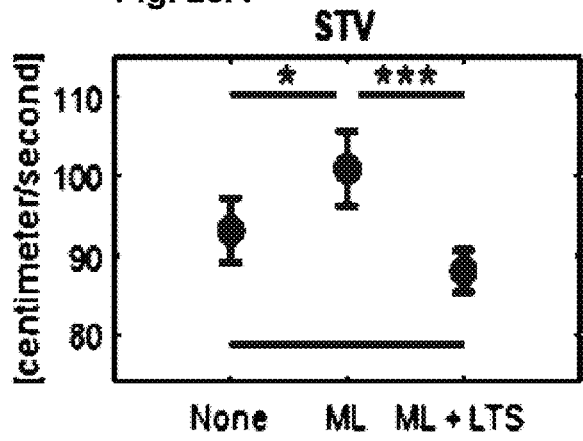
Figure 23D:
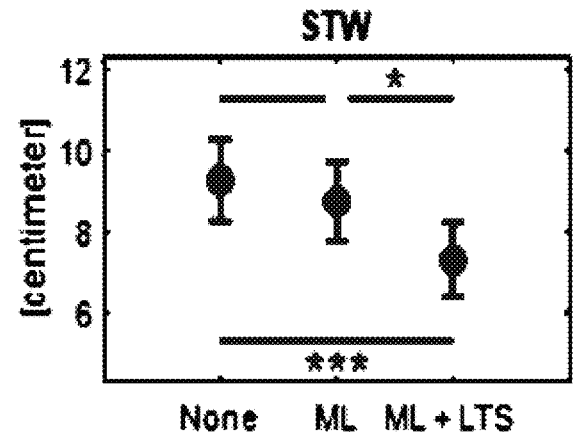
Figure 23E:
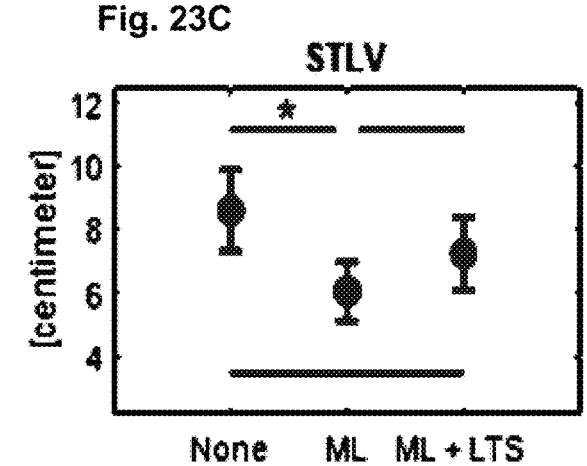

FIG. 21 illustrates differences in VE gait between walking without CANINE, walking with CANINE without LTS, and walking with CANINE with LTS. The only significant difference is LTS causes a narrower stride width.

Post hoc pairwise comparisons showed that while experiencing AP visual perturbations, participants took (i) longer, (ii) faster, and (iii) less varied stride lengths than when unperturbed ((i) p=0.28, (ii) p=0.25, and (iii) p=0.11) and when provided LTS during AP perturbations ((i) p=0.002, (ii) p=0.002, and (iii) p=0.12). When provided LTS during AP perturbations, participants took narrower strides than without LTS (p=0.034) and when unperturbed (p<0.001). These post hoc effects are shown in FIGS. 22A through 22D.

FIG. 23A-23E: Differences in RE gait between no CANINE, walking with CANINE with no LTS, and walking with CANINE and LTS. When walking with CANINE, with and without LTS, participants took slower, shorter, more variable strides.

Since the experimental perturbation conditions were conducted in the VE, and CANINE clearly effects gait differently in the VE, condition 4 was used as the baseline for the following visual perturbation comparisons.

To determine the effects of AP visual perturbations and LTS during these perturbations in a VE, a one-way rmANOVA with conditions 4, 7, and 8 was run. The independent variable is the perturbation condition (none, AP, AP+LTS). The significances show that the perturbation condition had a main effect on (i) STL, (ii) STV, (iii) STW, and (iv) STLV ((i) F(2,22)=13.222, p<0.001; (ii) F(2,22)=11.068, p<0.001; (iii) F(2, 22)=15.675, p<0.001; and (iv) F(1.21, 13.307)=6.991, p=0.16).

FIGS. 22A through 22D: Differences in VE gait between no perturbations, AP visual perturbations, and AP visual perturbations with LTS. AP perturbations caused a longer, faster stride, and LTS corrected back to VE baseline. LTS caused narrower strides than both perturbed and unperturbed walking.

To determine the effects of ML visual perturbations and LTS during these perturbations in a VE, a one-way rmANOVA with conditions 4, 9, and 10 was run. The independent variable is the perturbation condition (none, ML, ML+LTS). The results show that the perturbation condition had an effect on (i) STL, (ii) STT, (iii) STV, (iv) STW, and (v) STLV ((i) F(2,22)=9.131, p=0.001; (ii) F(2, 22)=5.407, p=0.12; (iii) F(2,22)=11.374, p<0.001; (iv) F(2, 22)=9.134, p<0.001, and (v) F(2,22)=4.522, p=0.23).

Post hoc pairwise comparisons showed that while experiencing ML visual perturbations, participants took (i) faster strides with (ii) less variable stride lengths than when experiencing no perturbations ((i) p=0.036, (ii) p=0.21).

When provided LTS, participants took (i) shorter, (ii) less frequent, (iii) slower, and (iv) narrower strides than when experiencing the ML perturbations without LTS ((i) p=0.004, (ii) p=0.004, (iii) p=0.001, (iv) p=0.14). Participants also took narrower strides with LTS than when experiencing no ML perturbations (p=0.001). These post hoc effects are shown in When considering all types of interactions with CANINE, namely walking freely, walking next to CANINE, and walking with LTS from CANINE, participants took significantly slower, shorter steps when walking in the unperturbed VE compared to the RE. The stride to stride deviation from the average heading direction was also higher while walking in the VE compared to the RE. This high directional sensitivity when in the virtual reality environment may indicate a dependence on the visual field for foot placements. This is corroborated by O'Connor et. al, who showed higher gait variability while being visually perturbed during treadmill walking. However, Martelli et. al showed minimal significant changes in variability when comparing over-ground walking in the VE and RE.

This could be due to a longer 6 minutes of walking per condition, as compared to 1.5- and 3-minutes per condition in the protocol. Participants had less time to reorient themselves to the VE, and higher directional deviation could suggest difficulty adapting to the new visual environment.

There was a significant interaction effect between the visual environment, namely real or virtual environment, and the type of interaction with CANINE for stride length, stride time, stride velocity, and directional deviation. In the RE, CANINE primarily slowed down the subject, most likely because in the RE the maximum speed of CANINE was below the preferred walking speed. Importantly, in the RE, LTS did not result in a significant reduction in step width. In the VE, the speed limitations of CANINE did not result in significantly slower walking speeds and LTS from CANINE allowed the subject to reduce their step width.

Twelve healthy young adults (7 males, 5 females, mean age 26 years) participated in and completed the experiment. Prior to participation, all subjects were informed of the following procedure and signed a written consent form approved by the Institutional Review Board of Columbia University. The experimental design included twelve conditions: (1) normal over-ground walk, (2) walk with mobile cane without contact, (3) walk with fingertips touching mobile cane, (4) walk in VE, (5) walk in VE with mobile cane without contact, (6) walk in VE with fingertips on mobile cane, (7) walk in VE with AP perturbations, (8) walk in VE with AP perturbations with fingertip on mobile cane, (9) walk in VE with ML perturbations, (10) walk in VE with ML perturbations with fingertip on mobile cane, (11) post walk in VE, (12) post walk. Different sequences of conditions 7-10 were used for different subjects, but all other conditions were completed in order. In each condition, the participants walked five full laps, or ten total passes, across the gait mat at their preferred speed. At the end of each pass, participants turned around and changed which hand rested on the mobile cane, shown in FIG. 1 (bottom right). Here, light touch contact is defined as less than 5 N in the vertical, ML, and AP directions, which has been used as the upper light touch threshold in walking stability literature. If 5 N was exceeded, participants were asked to complete an additional lap, and the lap in question was discarded. On average, participants exerted 4.51 N of force on CANINE.

Once experiments were complete, spatiotemporal gait parameters were evaluated.

Stride length (STL), stride width (STW), stride time (STT), and stride velocity (STV) were calculated at each left and right heel strike. STL is the distance (cm) between two consecutive single foot heel strikes. STW is the perpendicular distance (cm) between the line connecting two successive ipsilateral heel strike contacts with the mid stride contralateral heel contact. STT is the period (sec) between successive same foot heel strikes. STV is the ratio (cm/sec) of STL to STT. The Direction of Progression (DOP) is the angle (deg) of the stride vector from two successive heel strikes of the same foot in degrees. For each pass on the mat, the average DOP is calculated. The DOP deviation (DD) represents the deviation (deg) of each stride from that pass's average DOP.

The first few footfalls per pass were disregarded to account for the reactive acceleration of the cane. Footfalls from all ten passes per condition were averaged. Means and standard deviations were calculated in PKMAS to quantify stride parameters (STL, STW, STT, STV, and DD) and variability (STLV, STWV, STTV, STVV, and DDV), respectively. All participants completed all conditions, and the following results include all complete data sets.

The purpose of this study is to evaluate the effects of light touch feedback on over-ground gait under various visual conditions. To accomplish this, the following questions will be answered: (i) Does the VE mapping affect over-ground gait?; (ii) Does CANINE affect over-ground gait?; (iii) Can light touch feedback provided by CANINE assist during visual perturbations during over-ground ambulation?

To evaluate these effects and their significances, multiple sets of one-way and two-way repeated-measures analysis of variance (rmANOVA) tests were run. These tests evaluated the main effects and, in the cases of two-way rmANOVAs, the interaction effects as well. Mauchly's Test of Sphericity was used, and if data were deemed significantly non-spherical, a Greenhouse-Geisser correction was applied. If within-subject effect significance was found for main or interaction effects, then post-hoc pairwise comparisons were completed using a Bonferroni correction. Statistical significance was set at $p<0.5$; all tests were run using IBM SPSS Statistics 24. For post hoc pairwise comparisons, '*' represents $p<0.5$, '' represents $p<0.01$, and '*' represents $p<0.001$.

To determine the effects of CANINE and the visual environment on over-ground gait, a two-way rmANOVA with baseline trials 1, 2, 3, 4, 5, and 6 was run. The two independent variables are environment (real or virtual) and cane interaction (none, following, LTS).

While walking in the VE, participants took (i) shorter, (ii) slower strides which (iii) deviated more than strides in the real environment (RE) ((i) $F(1,11)=32.105$, $p<0.001$; (ii) $F(1,11)=13.287$, $p=0.004$; (iii) $F(1,11)=10.310$, $p=0.008$), shown in FIG. 3. Gait variabilities (STLV, STTV, STVV, STWV, and DDV) were not significantly different between the environment conditions (all $p>0.5$). Therefore, there are differences in gait caused by the VE.

To fully understand the effects of the environment and CANINE on over-ground gait, what may be considered how these two sets of conditions interact. A significant interaction effect was found in (i) STL, (ii) STT, (iii) STV, and (iv) DD ((i) $F(2,22)=15.844$, $p<0.001$; (ii) $F(1.133, 12.459)=12.347$, $p=0.003$; (iii) $F(1.212, 13.334)=23.692$, $p<0.001$; and (iv) $F(2,22)=3.689$, $p=0.042$). These results mean that for these four gait parameters, CANINE had a different effect in the RE compared to the VE. Therefore, separate analyses of CANINE effects were necessary for each environment.

To determine the effects of CANINE on over-ground gait in both the RE and VE, two one-way rmANOVAs were run. The independent variable for both tests was the type of interaction with CANINE (none, following, LT). This allows full separation of the interaction effects between the visual environment and the type of interaction with CANINE.

Referring to FIGS. 25A-25D: Differences in gait between walking in the RE and the VE. When walking in the VE, participants took shorter, slower strides with more directional deviation. FIGS. 19D-19G: Interaction effects between the visual environment (RE or VE) and the CANINE condition (None, Following, LTS). For these parameters, CANINE interaction had significantly different effects in the RE compared to the VE.

A one-way rmANOVA with trials 1, 2, and 3 was run. The significances showed that CANINE had a main effect on (i) STL, (ii) STT, (iii) STV, (iv) STW, (v) STLV, and (vi) STVV ((i) $F(2,22)=56.912$, $p<0.001$; (ii) $F(1.098, 12.075)=21.763$, p<0.001; (iii) F(1.249, 13.744)=53.173, p<0.001; (iv) F(2, 22)=5.573, p=0.11; (v) F(2, 22)=14.185, p<0.001; and (vi) F(2, 22)=13.63, p<0.001). Post hoc pairwise comparisons showed that participants took (i) slower, (ii) shorter, (iii) less frequent strides with more variable (iv) lengths and (v) velocities while walking with CANINE, both with and without LTS (Following: (i) p<0.001, (ii) p<0.001, and (iii) p=0.001, (iv) p=0.002, (v) p=0.002; LT: (i) p<0.001, (ii) p<0.001, and (iii) p=0.003, (iv) p=0.003, (v) p=0.009). When walking with CANINE, when provided LTS (p=0.28). These are shown in FIG. 21 illustrates differences in VE gait between walking without CANINE, walking with CANINE without LTS, and walking with CANINE with LTS. The only significant difference is LTS causes a narrower stride width.

Post hoc pairwise comparisons showed that while experiencing AP visual perturbations, participants took (i) longer, (ii) faster, and (iii) less varied stride lengths than when unperturbed ((i) p=0.28, (ii) p=0.25, and (iii) p=0.11) and when provided LTS during AP perturbations ((i) p=0.002, (ii) p=0.002, and (iii) p=0.12). When provided LTS during AP perturbations, participants took narrower strides than without LTS (p=0.034) and when unperturbed (p<0.001). These post hoc effects are shown in FIGS. 22A through 22D. Fig.

To determine the effects of CANINE on over-ground gait in the VE, a one-way rmANOVA with baseline trials 4, 5, and 6 was run. The independent variable was the CANINE interaction (none, following, LTS). The significances showed that CANINE had a main effect on STW (F(2,22) =26.330, p<0.001).

Post hoc pairwise comparisons showed that participants walking with CANINE and LTS had narrower strides than when walking without LTS (p<0.001) and when walking without CANINE (p=0.001), shown in Figs. There was no significant difference in stride width without CANINE and walking with CANINE but without light touch. No other gait parameters, including speed and DD, nor their variabilities had a significant main effect of CANINE interaction.

FIG. 21: Differences in RE gait between no CANINE, walking with CANINE with no LTS, and walking with CANINE and LTS. When walking with CANINE, with and without LTS, participants took slower, shorter, more variable strides. FIG. 21: Differences in VE gait between walking without CANINE, walking with rmANOVA with experimental trials 2, 3, 5, and 6 was completed, and walking with CANINE with LTS. The only significant difference is LTS causes a narrower stride width.

Since the experimental perturbation conditions were conducted in the VE, and CANINE clearly effects gait differently in the VE, condition 4 was used as the baseline for the following visual perturbation comparisons.

To determine the effects of AP visual perturbations and LTS during these perturbations in a VE, a one-way rmANOVA with conditions 4, 7, and 8 was run. The independent variable is the perturbation condition (none, AP, AP+LTS). The significances show that the perturbation condition had a main effect on (i) STL, (ii) STV, (iii) STW, and (iv) STLV ((i) F(2,22)=13.222, p<0.001; (ii) F(2,22)=11.068, p<0.001; (iii) F(2, 22)=15.675, p<0.001; and (iv) F(1.21, 13.307)=6.991, p=0.16).

Post hoc pairwise comparisons showed that while experiencing AP visual perturbations, participants took (i) longer, (ii) faster, and (iii) less varied stride lengths than when unperturbed ((i) p=0.28, (ii) p=0.25, and (iii) p=0.11) and when provided LTS during AP perturbations ((i) p=0.002, (ii) p=0.002, and (iii) p=0.12). When provided LTS during AP perturbations, participants took narrower strides than without LTS (p=0.034) and when unperturbed (p<0.001). These post hoc effects are shown in Figs.

FIGS. 22A through 22E: Differences in VE gait between no perturbations, AP visual perturbations, and AP visual perturbations with LTS. AP perturbations caused a longer, faster stride, and LTS corrected back to VE baseline. LTS caused narrower strides than both perturbed and unperturbed walking.

To determine the effects of ML visual perturbations and LTS during these perturbations in a VE, a one-way rmANOVA with conditions 4, 9, and 10 was run. The independent variable is the perturbation condition (none, ML, ML+LTS). The results show that the perturbation condition had an effect on (i) STL, (ii) STT, (iii) STV, (iv) STW, and (v) STLV ((i) F(2,22)=9.131, p=0.001; (ii) F(2, 22)=5.407, p=0.12; (iii) F(2,22)=11.374, p<0.001; (iv) F(2, 22)=9.134, p<0.001, and (v) F(2,22)=4.522, p=0.23).

Post hoc pairwise comparisons showed that while experiencing ML visual perturbations, participants took (i) faster strides with (ii) less variable stride lengths than when experiencing no perturbations ((i) p=0.036, (ii) p=0.21).

When provided LTS, participants took (i) shorter, (ii) less frequent, (iii) slower, and (iv) narrower strides than when experiencing the ML perturbations without LTS ((i) p=0.004, (ii) p=0.004, (iii) p=0.001, (iv) p=0.14). Participants also took narrower strides with LTS than when experiencing no ML perturbations (p=0.001). These post hoc effects are shown in Figs.

When considering all types of interactions with CANINE, namely walking freely, walking next to CANINE, and walking with LTS from CANINE, participants took significantly slower, shorter steps when walking in the unperturbed VE compared to the RE. The stride to stride deviation from the average heading direction was also higher while walking in the VE compared to the RE. This high directional sensitivity when in the virtual reality environment may indicate a dependence on the visual field for foot placements. This is corroborated by O'Connor et. al, who showed higher gait variability while being visually perturbed during treadmill walking. However, Martelli et. al showed minimal significant changes in variability when comparing over-ground walking in the VE and RE.

This could be due to a longer 6 minutes of walking per condition, as compared to 1.5- and 3-minutes per condition in the protocol. Participants had less time to reorient themselves to the VE, and higher directional deviation could suggest difficulty adapting to the new visual environment.

There was a significant interaction effect between the visual environment, namely real or virtual environment, and the type of interaction with CANINE for stride length, stride time, stride velocity, and directional deviation. In the RE, CANINE primarily slowed down the subject, most likely because in the RE the maximum speed of CANINE was below the preferred walking speed. Importantly, in the RE, LTS did not result in a significant reduction in step width. In the VE, the speed limitations of CANINE did not result in significantly slower walking speeds and LTS from CANINE allowed the subject to reduce their step width.

FIGS. 23A through 23E: Differences in VE gait between no perturbations, ML visual perturbations, and ML visual perturbations with LTS. ML perturbations caused longer, faster stride, and LTS corrected back to VE baseline. LTS caused narrower strides than both perturbed and unperturbed walking.

As hypothesized, the difference in step width observed between the RE and VE suggests that subjects had a fundamentally different interaction with CANINE in the two environments. Reduced step width resulting from light touch support has previously been observed in over-ground light touch support with a railing.

A narrower gait implies a direct reduction in the lateral base of support (BoS). The base of support is defined as the minimum area enclosing the body's contact with the ground and is a highly important parameter for maintaining stable gait. A narrower lateral BoS suggests a higher degree of confidence in gait motor planning. The possibility that narrower gait was caused by walking next to CANINE can be ruled out because walking next to CANINE without light touch contact in the VE did not elicit narrower gait. These results, considered together with the destabilizing effects of the VE, suggest that the light touch interaction with CANINE became beneficial in a destabilizing environment.

Participants experienced changes in gait during the different visual conditions, i.e. over-ground walking in the VE, in the VE with AP visual perturbations, and in the VE with ML visual perturbations. Walking in the VE while experiencing AP perturbations led to longer, faster strides with less varied stride lengths than when both unperturbed and when perturbed with a light touch cue. There was no significant difference in stride length or velocity between unperturbed walking and walking with light touch support. Therefore, visually perturbing participants in the AP direction led to a faster gait and providing light touch feedback corrected gait back to the VE baseline. This could indicate that a faster gait was adopted by participants as a compensatory strategy to overcome the instability caused by the visual perturbations. When a light touch cue was provided, stride widths were significantly narrower than both unperturbed and perturbed walking in the VE. Thus, LTS increased motor planning confidence as evidenced by a narrower lateral BoS.

Walking in the VE while experiencing ML perturbations also led to a faster gait velocity, with less variable stride length than unperturbed VE walking. There was no significant difference in stride velocity or stride length variability between unperturbed walking and walking with light touch support. Again, these changes seem to be compensations for the ML perturbations. When provided with light touch support, the increase in velocity and decrease in stride length variability caused by the ML perturbations returned to baseline. Like with AP perturbations, a light touch cue provided by CANINE during ML visual perturbations resulted in narrower strides than without the light touch support and while unperturbed.

The increase in stride velocity and reduction in stride length variability in response to both ML and AP visual perturbation were unexpected results. Li et. al found that increased stride velocity does not correlate with improved stability. They also found that gait variability decreases with increasing gait speed, which may explain the decrease in gait variability observed here.

Maintaining light touch contact with CANINE represented an additional task constraint to over-ground walking. In quiet stance, some have proposed that the additional task constraint of maintaining light touch is a suprapostural task, suggesting that the act of maintaining finger contact reduces body sway instead of the proprioceptive feedback. It is possible that participants made postural changes to accommodate the task of maintaining contact with CANINE. For example, one possible adaptation could be reduced pelvic rotation in the transverse plane resulting in reduced shoulder movement, as pelvic fixation has been shown to reduce step width while treadmill walking. It may be considered to be unlikely that the reduced step width resulted from the additional task of maintaining contact with CANINE. The absence of a significantly reduced step width with LTS in the RE argues strongly against a suprapostural explanation. In addition, reduced step width was observed in over-ground gait experiments with fixed light touch supports, which were likely less challenging to maintain contact with.

This study presents several limitations that could limit the generalizability of the results to a population with mobility impairments. Maintaining light touch contact required ipsilateral arm placement far from the arm's lateral range of motion during natural arm swing. This lack of natural arm swing, which is used to limit the magnitude of ground reaction moment on the stance foot during gait, could cause asymmetry in gait parameters. This effect may, however, be less important for mobility-impaired populations, as arm swing can be reduced, slowed or even absent in patients with Parkinson's disease, stroke, spinal cord injury or cerebral palsy. The length of the Zeno Walkway coupled with the limited tracking area of the HTC Vive limited the number of continuous steps the participants could take. The participants were all healthy, young adults, and so the observed effects of the dynamic light touch support cannot be directly applied to other populations. However, the results suggest that exploration of mobile light touch robots in mobility-impaired populations would be worthwhile. Future work could explore perturbations of the person-following platform during over-ground walking and repeating this experiment with other patient populations.

Applicants created an autonomous person-following robot and explored the effects of a dynamic light touch cue on the stability of healthy young adults experiencing perturbations in a VE while walking over-ground. It was found that light touch support led to narrower stride width while in the VE and in a VE with visual field perturbations, but did not produce a significantly narrower stride width in the RE. This suggests that light touch support provided by CANINE was beneficial when alternative sensory inputs were reduced, as they might be for a mobility-impaired patient.

Elderly individuals or stroke patients who walk with a traditional cane may benefit from having a light touch support that requires no coordination or lifting while walking. Improving stability coupled with eliminating the coordination task required by a traditional cane could improve mobility and reduce the risk of falling, both of which are important considerations for the mobility and balance impaired.

Proprioceptive feedback represents an alternative sensory channel that may be stabilizing n both over-ground gait rehabilitation in a virtual environment (VE), as well as when using an assistive device for over-ground gait. A person-following robot could potentially provide more useful proprioceptive feedback as compared to conventional assistive devices such as a cane, as the person could maintain continuous contact with the environment with a reduced cognitive load.

Using a light touch support paradigm, whether a person-following robot could act as a proprioceptive reference point to stabilize over-ground gait in a rehabilitative or assistive setting was explore. Twelve healthy subjects completed ten passes across an instrumented walkway in various conditions was explored. These conditions tested the main and interaction effects of walking in a VE, walking in a VE with visual perturbations, and walking with light touch proprioceptive feedback.

The light touch support caused narrower strides in all VE conditions. This decrease in the base of support could indicate an increase in stability from light touch contact.

This work illustrates that proprioceptive signals from a person-following robot might be used to increase over-ground stability, even when the user experiences discordant visual feedback.

Mobility impairments cause significant loss of quality of life and productivity across society. In the U.S., they affect 4% of people aged 18-49 and prevalence increases with age to 35% of people aged 75-80. These impairments can have profound impact on the lives of the affected—7% of adults cannot walk a quarter of a mile.

Over-ground walking is an inherently unstable process that requires continuous feedback from the central nervous system. Sensory inputs, including visual, somatosensory, vestibular and even auditory feedback assist in correcting instabilities during gait. For those with abnormal gait patterns, repetitive gross movements, as well as learning new motor skills, can improve gait characteristics. Treadmill gait training is commonly used for adaptive locomotor research, and controlled perturbations allow patients to learn balance maintenance and recovery without risk of fall or injury.

Increasingly, these systems are incorporating multimodal inputs such as visual or haptic feedback that either enhance sensory feedback or challenge the patient to rely on specific feedback channels. However, few of these systems can be used in an over-ground setting, which might yield longer retention when transferred to real-world gait. Many existing over-ground rehabilitative devices significantly constrain or alter natural gait. It has been shown that visual perturbations in a virtual environment (VE) could destabilize healthy subjects during over-ground gait, providing a potentially useful rehabilitative paradigm. However, without some form of support, over-ground rehabilitation with sensory challenges could be excessively destabilizing for people with mobility or balance impairments.

To provide increased stability in an over-ground setting with minimal modifications of natural gait, A cane-like light-touch navigating device, CANINE, was developed. The autonomous person-following robot acts as a cane-like mobile assistant. CANINE was initially designed as a smart assistive device to provide mechanical support, proprioceptive feedback, and navigational assistance during over-ground gait. CANINE might provide an advantage over standard assistive devices which must be periodically advanced, like canes or walkers, as the user could potentially maintain continuous contact with the environment. Here, it was hoped to ascertain if proprioceptive benefits could be derived from maintaining contact with CANINE. The benefits of an autonomously controlled reference point for proprioceptive feedback in an over-ground setting are two-fold; it could provide more useable and constant proprioceptive feedback as an assistive device or provide an alternate, stabilizing sensory channel for visual perturbation in an over-ground rehabilitative setting. This work reveals the effects of a mobile robotic light touch support on over-ground gait characteristics. Autonomous person-following robots may also open the door to further exploration of robotic assistance for gait rehabilitation and assistance in an over-ground setting.

Control over virtual environments (VE) allows researchers to study visual reliance on gait adaptations by challenging balance control during walking. Concurrent or terminal visual feedback focuses on augmenting sensory feedback about the task, and has proven effective for motor learning and gait training. However, the guidance hypothesis asserts that people may overly rely on this feedback and exhibit fast adaptation but poor retention. Visual perturbations, on the other hand, attempt to challenge the motor control system to adapt to discordant sensory feedback. Visual perturbations mimic unexpected perturbations that can occur in everyday life, and challenge visual overreliance that can occur in the elderly or people affected by stroke, vestibular disorder, or phobic postural vertigo. These perturbations can elicit changes in step and COP variabilities while treadmill walking and cause recalibration of locomotor heading direction when exposed to modified rotary scenes Visual perturbations have mainly been tested with healthy adults and in this population show promise for motor learning with long-term retention. Stroke patients showed larger improvements in gait with vision-deprived gait training than with normal gait training, suggesting that eliminating visual feedback improved their ability to utilize the proprioceptive and vestibular feedback channels. These results encourage the further exploration of using visual perturbations to disrupt visual feedback in rehabilitation.

Somatosensory information obtained from the fingertips by applying a small, non-weight bearing load to an object is a light touch cue. It will be understood that non-weight bearing here indicates that the user's entire body weight is not supported. This cue can augment sensory feedback in both static and dynamic postural control systems and can compensate for somatosensory loss. This includes in subjects with diabetic peripheral neuropathy and impairment due to stroke. A light touch cue can reduce center of pressure (COP) fluctuations in the coronal plane while in normal quiet stance and in the sagittal plane while in tandem stance. Light touch contact with a handrail can decrease stride width while walking on a treadmill. During treadmill walking, feedback from light touch can compensate for visual feedback and can be used to improve adaptation to unexpected disturbances such as waist pull perturbations. Light touch feedback might then serve as a tool allowing for gait training that removes or challenges visual feedback.

Research on light touch feedback during over-ground walking is limited. Handrails, while restricting activity to a predefined path, have proven effective in increasing medio-lateral stability in challenging over-ground walking conditions. Stroke patients using a light touch cane achieved improvements in lateral balance similar to those when using a weight bearing cane, but reduced their walking speed. Motion of the cane was coupled to the motion of the person, possibly making the light touch feedback less effective, as sway-referenced light touch supports in quiet stance do not decrease postural sway. In natural over-ground environments, a person-following robot could decouple the support point from the person and provide continuous feedback, but it would then introduce noise to the light touch cue due to imperfect tracking of the person. However, people may compensate for noise in light touch support contact points and can benefit from light touch cues sway-referenced along all but one axis. An autonomous robot may also reduce the cognitive load of using an assistive device, as ambulation coordination increases attentional demands. This can benefit people with impaired cognition or coordination as in stroke, Alzheimer's, and many other neurological or neuromusculoskeletal disorders.

Support contact points and can benefit from light touch cues sway-referenced along all but one axis. An autonomous robot may also reduce the cognitive load of using an assistive device, as ambulation coordination increases attentional demands. This can benefit people with impaired cognition or coordination as in stroke, Alzheimer's, and many other neurological or neuromusculoskeletal disorders.

Figure 16:
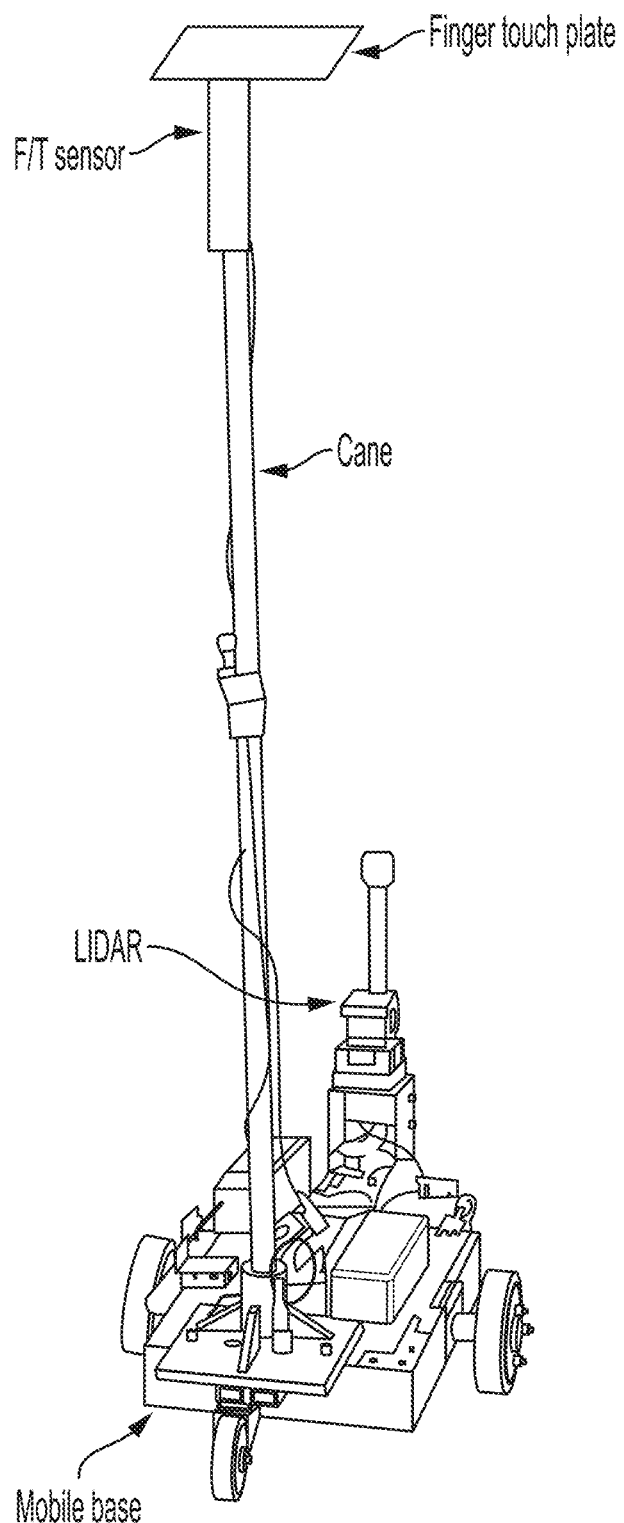
FIG. 16 is a photo of CANINE walker according to embodiments of the disclosed subject matter.

CANINE includes a classic cane mounted at the front of a custom-built differential-drive mobile base to make a mobile cane (FIG. 16). Encoders in series with the drivetrain allow for robot velocity estimates (SRX Mag Encoder, CTR Electronics). A fingertip contact plate was installed at the top of the classic cane, 1.1 m from the ground. This fingertip contact plate was instrumented with a force torque sensor (Nano25, ATI Industrial Automation) to detect the forces exerted by the fingertips on the platform. A WiFi-enabled embedded device (myRio, National Instruments) was used to record the force/torque output from the sensor at 100 Hz during each gait trial. Synchronization between the data was accomplished with UDP packets triggered by the PKMAS software when recording began.

A LIDAR device (UTM-30LX-EW Laser Rangefinder, Hokuyo) was installed on the base, 0.3 m from the ground. The mobile cane detects reflective bands wrapped around both shins of the participant by using the LIDAR device. LIDAR data are then sent to an onboard microcontroller (Raspberry Pi 3 Model B+, Raspberry Pi) which runs the person-following program.

FIG. 16: A view of CANINE. The LIDAR was positioned at the rear of the robot for better viewing of the subject's legs.

FIG. 15 is an image the virtual environment. The experimental setup, with a subject wearing the VR headset and maintaining light touch contact with CANINE.

An instrumented gait mat (Zeno Walkway, Protokinetics FIG. 14) was used to evaluate spatiotemporal gait parameters. These data are analyzed by a specialized gait analysis software (PKMAS, protokinetics), which outputs a variety of spatial and temporal gait parameters. This software allows the user to disregard footfalls on a case by case basis.

A real-time game engine (Unity3D) and a VR headset (VIVE, HT) were used to create an immersive, 3D virtual environment for the user to navigate. Unity3D ran on a backpack laptop (VR ONE Backpack PC, MSI) carried by an investigator.

CANINE's following distance was set at 0.55 m in the lateral (x) direction and 0.3 m in the posterior direction (y) to maintain a safe distance and to maximize ease of maintaining finger contact. Using LIDAR to build a point cloud global map of the experimental space in advance, CANINE could compare LIDAR scans to the global map and estimate person and robot heading in a global coordinate system. CANINE used LIDAR to detect the two reflective leg bands and to compute the mean location of each detected point on a given sweep, getting an estimate of leg position. Both leg positions were averaged and used as an estimate of the person's location. The person's velocity was computed as the change in the person's position divided by the time since the last LIDAR sweep. Each sweep of LIDAR data generated x and y following errors, ex and ey, in the robot frame based on distance to the desired robot position. By assuming that the person's velocity vector at time t represented their heading, the map of the environment was used to compute a robot heading error, eq, equal to the robot's heading, qr, subtracted from the person's heading, qp). The robot then traveled at the same velocity as the person in the same heading direction, but with an added PD controller, where the velocity commands to the robot were (eqn 1):

$$\begin{bmatrix} v_y \\ \omega \end{bmatrix} = \begin{bmatrix} \|\vec{v_p}\|_2 + k_{p1}(\epsilon_y) + k_{d1}(\dot{\epsilon}_y) \\ k_{p2}(\epsilon_\theta) + k_{d2}(\dot{\epsilon}_\theta) \end{bmatrix} \quad (1)$$

where vy (m/s) and vp (rad/s) are the linear and angular velocities of the mobile base, vp (m/s) is the person's velocity, and kp1, kp2, kd1, and kd2 are the PD controller constants which were hand-tuned. These velocities were transformed into velocity commands for each wheel. In between LIDAR updates, encoder readings were used to estimate and update robot heading and position While validation of person-following positional error with a secondary system was not validated, post-hoc analysis of tracking errors using LIDAR data and the estimated position of the person showed an average error of less than 0.1 meters along the x- and y-axis. It was observed that subjects easily maintained finger contact with CANINE while walking across the gait mat. At the end of each pass, the robot automatically turned 180° and adjusted the direction of the following distance accordingly. In FIG. 17, a global map is shown that was built with CANINE's LIDAR data. CANINE (circle), positioned behind and to the right of the person's legs, generates an estimate of the person's location (triangle). The scan was captured in a hallway (black outer lines.

In FIG. 18, CANINE (white triangle) periodically detects the position of the person (circle) with LIDAR CANINE computes the change in the person's x-position ($\epsilon$x) and y-position and ($\epsilon$y) from the previous position of the person (gray circle) in global frame (g) to get a heading direction for the person ($\epsilon$p). CANINE then travels in the same heading direction, using velocity of the person ($\epsilon$p), heading error, and y-error ($\epsilon$y) to the target position (dotted triangle) to control linear and angular velocity.

The VE displayed a virtual walkway as a visual guide and was calibrated so that the virtual walkway was aligned and mapped one-to-one with respect to the physical gait mat. A 3D outdoor space was rendered in the backdrop; grass, trees, and clouds were placed to add realism and depth references. Perturbations were created by superimposing oscillations of the visual field on top of the normal scene. Oscillations were created to be pseudorandom by summing four sine waves with different frequencies, as used previously.

FIG. 18, a visualization of the global map built with LIDAR data. CANINE (circle), positioned behind and to the right of the person's legs, generates an estimate of the person's location and heading (triangle). The scan was captured in a hallway. (Right) Visual representation of the person-following algorithm. CANINE (black triangle) periodically detects the position of the person (black circle). CANINE computes the change in the person's location from the previous scan (gray circle) and updates its target position (dotted triangle). Oscillations were created to be pseudorandom by summing four sine waves with different frequencies, as used previously. The oscillation equation is shown below equation 2:

$$D(t)=A\cdot[\sin(0.16\cdot 2\pi t)+0.8\sin(0.21\cdot 2\pi t)+1.4\sin(0.24\cdot 2\pi t)+0.5\sin(0.49\cdot 2\pi t)], \quad (2)$$

where D(t) is the displacement in meters of the virtual environment over time t in seconds for both AP and ML perturbations. A is a scaling factor, which was selected to be 0.5.

Twelve healthy young adults (7 males, 5 females, mean age 26 years) participated in the experiment. Prior to participation, all subjects were informed of the following procedure and signed a written consent form approved by the Institutional Review Board of Columbia University. The experimental design included twelve conditions: (1) normal over-ground walk, (2) walk with mobile cane without contact, (3) walk with fingertips touching mobile cane, (4) walk in VE, (5) walk in VE with mobile cane without contact, (6) walk in VE with fingertips on mobile cane, (7) walk in VE with AP perturbations, (8) walk in VE with AP perturbations with fingertip on mobile cane, (9) walk in VE with ML perturbations, (10) walk in VE with ML perturbations with fingertip on mobile cane, (11) walk in VE (VR Post), (12) normal walk (Post). Different sequences of conditions 7-10 were used for different subjects, but all other conditions were completed in order. In each condition, the participants were instructed to walk five full laps, or ten total passes, across the gait mat at their preferred speed. At the end of each pass, Prior to participation, all subjects were informed of the following procedure and signed a written consent form approved by the Institutional Review Board of Columbia University. The experimental design included twelve conditions: (1) normal over-ground walk, (2) walk with mobile cane without contact, (3) walk with fingertips touching mobile cane, (4) walk in VE, (5) walk in VE with mobile cane without contact, (6) walk in VE with fingertips on mobile cane, (7) walk in VE with AP perturbations, (8) walk in VE with AP perturbations with fingertip on mobile cane, (9) walk in VE with ML perturbations, (10) walk in VE with ML perturbations with fingertip on mobile cane, (11) walk in VE (VR Post), (12) normal walk (Post). Different sequences of conditions 7-10 were used for different subjects, but all other conditions were completed in order. In each condition, the participants were instructed to walk five full laps, or ten total passes, across the gait mat at their preferred speed. At the end of each pass, participants were asked to turn around and, if applicable, change which hand rested on the mobile cane, shown in FIG. 16. In this procedure, light touch contact is defined as less than 5 N in the vertical, ML, and AP directions, which has been used as the upper light touch threshold in other walking stability literature. On average, participants exerted a 4.51 N force on CANINE.

Once experiments were complete, spatiotemporal gait parameters were evaluated. Stride length (STL), stride width (STW), stride time (STT), and stride velocity (STV) were calculated at each left and right heel strike. STL is the distance (cm) between two consecutive heel strikes of the same foot. STW is the perpendicular distance (cm) between the line connecting two successive ipsilateral heel strike contacts with the mid stride contralateral heel contact. STT is the period (sec) between successive heel strikes of the same foot. STV is the ratio (cm/sec) of STL to STT.

The first two to three footfalls per pass were disregarded to account for the reactive acceleration of the cane. Footfalls from all ten passes per condition were averaged. Means and standard deviations were calculated in PKMAS to quantify stride parameters (STL, STW, STT, STV) and variability (STLV, STWV, STTV, STVV), respectively.

Due to mechanical design limitations, the maximum velocity of the CANINE was limited to a speed less than the preferred gait speed of the participants. Therefore, during any conditions with light touch contact, participants would have to walk slower to accommodate CANINE. This coupled the effects of light touch support and limited gait speed on gait. To separately analyze the effects of the virtual environment, the limited participant speed induced by CANINE, the light touch support from CANINE, and the perturbation conditions, multiple sets of two-way repeated measures analysis of variances (rmANOVA) were performed. These tests evaluated the main and interaction effects of the above parameters. Mauchly's Test of Sphericity was used, and if data were deemed significantly non-spherical, a Greenhouse-Geisser correction on Epsilon was applied. If within-subject effect significance was found, then post-hoc pairwise comparisons were completed using a Sidak adjustment. Statistical significance was set at $p<0.5$, and all tests were run using IBM SPSS Statistics 24.

All participants completed all conditions, and the following results include all complete data sets and can be seen in Table 1.

The maximum speed of CANINE may have limited the self-selected gait speed of the participants. The virtual reality environment may have also induced some gait deviations. The following are the main and interaction effects between walking with or without CANINE and being in a VE or RE. These were determined by using a two-way rmANOVA with experimental trials 1, 2, 4, and 5. While walking in the VE, participants took slower ($p=0.002$) steps compared to steps taken in the RE FIG. 4. When walking with CANINE following but no light touch contact, steps were (i) shorter, and (ii) less rapid ((i) $p<0.001$, (ii) $p=0.004$) than when walking without CANINE. No significant differences were found on STW for environment or CANINE following.

TABLE 1

Mean ± standard deviation of the outcome parameters. A, B, and C correspond to the three rmANOVA tests used to assess the effects on these paremeters. Independent variables: Envirnoment (Env.), Speed, Light touch support (LTS), and Visual field condition (Vision).

| rm-ANOVA | Variable | Condition | STW | STL | STV | STT | STWV | STLV | STVV | STTV |
|---|---|---|---|---|---|---|---|---|---|---|
| A. Env.. Speed | Env. | RE | 8.96 ± 0.96 | 125.4 ± 2.1 | 102.6 ± 3.1 | 1.25 ± 0.04 | 1.82 ± 0.15 | 7.55 ± 0.46 | 7.16 ± 0.51 | 0.08 ± 0.03 |
| | Env. | VE | 9.03 ± 0.94 | 114.7 ± 1.9 | 91.2 ± 3.0 | 1.28 ± 0.04 | 2.25 ± 0.19 | 7.64 ± 0.66 | 8.60 ± 0.69 | 0.096 ± 0.03 |
| | Speed | No cane | 9.10 ± 0.97 | 126.5 ± 2.4 | 105.2 ± 3.6 | 1.23 ± 0.04 | 2.11 ± 0.17 | 6.13 ± 0.67 | 7.33 ± 0.71 | 0.080 ± 0.035 |
| | Speed | Cane | 8.88 ± 0.93 | 113.6 ± 1.36 | 88.6 ± 2.18 | 1.30 ± 0.04 | 1.95 ± 0.18 | 7.27 ± 0.60 | 8.43 ± 0.57 | 0.096 ± 0.029 |
| B. Env.. LTS | Env. | RE | 8.28 ± 1.05 | 113.8 ± 1.7 | 86.6 ± 2.6 | 1.34 ± 0.04 | 2.14 ± 0.19 | 8.11 ± 0.83 | 9.36 ± 0.90 | 0.11 ± 0.033 |
| | Env. | VE | 7.99 ± 0.93 | 111.7 ± 1.8 | 87.4 ± 2.1 | 1.29 ± 0.04 | 2.14 ± 0.18 | 6.75 ± 0.57 | 7.14 ± 0.50 | 0.066 ± 0.007 |
| | LTS | No LTS | 8.88 ± 0.93 | 113.6 ± 1.36 | 88.6 ± 2.18 | 1.30 ± 0.04 | 1.95 ± 0.18 | 7.27 ± 0.60 | 8.43 ± 0.57 | 0.096 ± 0.029 |
| | LTS | LTS | 7.39 ± 1.04 | 111.9 ± 2.16 | 85.4 ± 2.4 | 1.33 ± 0.04 | 2.33 ± 0.20 | 7.59 ± 0.70 | 8.07 ± 0.57 | 0.078 ± 0.009 |

TABLE 1-continued

Mean ± standard deviation of the outcome parameters. A, B, and C correspond to the three rmANOVA tests used to assess the effects on these paremeters. Independent variables: Envirnoment (Env.), Speed, Light touch support (LTS), and Visual field condition (Vision).

| rm-ANOVA | Variable | Condition | STW | STL | STV | STT | STWV | STLV | STVV | STTV |
|---|---|---|---|---|---|---|---|---|---|---|
| C. Vision, LTS | Vision | RE | 8.25 ± 1.02 | 124.3 ± 2.4 | 101.3 ± 2.9 | 1.26 ± 0.03 | 2.10 ± 0.15 | 6.01 ± 0.53 | 7.03 ± 0.50 | 0.069 ± 0.007 |
| | Vision | VE | 8.24 ± 0.99 | 114.1 ± 1.7 | 89.3 ± 2.5 | 1.30 ± 0.04 | 2.36 ± 0.19 | 7.71 ± 0.80 | 8.37 ± 0.75 | 0.097 ± 0.034 |
| | Vision | AP | 8.15 ± 1.00 | 117.1 ± 2.2 | 95.3 ± 3.4 | 1.25 ± 0.04 | 2.15 ± 0.12 | 5.62 ± 0.48 | 6.57 ± 0.55 | 0.058 ± 0.009 |
| | Vision | ML | 8.03 ± 0.93 | 115.9 ± 2.6 | 94.5 ± 3.6 | 1.25 ± 0.04 | 2.85 ± 0.24 | 6.64 ± 0.99 | 7.15 ± 0.68 | 0.077 ± 0.021 |
| | LTS | No LTS | 8.89 ± 0.95 | 124.2 ± 2.4 | 103.8 ± 3.9 | 1.22 ± 0.04 | 2.33 ± 0.13 | 5.73 ± 0.63 | 6.74 ± 0.55 | 0.064 ± 0.02 |
| | LTS | No LTS | 7.45 ± 0.99 | 111.5 ± 2.2 | 86.3 ± 2.1 | 1.31 ± 0.04 | 2.40 ± 0.14 | 7.26 ± 0.46 | 7.81 ± 0.46 | 0.082 ± 0.012 |

Walking in the VE had a significant effect on all analyzed variabilities. Participants took more varied (i) STW, (ii) STL, (iii) STV, and (iv) STT ((i) p=0.001, (ii) p=0.009, (iii) p=0.4, (iv) p=0.4) steps as shown in FIG. 4. Introducing CANINE with no light touch support did not significantly change gait variability.

To evaluate the differences in gait caused by the light touch support in the VE and RE, a two-way rmANOVA with experimental trials 2, 3, 5, and 6 was completed. When walking with light touch support (LTS), participants took significantly narrower strides (p<0.001) than when no fingertip contact was made with CANINE following, shown in FIG. 5. This difference is evident in both VE and RE. When light touch is introduced, no other significant changes to gait parameters or variabilities were detected. There are also no significant changes to gait caused by the introduction of the VE when CANINE is following the participant.

Now that the changes caused by possibly limiting the speed of the participant and introducing light touch contact were explored, light touch effects during the different perturbation conditions can be assessed. To do this, a two-way rmANOVA with experimental conditions 1, 4, 7, 9, 3, 6, 8, and 10 was run. The two conditions here are the introduction of CANINE with light touch support compared to no following device and the four walking conditions: walking in the RE, VE, VE with AP perturbations, and VE with ML perturbations. When participants walked with CANINE maintaining light touch support, strides became (i) narrower, (ii) shorter, (iii) slower, and (iv) less frequent ((i) p=0.001, (ii) p<0.001, (iii) p<0.002, (iv) p=0.003) than when walking without CANINE following. FIG. 19 shows these results.

Figure 24A:
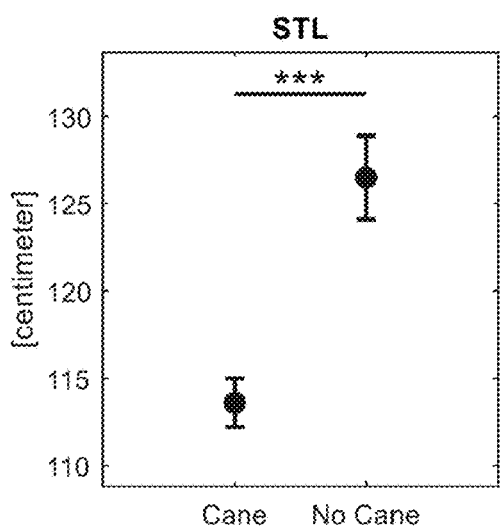
FIGS. 24A to 24B illustrate differences in gait between walking without CANINE following and walking with CANINE following but without light touch.
Figure 24B:
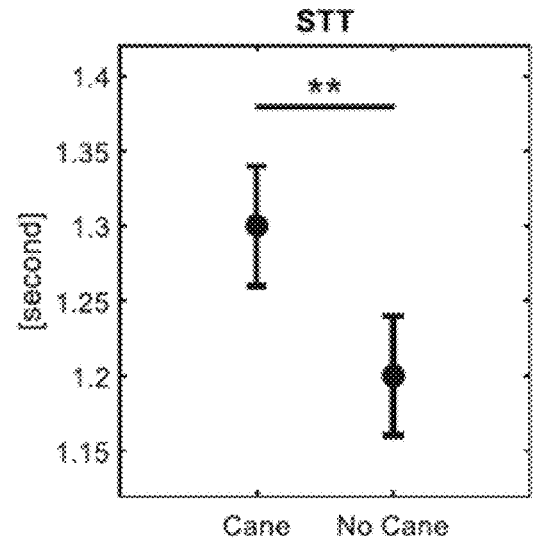

Introducing the light touch support to the perturbation conditions increased variability in STL (p=0.008), shown in FIGS. 24A and 24B. No variabilities had significant main effects from perturbation condition.

Differences in gait between walking in the RE and walking in the VE. When walking in the VE, steps became significantly shorter and more variable. '*', '', '*' represent comparison p values less than 0.5, 0.01, and 0.001, respectively. This comparison contains conditions 1 (RE), 2 (RE), 4 (VE), and 5 (VE).

Figure 25A:
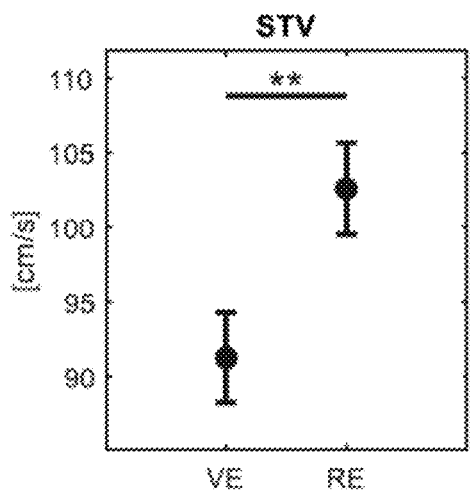
FIGS. 25A-25E show differences in gait between walking in the RE and walking in the VE.
Figure 25C:
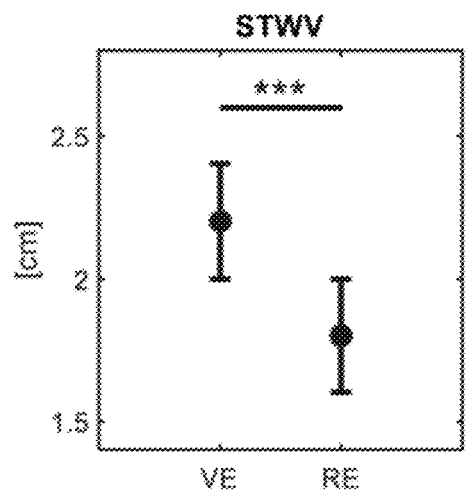
Figure 25B:
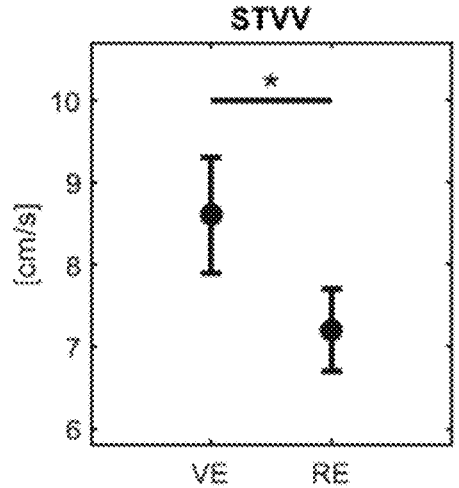
Figure 25D:
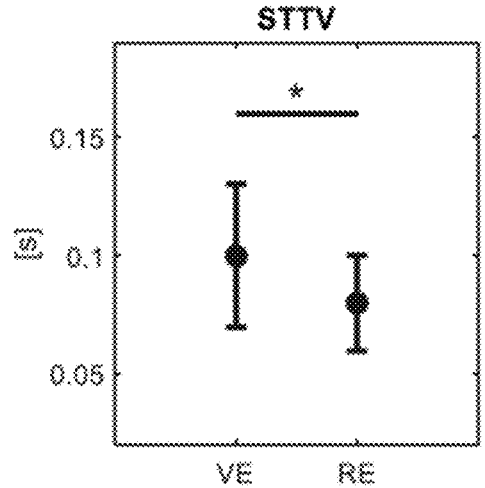
Figure 28A:
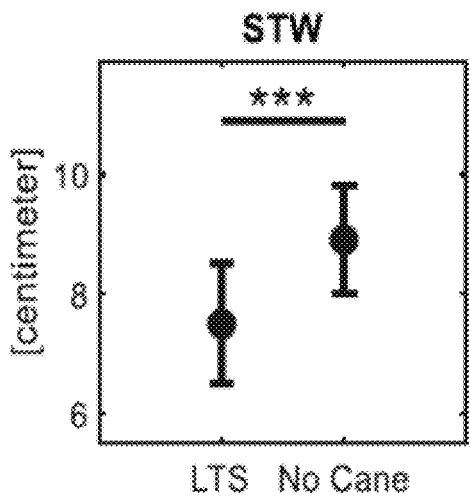
FIGS. 28A to 28E shows differences in gait between walking without CANINE following and walking with CANINE following with LTS.
Figure 28C:
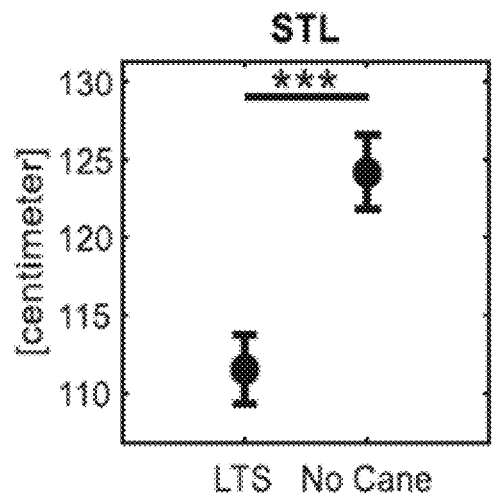
Figure 28B:
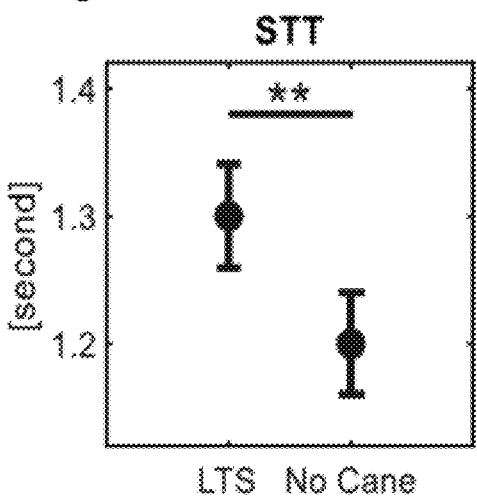
Figure 28D:
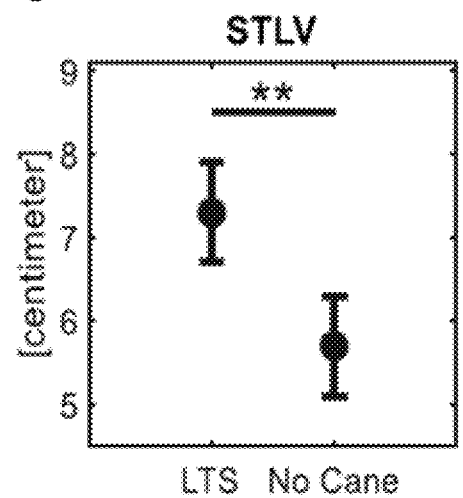
Figure 28E:
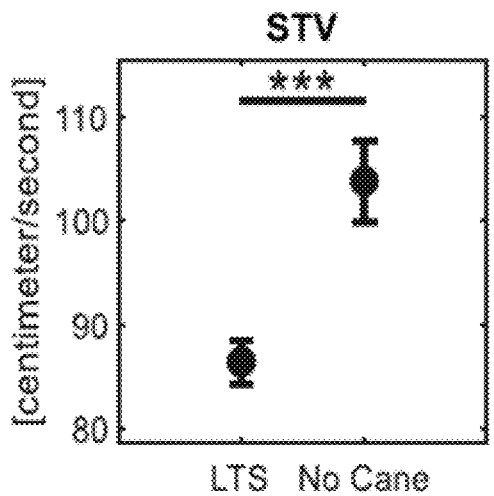

FIGS. 28-28E: Differences in gait between walking without CANINE following and walking with CANINE following but without light touch. When CANINE follows without contact, participants took shorter, less frequent steps than when CANINE is not following the participant. This comparison includes conditions 1 (No Cane), 2 (Cane), 4 (No Cane), and 5 (Cane). FIGS. 25A and 25B: Differences in gait when walking with CANINE following between making light touch contact verses not making any fingertip contact. The only significant difference in gait is a narrower stride. This comparison includes conditions 2 (No LTS), 3 (LTS), 5 (No LTS), and 6 (LTS).

Figure 25E:
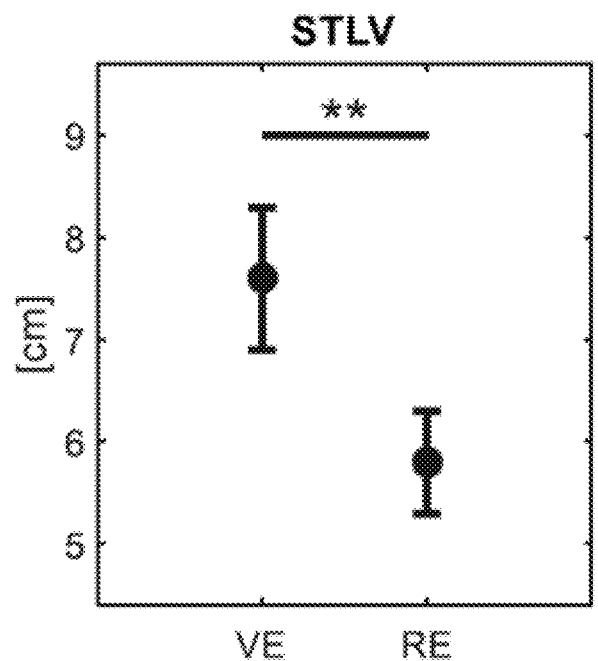

FIG. 25E shows differences in gait between walking in the RE and walking in the VE. When walking in the VE, steps became significantly shorter and more variable. '*', '*', '***' represent comparison p values less than 0.5, 0.01, and 0.001, respectively. This comparison contains conditions 1 (RE), 2 (RE), 4 (VE), and 5 (VE).

Figure 26:
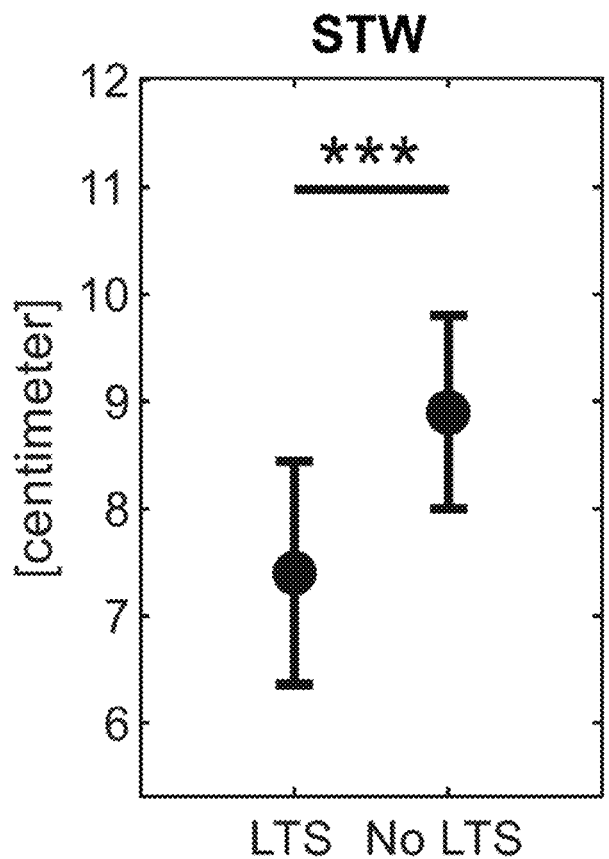
FIG. 26 shows differences in gait when walking with CANINE following between making light touch contact as compared to not making any fingertip contact.
Figure 27A:
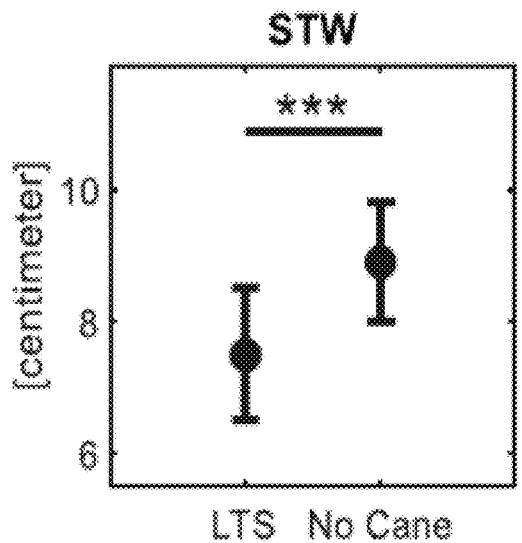
FIGS. 27A to 27E show differences in gait between walking without CANINE following and walking with CANINE following with LTS.
Figure 27B:
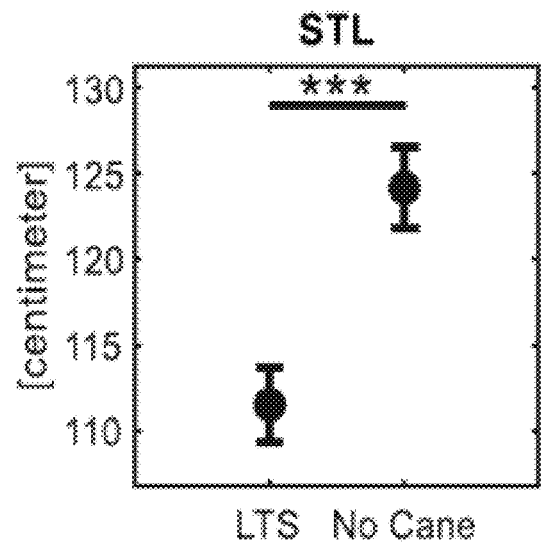
Figure 27C:
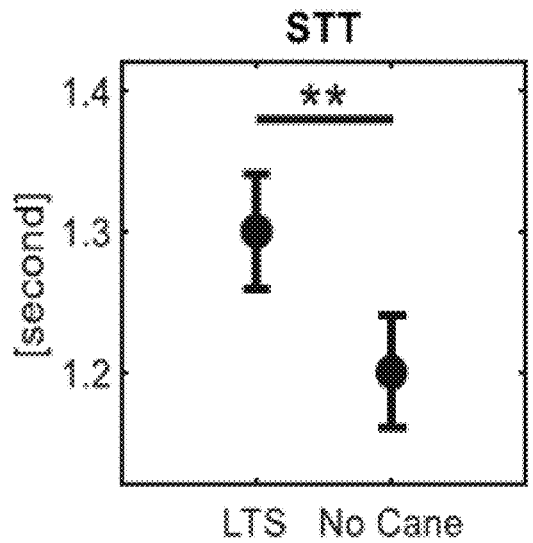
Figure 27D:
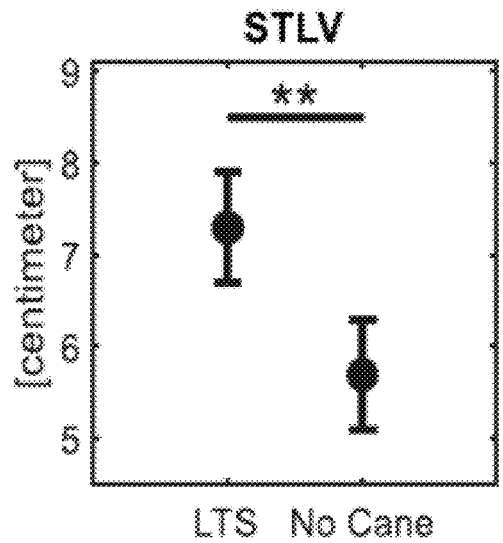
Figure 27E:
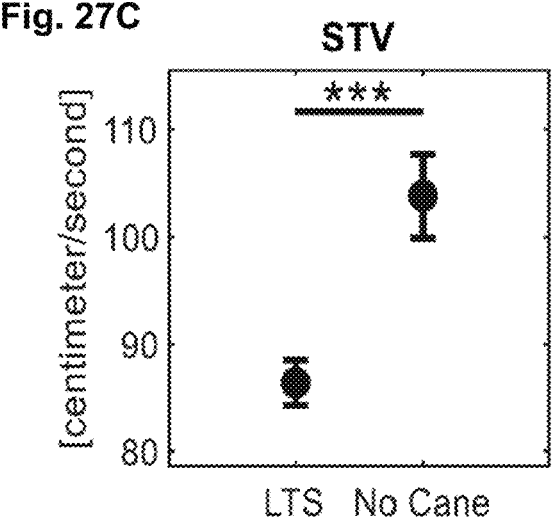

FIG. 26, Differences in gait when walking with CANINE following between making light touch contact verses not making any fingertip contact. The only significant difference in gait is a narrower stride. This comparison includes conditions 2 (No LTS), 3 (LTS), 5 (No LTS), and 6 (LTS).

Referring to 27A through 27E, Differences in gait between walking without CANINE following and walking with CANINE following with LTS. With CANINE following and LTS, participants took shorter, narrower, slower steps. This comparison considers conditions 1 (No Cane), 3 (LTS), 4 (No Cane), 6 (LTS), 7 (No Cane), 8 (LTS), 9 (No Cane), 10 (LTS).

Figure 29A:
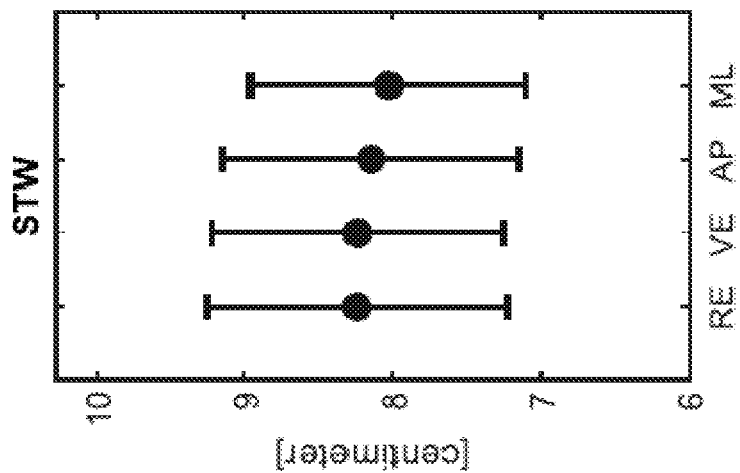
FIGS. 29A to 29C show differences in gait in the various visual perturbation conditions.
Figure 29B:
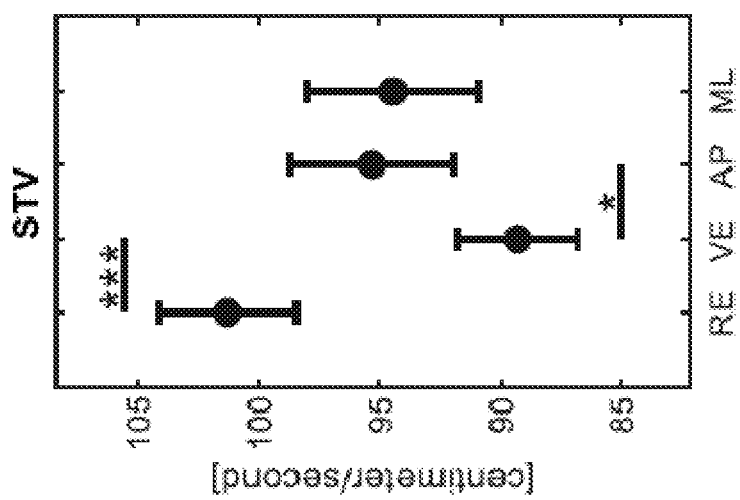
Figure 29C:
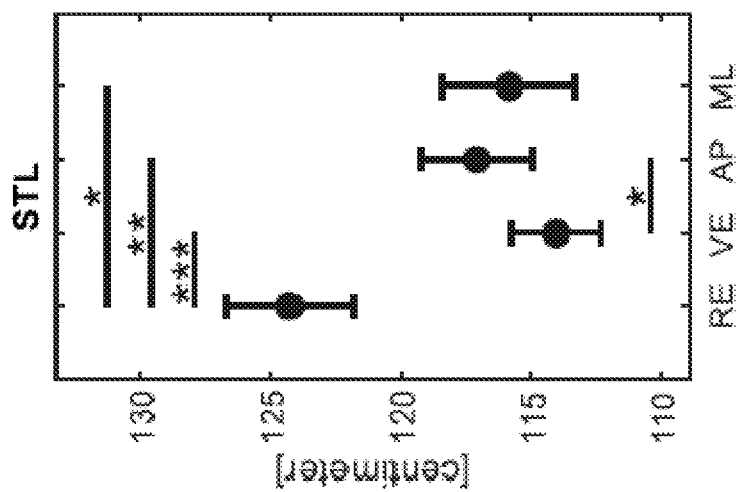
Figure 30A:
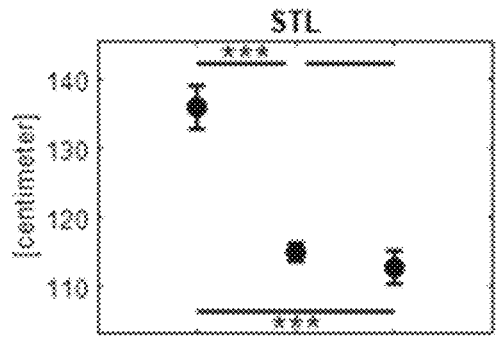
FIGS. 30A to 30G show differences in VE gait between walking without CANINE, walking with CANINE without LTS, and walking with CANINE with LTS.
Figure 30D:
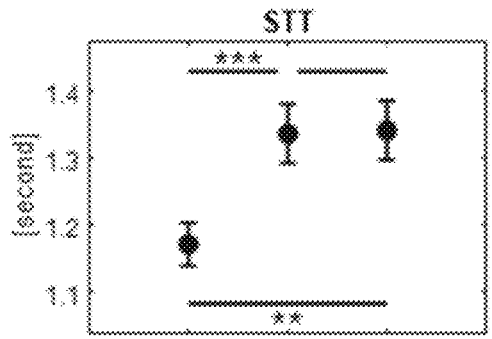
Figure 30B:
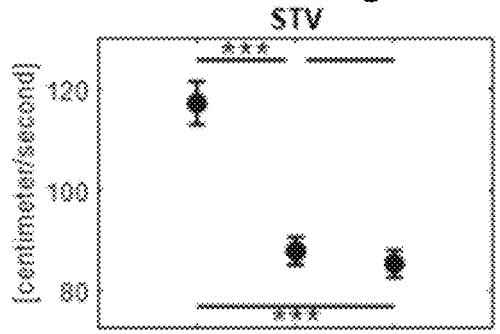
Figure 30E:
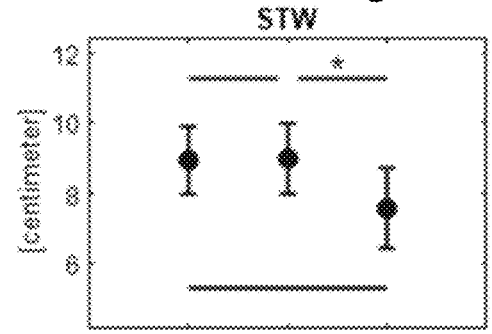
Figure 30C:
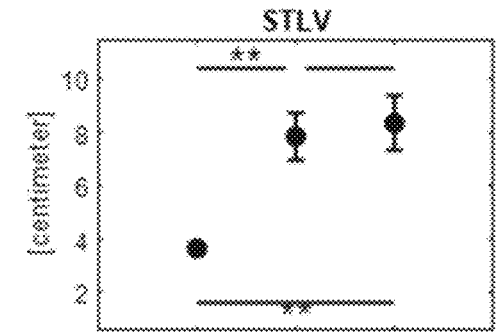
Figure 30F:
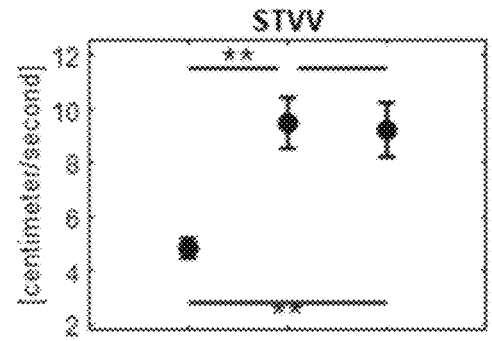
Figure 30G:
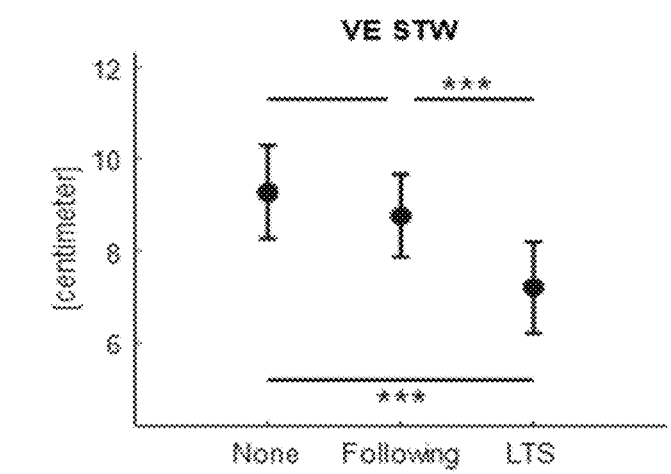
Figure 31A:
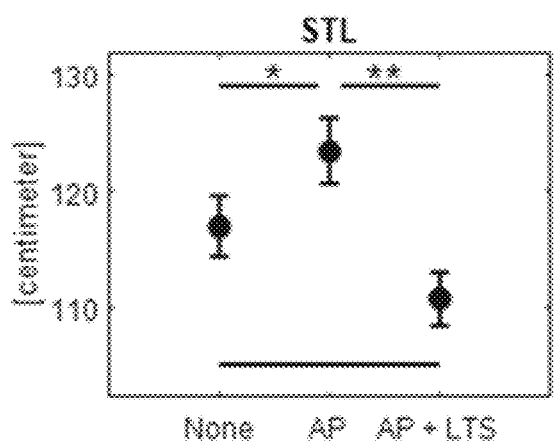
FIGS. 31A to 31D show differences in VE gait between no perturbations, AP visual perturbations, and AP visual perturbations with LTS.
Figure 31C:
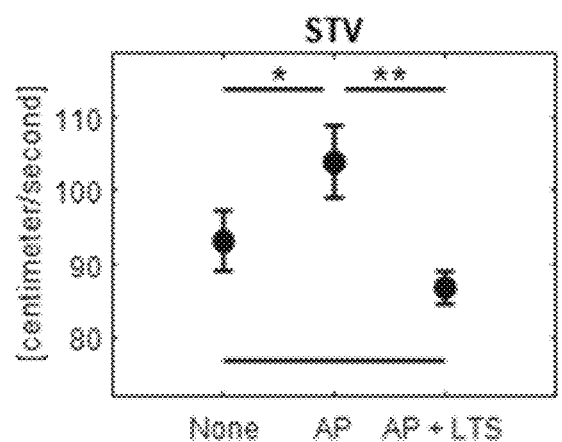
Figure 31B:
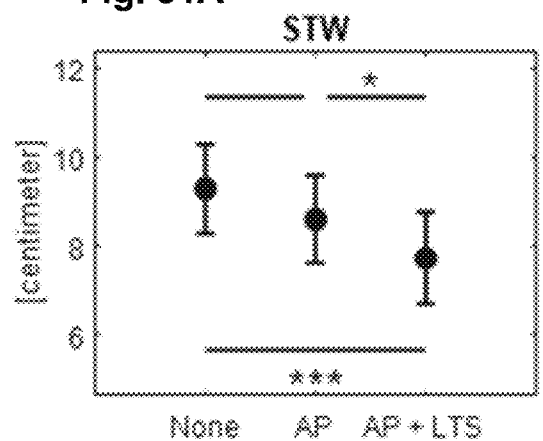
Figure 31D:
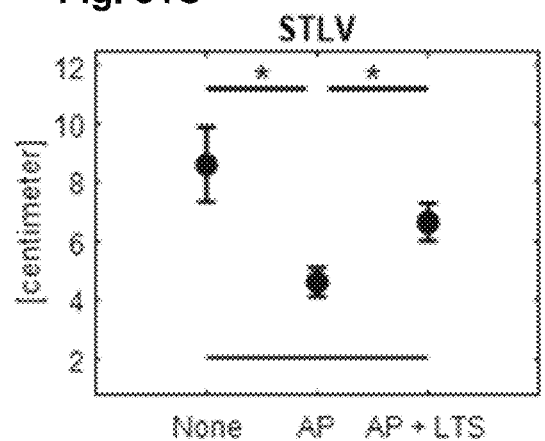

FIGS. 29A-29A-29C: Differences in gait in the various visual perturbation conditions. Walking unperturbed in the RE had significantly longer, faster steps. Strides while walking in the VE during AP perturbations were longer and faster than unperturbed walking in the VE. No significant effect on stride width was observed. This comparison considers conditions 1 (RE), 3 (RE), 4 (VR), 6 (VR), 7 (AP), 8 (AP), 9 (ML), 10 (ML).

Figs. Differences in gait in the various visual perturbation conditions. Walking unperturbed in the RE had significantly longer, faster steps. Strides while walking in the VE during AP perturbations were longer and faster than unperturbed walking in the VE. No significant effect on stride width was observed. This comparison considers conditions 1 (RE), 3 (RE), 4(VR), 6 (VR), 7 (AP), 8 (AP), 9 (ML), 10 (ML).

Referring to FIG. 28A-28E, differences in gait between walking without CANINE following and walking with CANINE following with LTS. With CANINE following and LTS, participants took shorter, narrower, slower steps. This comparison considers conditions 1 (No Cane), 3 (LTS), 4 (No Cane), 6 (LTS), 7 (No Cane), 8 (LTS), 9 (No Cane), 10 (LTS).

Referring to FIGS. 29A, 29B, and 29C: Differences in gait between walking in the RE and walking in the VE. When walking in the VE, steps became significantly shorter and more variable. '*', '', '*' represent comparison p values less than 0.5, 0.01, and 0.001, respectively. This comparison contains conditions 1 (RE), 2 (RE), 4 (VE), and 5 (VE).

Referring to FIGS. 29A-29E differences in gait in the various visual perturbation conditions. Walking unperturbed in the RE had significantly longer, faster steps. Strides while walking in the VE during AP perturbations were longer and faster than unperturbed walking in the VE. No significant effect on stride width was observed. This comparison considers conditions 1 (RE), 3 (RE), 4 (VR), 6 (VR), 7 (AP), 8 (AP), 9 (ML), 10 (ML).

While walking in the RE, participants took significantly longer strides than walking in the (i) VE, (ii) VE with AP perturbations, and (iii) VE with ML perturbations ((i) p<0.001, (ii) p=0.007, (iii) p=0.11). While experiencing AP perturbations, participants took longer steps than when walking unperturbed in the VE (p=0.046). When in the VE, strides were significantly slower than walking in the (i) RE or while (ii) being perturbed in the AP direction ((i) p=0.001, (ii) p=0.042). These differences are expressed in FIG. 7. Walking while experiencing ML perturbations was not significantly different than other VE conditions.

The goal of this study was to investigate dynamic light-touch on over-ground walking and the effects on stability during visual perturbations. the results show that participants took significantly slower steps when walking in the unperturbed VE compared to the RE. Stride variability also significantly increased regarding stride width, length, speed, and frequency. The high variability sensitivity when in the virtual reality environment may indicate a dependence on the visual field for foot placements. This is corroborated by O'Connor et. al, who showed similar results while being visually perturbed during treadmill walking. However, Martelli et. al showed minimal significant changes in variability when comparing over-ground walking in the VE and RE. This could be due to a longer 6 minutes of walking time per condition, as compared to 1.5- and 3-minutes per condition in the protocol. Participants had less time to reorient themselves to the VE, and higher variabilities could suggest difficulty adapting to the new visual environment.

When walking with CANINE following, but without making fingertip contact, strides were significantly slower and shorter, but not significantly different in width, or variability. This is likely due to hardware limitations. The maximum velocity achievable by CANINE may be less than the desired walking speed of the participants. A lack of significant change on stride width could indicate that while the participants did walk slower to allow CANINE to successfully follow, only the length component of their base of support (BoS), which is defined as the minimum area enclosing the body's contact with the ground, was altered. As stability is related to BoS and stride variability, it can be deduce that in this experiment, the constraint on walking speed imposed by CANINE increased the participants' stabilities in the AP direction but not in the ML direction. However, limiting gait speed could limit the effects of perturbations, as slower walking may be a coping method to increase resistance to visual perturbations in a VE. When considering only conditions where CANINE was following the user, no significant changes in gait were detected between walking slower in the RE and walking slower in the VE. The lack of increased variability supports the idea that slower gait speeds may provide resilience against visual perturbations of the visual field.

By only analyzing the conditions in which gait speed was limited by CANINE, the effects of light touch contact can be isolated. We hypothesized that proprioceptive feedback from light touch contact during over-ground walking would increase gait stability. In conditions with limited gait speeds, maintaining light touch support led to a significantly narrower gait, a trend that has been observed in over-ground light touch support with a railing. A narrower gait is a direct reduction in lateral BoS, a highly important parameter for maintaining stable gait. We can rule out the possibility that narrower gait was caused by walking next to CANINE because walking next to CANINE without light touch contact did not elicit narrower gait. However, maintaining light touch contact with CANINE represented an additional task constraint to over-ground walking. In quiet stance, some have proposed that the additional task constraint of maintaining light touch is a suprapostural task, suggesting that the act of maintaining finger contact reduces body sway instead of the proprioceptive feedback. It is possible that participants made postural changes to accommodate the task of maintaining contact with CANINE. For example, one possible adaptation could be reduced pelvic rotation in the transverse plane resulting in reduced shoulder movement, as pelvic fixation has been shown to reduce step width while treadmill walking. While this merits further exploration, the similarity of the finding of narrower gait to studies of over-ground gait with fixed light touch supports, which were likely easier to maintain contact with, argues against a suprapostural role.

Participants experienced changes in gait during the different visual conditions, i.e. over-ground walking in the RE, in the VE, in the VE with AP visual perturbations, and in the VE with ML visual perturbations. When walking in the RE, strides were longer and faster than those in the VE. This decrease in stride velocity in the VE compared to the RE matches the previous evaluation of VR effects on unperturbed walking. Walking in the VE with AP or ML perturbations led to shorter strides as well. The decrease in stride length from the RE to the unperturbed VE is inconsistent with the prior results on RE verses VE walking. Perhaps this is because the earlier analysis focused on the same conditions in the RE and VE tasks, while this analysis now includes visual oscillations that cannot be repeated in the RE. Strides were faster and longer while being perturbed in the AP direction than in the unperturbed VE, while no Significant differences were found due to ML perturbations. This indicates that participants were more sensitive to the AP perturbations, although other studies show that ML perturbations have a greater disturbing effect, especially on stride width. This discrepancy may have been caused by the light touch support, which was shown to elicit narrower strides.

Introducing light touch support to the four visual field conditions led to shorter, narrower, and slower strides, as well as more varied stride lengths. Based on the prior analysis of unperturbed walking, we can infer that the changes in stride length and time could be due to the limited speed, and the decrease in stride width can be attributed to the light touch support. This indicates that the proprioceptive feedback of the light touch contact decreased stride length, regardless of visual environment and perturbations. Therefore, the dynamic, person-following light touch cane decreased BoS and likely increased stability during all visual conditions.

This study presents several limitations that could limit the generalizability of the results to typical walking in daily life. Due to the mechanical design specifications of the mobile base, the maximum velocity is less than the baseline walking speed of healthy adults. This limits the walking velocity of the person it is following. Maintaining light touch contact required ipsilateral arm placement far from the arm's lateral range of motion during natural arm swing. This lack of natural arm swing, which is used to limit the magnitude of ground reaction moment on the stance foot during gait, could cause asymmetry of stance phases. This may be less impactful if the device is used in patient populations with asymmetric gait patterns. The length of the Zeno Walkway coupled with the limited tracking area of the HTC Vive limited the number of continuous steps the participants could take. The participants were all healthy, young adults, and so the observed effects of the dynamic light touch support cannot be readily applied to other populations. However, it suggests that exploration of mobile light touch robots in other populations may be worthwhile. Future works could explore perturbations of the person-following platform during over-ground walking and repeating this experiment with other patient populations.

The disclosed subject matter includes an autonomous person-following robot and described the results of exploration of the effects of a dynamic light touch cue on the stability of healthy young adults experiencing perturbations in a VE while walking over-ground. We found that limiting gait speed had no significant effect on stride width but introducing light touch support led to narrower stride width while in the RE, VE, and in a VE with visual field perturbations. A narrower BoS while walking may indicate increased over-ground stability.

Improving over-ground stability is an important step to increasing the quality of life for those with gait irregularities. Elderly individuals or stroke patients who walk with a traditional cane may benefit from having a light touch support that requires no coordination or lifting while walking. Improving stability coupled with eliminating the requirement of coordination required by a traditional cane could improve mobility and reduce the risk of falling, both of which are important considerations for the mobility and balance impaired.

According to embodiments, the disclosed subject matter includes a mobile assistance platform. A chassis with supported on motorized wheels. Hand grips are connected to the chassis by a linkage that permits the handles to move closer or further from the chassis. The chassis, hand grips, and linkage may have the general form of a walker. The chassis, hand grips, and linkage may have the general form of a crutch. The chassis, hand grips, and linkage may have the general form of a cane. The linkage may include a pair of parallelogram linkages.

The parallelogram linkages may be releasably locked together. The release of the selective separation of the parallelogram linkages may permit a single parallelogram linkage to be used independently of the other as a separate chassis with a single linkage and functions as a cane. The embodiments may include a graphical computer display. The embodiments may include a controller that actively controls the wheels to maintain stability of a user. The controller may execute a learning algorithm. The embodiments may include a brace that is shaped and sized to be worn around the hips of the user. The brace may be attached to the platform by cables. The cables may be actively controlled by servo-motors. The embodiments may in include an optical scanning system that calculates the surrounding obstacles. The optical scanning system may include LIDAR. The parallelogram linkages may be actively controlled by a controller. The parallelogram linkages may be actively controlled by a controller and servo-motors.

Embodiments may include a system using any of the above platforms and a pair of shoes with sensors, the sensors sending signals responsive to pressure on the shoes from walking to a controller of the platform, the platform wheels being actively controlled responsively to the signals. Any of the foregoing embodiments may include a pair of shoes with sensors, the sensors sending signals responsive to pressure on the shoes from walking to a controller of the platform, the brace being actively controlled responsively to the signals. An onboard controller may store data from the recited motors and sensors. The system or platform of any foregoing claim, wherein a controller executes an algorithm that optimizes a relative position of a center of pressure indicated by sensors in the platform and a base of support. A numerical representation of the location and size of the base of support may be stored in the controller. The sensors may be located in the handles of the platform.

According to first embodiments, the disclosed subject matter includes mobile assistant platform for helping patients with movement disabilities. A robotic vehicle connected to a two-link arm, the arm having a handle at height suitable for a walking cane and movable by means of said two-link arm, to multiple heights in a range around said height suitable for a walking cane. A digital processor connected to the robotic vehicle to control it. At least one force sensor in the handle and/or two-link arm connected to apply force signals the digital processor. A user-position and orientation detecting device is connected to apply configuration signals to the robotic vehicle. The user-position and orientation detecting device being physically connected to one or more of the robotic vehicle, a region outside the robotic vehicle, or on the user, alone or in combination.

The first embodiments can be modified to form additional first embodiments in which the user depending on the processor being programmed to cause the vehicle to follow the user along a path that maintains a fixed distance from the user.

The first embodiments can be modified to form additional first embodiments in which the robotic vehicle has a motorized joint.

The first embodiments can be modified to form additional first embodiments in which the two-link arm has a motorized joint.

The first embodiments can be modified to form additional first embodiments in which the robotic vehicle is steerable by means of differential wheel rotation.

The first embodiments can be modified to form additional first embodiments the include a user interface connected to the handle.

According to third embodiments, the disclosed subject matter includes a robotic vehicle connected to a two-link arm, the arm having a handle at height suitable for a walking cane and movable by means of said two-link arm, to multiple heights in a range around said height suitable for a walking cane.

A digital processor is connected to the robotic vehicle to control it. At least one force sensor is in the handle and/or the two-link arm connected to apply force signals the digital processor.

According to fourth embodiments, the disclosed subject matter includes a user-position and orientation detecting device connected to apply configuration signals to the robotic vehicle, the user-position and orientation detecting device being physically connected to one or more of the robotic vehicle, a region outside the robotic vehicle, or on the user, alone or in combination. optionally also to the user depending on the processor being programmed to cause the vehicle to position and move itself responsively to the position, motion, gait, and/or orientation of the user.

The fourth embodiments can be modified to form additional fourth embodiments in which the robotic vehicle has a motorized joint controlled by the processor to apply selected forces to the handle responsively to the position, motion, gait, and/or orientation of the user.

The fourth embodiments can be modified to form additional fourth embodiments in which two-link arm has a motorized joint controlled by the processor to apply selected forces to the handle responsively to the position, motion, gait, and/or orientation of the user. The fourth embodiments can be modified to form additional fourth embodiments in which the robotic vehicle is steerable by means of differential wheel rotation.

The fourth embodiments can be modified to form additional fourth embodiments in which a user interface includes is connected to the handle.

The fourth embodiments can be modified to form additional fourth embodiments in which the user-position and orientation detecting device includes a pair of instrumented shoes that transmit pressure signals indicating a gait of a user, the processor being programmed to control the two-link arm responsively to the pressure signals.

The fourth embodiments can be modified to form additional fourth embodiments in which the user-position and orientation detecting device includes a pair of instrumented shoes that transmit accelerometer signals indicating a gait of a user, the processor being programmed to control the two-link arm responsively to the accelerometer signals.

The fourth embodiments can be modified to form additional fourth embodiments in which the processor is programmed to cause the robotic vehicle to navigate a predefined course.

The fourth embodiments can be modified to form additional fourth embodiments in which the at least one force sensor includes force and torque sensors on the two-link arm.

The fourth embodiments can be modified to form additional fourth embodiments in which the e at least one force sensor includes force and torque sensors on the two-link arm located near said handle.

The fourth embodiments can be modified to form additional fourth embodiments in which the user-position and orientation detecting device includes a pair of instrumented shoes that transmit pressure signals indicating a gait of a user, the processor being programmed to control the two-link arm responsively to the pressure signals.

The fourth embodiments can be modified to form additional fourth embodiments in which the user-position and orientation detecting device includes a pair of instrumented shoes that transmit accelerometer signals indicating a gait of a user, the processor being programmed to control the two-link arm responsively to the accelerometer signals.

The fourth embodiments can be modified to form additional fourth embodiments in which the user-position and orientation detecting device includes a pair of instrumented shoes that transmit pressure signals indicating a gait of a user, the processor being programmed to control the two-link arm responsively to the pressure signals.

The fourth embodiments can be modified to form additional fourth embodiments in which the user-position and orientation detecting device includes a pair of instrumented shoes that transmit accelerometer signals indicating a gait of a user, the processor being programmed to control the two-link arm responsively to the accelerometer signals.

According to fifth embodiments, the disclosed subject matter includes a robotic touch platform. The embodiments include an person-following base with a touch platform elevated above the base. The base follows a user without requiring the user to lift the base off the floor and the touch platform being non-weight bearing. The base is autonomously controlled to follow a person.

The fifth embodiments can be modified to form additional fifth embodiments in which the base is controlled responsively to light detection and ranging (LIDAR).

The fifth embodiments can be modified to form additional fifth embodiments in which the base is a differential-drive mobile truck.

The fifth embodiments can be modified to form additional fifth embodiments in which the touch support platform permits fingertip contact therewith.

The fifth embodiments can be modified to form additional fifth embodiments in which the touch support platform is located 1.1 m from the floor.

The fifth embodiments can be modified to form additional fifth embodiments in which the touch support platform has a force sensor to detect forces exerted by a user's fingertips.

The fifth embodiments can be modified to form additional fifth embodiments in which the touch support is non-weight bearing.

The fifth embodiments can be modified to form additional fifth embodiments in which the base is controlled responsively to a LIDAR signal that is derived from reflectors located on a user's legs.

According to sixth embodiments, the disclosed subject matter includes a method of assisting a walking person. The method includes providing a touch support elevated above the ground at a position where a walking person can maintain contact with the platform. The method includes supporting the touch support using a robotic person-following robot. The method includes using the touch support as a moving reference point without bearing weight of the walking person to provide proprioceptive feedback to a user.

The sixth embodiments can be modified to form additional sixth embodiments in which the touch support is a planar member.

The sixth embodiments can be modified to form additional sixth embodiments in which the touch support does not support the user except to the extent required to maintain touch contact with the touch support.

The sixth embodiments can be modified to form additional sixth embodiments in which the person-following robot maintains a predefined position away from the user.

The sixth embodiments can be modified to form additional sixth embodiments in which the person-following robot maintains a position about half a meter to the side of the user and 0.3 meter back.

The sixth embodiments can be modified to form additional sixth embodiments that include further comprising providing distorting visual cues to the user to simulate balance challenge to the user using a virtual reality headset.

It may be appreciated that the modules, processes, systems, and sections described above can be implemented in hardware, hardware programmed by software, software instruction stored on a non-transitory computer readable medium or a combination of the above. For example, a method for assisting walking can be implemented, for example, using a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, LabVIEW, or another structured or object-oriented programming language. The sequence of programmed instructions and data associated therewith can be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random-access memory (RAM), flash memory, disk drive and the like.

Furthermore, the modules, processes, systems, and sections can be implemented as a single processor or as a distributed processor. Further, it should be appreciated that the steps mentioned above may be performed on a single or distributed processor (single and/or multi-core). Also, the processes, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, or the like. In general, any process capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of control systems, machine intelligence, kinematic design and/or computer programming arts.

Moreover, embodiments of the disclosed method, system, and computer program product can be implemented in software executed on a programmed general-purpose computer, a special purpose computer, a microprocessor, or the like.

It is, thus, apparent that there is provided, in accordance with the present disclosure, mobility assistant devices methods and systems. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

What is claimed is:

1. A mobile assistant platform for helping a user with movement disabilities, comprising:
   a robotic vehicle;
   a two-link arm having a lower shaft that extends upwards with respect to the robotic vehicle and is connected to the robotic vehicle via a first joint, an upper shaft that extends upwards with respect to the lower shaft and is connected to the lower shaft via a second joint, and a handle connected the upper shaft, wherein the handle is positioned at a height suitable for a walking cane, and wherein the handle is movable by means of said two-link arm, to multiple heights in a range around said height suitable for a walking cane;
   a digital processor connected to the robotic vehicle to control it;
   at least one force sensor in at least one of the handle and the two-link arm connected to apply force signals the digital processor; and
   a user-position and orientation detecting device connected to apply configuration signals to the robotic vehicle, the user-position and orientation detecting device being physically connected to one or more of the robotic vehicle, a region outside the robotic vehicle, or on the user, alone or in combination.

2. The mobile assistant platform of claim 1, wherein the user-position and orientation detecting device is physically connected to the user, and
   the processor is programmed to cause the robotic vehicle to follow the user along a path that maintains a fixed distance from the user or to cause the robotic vehicle to position and move itself responsively to at least the position, motion, gait, or orientation of the user.

3. The mobile assistant platform of claim 1, wherein the first joint is motorized.

4. The assistant platform of claim 1, wherein the first joint is motorized and is controlled by the processor to apply selected forces to the handle responsively to a position, motion, gait, and/or orientation of the user.

5. The assistant platform of claim 1, wherein the first and second joints are motorized and are controlled by the processor to apply selected forces to the handle responsively to a position, motion, gait, and/or orientation of the user.

6. The mobile assistant platform of claim 1, further comprising a user interface connected to the handle.

7. The assistant platform of claim 1, wherein the user-position and orientation detecting device includes a pair of instrumented shoes that transmit pressure signals indicating a gait of a user, the processor being programmed to control the two-link arm responsively to the pressure signals.

8. The assistant platform of claim 1, wherein the user-position and orientation detecting device includes a pair of instrumented shoes that transmit accelerometer signals indicating a gait of a user, the processor being programmed to control the two-link arm responsively to the accelerometer signals.

9. The assistant platform of claim 1, wherein the processor is programmed to cause the robotic vehicle to navigate a predefined course.

10. The assistant platform of claim 1, wherein the at least one force sensor includes force and torque sensors on the two-link arm.

11. A robotic touch platform, comprising:
an autonomous person-following base with a touch platform elevated above the base;
the base following a user along a floor without requiring the user to lift the base off the floor and the touch platform being non-weight bearing; and
the base being autonomously controlled to determine a heading direction of a person and follow the person by traveling in the same heading direction as the person while maintaining a position that is laterally offset from the person's legs.

12. The touch platform of claim 11, wherein the base is controlled responsively to a LIDAR signal that is derived from reflectors located on the person's legs.

13. The touch platform of claim 11, wherein
the base is a differential-drive mobile truck,
the touch platform permits fingertip contact therewith, and
touch platform is located approximately 1.1 m from the floor.

14. The touch platform of claim 11, wherein the touch platform has a force sensor to detect forces exerted by the person's fingertips.

15. A method of assisting a person walking, comprising:
providing a touch support elevated above the ground at a position where the person can maintain contact with the touch support;
supporting the touch support using a person-following robot that determines a heading direction of a person and follows the person by traveling in the same heading direction as the person while maintaining a position that is laterally offset from the person's legs; and
using the touch support as a moving reference point without bearing weight of the person to provide proprioceptive feedback to the person.

16. The method of claim 15, wherein the touch support is a planar member.

17. The method of claim 15, wherein the touch support does not support the person except as required to maintain touch contact with the touch support.

18. The method of claim 15, wherein the person-following robot maintains a predefined position away from the person.

19. The method of claim 18, wherein the person-following robot maintains a position approximately half a meter to a side of the person and 0.3 meter behind the person.

20. The method of claim 15, further comprising:
providing a virtual reality headset to the person; and
providing distorting visual cues through the virtual reality headset to the person to simulate balance challenges.

* * * * *